United States Patent
Gill et al.

(10) Patent No.: US 10,019,677 B2
(45) Date of Patent: Jul. 10, 2018

(54) ACTIVE POLICY ENFORCEMENT

(75) Inventors: Jasvir Singh Gill, Fremont, CA (US); Inderpal Ricky Arora, Union City, CA (US); Srinivasa Kakkera, Newark, CA (US); Madhu Gourineni, Foster City, CA (US)

(73) Assignee: Alert Enterprise, Inc., Fremont, CA (US)

( * ) Notice: Subject to any disclaimer, the term of this patent is extended or adjusted under 35 U.S.C. 154(b) by 334 days.

(21) Appl. No.: 13/397,565

(22) Filed: Feb. 15, 2012

(65) Prior Publication Data
US 2012/0216243 A1    Aug. 23, 2012

Related U.S. Application Data

(63) Continuation-in-part of application No. 12/953,318, filed on Nov. 23, 2010, now Pat. No. 8,769,412.
(Continued)

(51) Int. Cl.
| | |
|---|---|
| *G06F 21/00* | (2013.01) |
| *G06Q 10/06* | (2012.01) |
| *G06F 21/55* | (2013.01) |
| *G06F 21/57* | (2013.01) |
| *H04L 29/06* | (2006.01) |

(52) U.S. Cl.
CPC ......... *G06Q 10/063* (2013.01); *G06F 21/55* (2013.01); *G06F 21/577* (2013.01); *G06Q 10/067* (2013.01); *H04L 63/102* (2013.01); *H04L 63/1416* (2013.01)

(58) Field of Classification Search
CPC . G06F 21/604; G06F 21/554; H04L 12/2621; H04L 63/20
See application file for complete search history.

(56) References Cited

U.S. PATENT DOCUMENTS

| | | | | |
|---|---|---|---|---|
| 4,962,473 A | * | 10/1990 | Crain | .... G08B 25/14 340/539.2 |
| 6,324,656 B1 | | 11/2001 | Glelchauf et al. | |

(Continued)

FOREIGN PATENT DOCUMENTS

WO    2011063269 A1    5/2011

OTHER PUBLICATIONS

Hayden, Michael. The Insider Threat to U.S. Government Information Systems (NSTISSAM INFOSEC/1-99) Jul. 1, 1999 (Year: 1999).*

(Continued)

*Primary Examiner* — Peter H Choi
*Assistant Examiner* — Alissa D Karmis
(74) *Attorney, Agent, or Firm* — Michael A. Glenn; Perkins Coie LLP

(57) ABSTRACT

A method and apparatus is provided that includes techniques for providing complete solutions for role-based, rules-driven active policy enforcement. An embodiment addresses blended risk assessment and security across logical systems, IT applications, databases, physical systems, and operational systems in the context of threat and fraud detection, risk analysis and remediation, compliance checks and continuous monitoring. Further, an embodiment provides ability to embed and enforce active policy enforcement in particular processes.

16 Claims, 40 Drawing Sheets

Related U.S. Application Data which is a continuation of application No. PCT/US2010/057485, filed on Nov. 19, 2010.

(60) Provisional application No. 61/263,284, filed on Nov. 20, 2009.

(56) References Cited

U.S. PATENT DOCUMENTS

| | | | |
|---|---|---|---|
| 6,519,571 B1 | 2/2003 | Guheen et al. | |
| 7,143,284 B2 | 11/2006 | Wheeler et al. | |
| 7,278,163 B2 | 10/2007 | Banzhof et al. | |
| 7,536,456 B2 | 5/2009 | Williams et al. | |
| 7,627,893 B2 | 12/2009 | Corley et al. | |
| 7,752,125 B1 | 7/2010 | Kothari et al. | |
| 7,937,319 B2 | 5/2011 | Kennis et al. | |
| 8,090,600 B2 | 1/2012 | Ziade et al. | |
| 8,195,546 B2 | 6/2012 | Wefers et al. | |
| 8,214,235 B2 | 7/2012 | Tait et al. | |
| 8,271,642 B1* | 9/2012 | Sankararaman | G06F 21/554 340/506 |
| 8,438,643 B2 | 5/2013 | Wiemer et al. | |
| 8,463,627 B1* | 6/2013 | Hirose et al. | 705/5 |
| 8,544,098 B2 | 9/2013 | Gustave et al. | |
| 2002/0129221 A1 | 9/2002 | Borgia et al. | |
| 2003/0005326 A1* | 1/2003 | Flemming | G06F 21/31 726/4 |
| 2004/0010709 A1 | 1/2004 | Baudoin et al. | |
| 2004/0019803 A1 | 1/2004 | Jahn et al. | |
| 2004/0143753 A1 | 7/2004 | Hernacki et al. | |
| 2004/0215551 A1 | 10/2004 | Eder et al. | |
| 2005/0010821 A1 | 1/2005 | Cooper et al. | |
| 2005/0015623 A1* | 1/2005 | Williams et al. | 713/201 |
| 2005/0044037 A1 | 2/2005 | Lawrence et al. | |
| 2006/0059031 A1 | 3/2006 | Hertel-Szabadi et al. | |
| 2006/0093190 A1 | 5/2006 | Cheng et al. | |
| 2006/0116898 A1* | 6/2006 | Peterson | 705/1 |
| 2006/0143231 A1* | 6/2006 | Boccasam et al. | 707/104.1 |
| 2006/0212846 A1 | 9/2006 | O'Farrell et al. | |
| 2007/0067848 A1 | 3/2007 | Gustave et al. | |
| 2007/0094711 A1 | 4/2007 | Corley et al. | |
| 2007/0186106 A1 | 8/2007 | Ting et al. | |
| 2007/0250377 A1 | 10/2007 | Hill et al. | |
| 2007/0261100 A1* | 11/2007 | Greeson | G06F 21/32 726/1 |
| 2007/0282665 A1 | 12/2007 | Buehler et al. | |
| 2008/0015889 A1* | 1/2008 | Fenster | 705/1 |
| 2008/0082375 A1 | 4/2008 | Kennis et al. | |
| 2008/0091681 A1* | 4/2008 | Dwivedi | G06F 21/554 |
| 2008/0133300 A1 | 6/2008 | Jalinous et al. | |
| 2008/0140356 A1 | 6/2008 | Sanford et al. | |
| 2008/0147610 A1* | 6/2008 | Mohanty et al. | 707/3 |
| 2008/0209505 A1 | 8/2008 | Ghai et al. | |
| 2008/0209506 A1 | 8/2008 | Ghai et al. | |
| 2008/0320552 A1* | 12/2008 | Kumar | G06F 21/552 726/1 |
| 2009/0002157 A1 | 1/2009 | Donovan et al. | |
| 2009/0135007 A1 | 5/2009 | Donovan et al. | |
| 2009/0168695 A1 | 7/2009 | Johar et al. | |
| 2010/0077474 A1 | 3/2010 | Yacoub et al. | |
| 2010/0198636 A1 | 8/2010 | Choudhary et al. | |
| 2010/0324952 A1 | 12/2010 | Bastos et al. | |
| 2011/0066562 A1 | 3/2011 | Stapleton et al. | |
| 2011/0126111 A1 | 5/2011 | Gill et al. | |
| 2011/0131076 A1 | 6/2011 | Leidner et al. | |
| 2011/0314515 A1* | 12/2011 | Hernoud | H04W 12/06 726/2 |
| 2012/0239704 A1 | 9/2012 | O'Farrell et al. | |
| 2015/0046524 A1 | 2/2015 | O'Farrell et al. | |
| 2015/0358359 A1 | 12/2015 | Jain et al. | |

OTHER PUBLICATIONS

"Recommended Practice: Developing an Industrial Control Systems Cybersecurity Incident Response Capability", Homeland Security; Control Systems Security Program National Cyber Security Division; Oct. 2009; Oct. 2009, pp. 1-46.

* cited by examiner

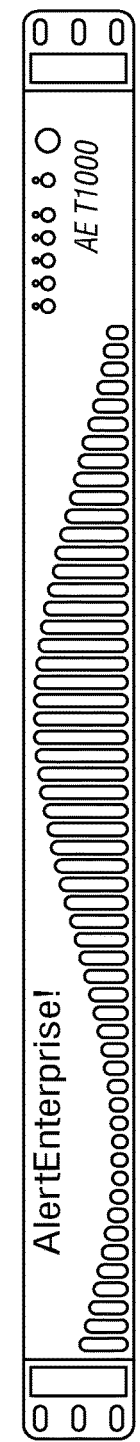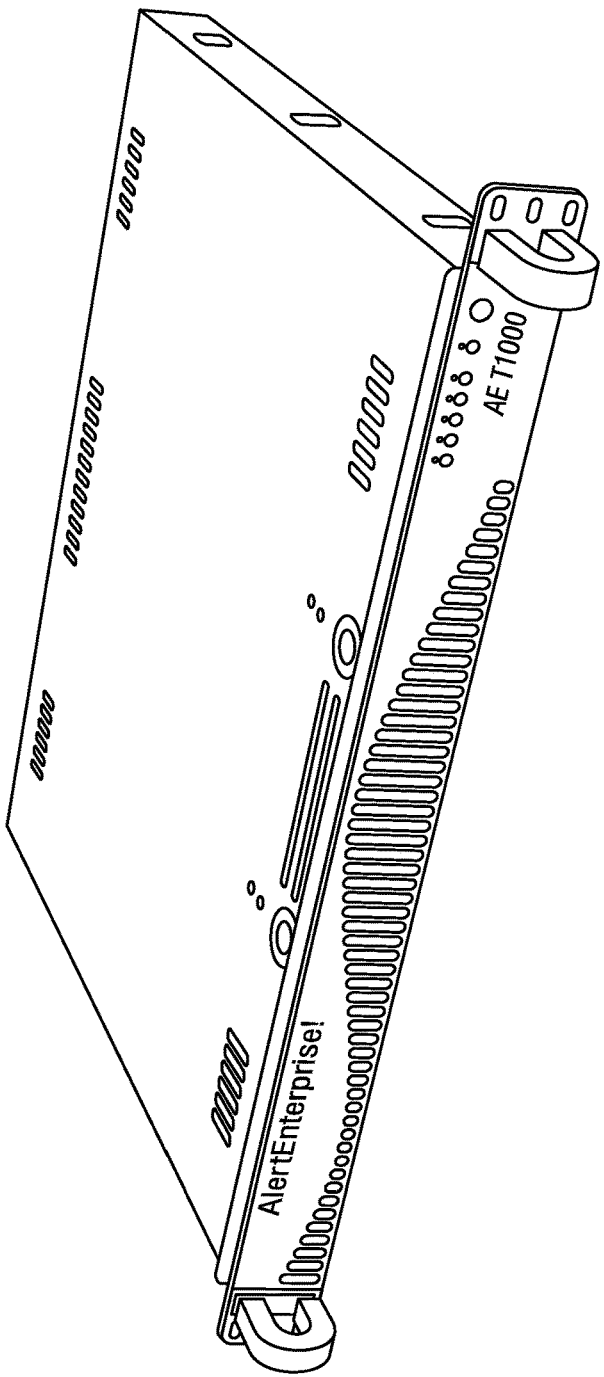
FIG. 3

Alert Enterprise

Request Category: New Access    User ID: Sbailey
First Name: Susan              Last Name: Bailey
Email: Sbailey@harwely.com     Telephone: 510-310-4536

| Details | Access | Risks (2) | Screening (5) |

Show ○ Systems (5) ● Roles (5)        [Add Roles(s)]   [Remove Roles(s)]

| | Role | Type | System | Action | From | To |
|---|---|---|---|---|---|---|
| ☐ | Reaction Floor Area | Physical | Facility Badging System | Add | 04/01/2009 | 04/02/2011 |
| ☐ | Ammonia Storage Zone | Physical | Facility Badging System | Add | 04/01/2009 | 04/02/2011 |
| ☐ | Modify PLC Settings | Logical Control Systems | Plant Distributed Control | Add | 04/01/2009 | 04/02/2011 |
| ☐ | Manage DCS 6 | Logical Control Systems | Plant Distributed Control | Add | 04/01/2009 | 04/02/2011 |
| ☐ | Manage Tier 2 substance | Logical | ERP System | Add | 04/01/2009 | 04/02/2011 |

[Approve] [Hold] [Forward] [Reject] [Evalute Risk]                           [Back]

2008© Copyright Alert Enterprise. All rights reserved.

AlertEnterprise!

| Home | Roles | Insight | Access | Risk Library | Action | Dashboards | Reports | Setup | Help |

Settings | About | Contact | Sign Out
Welcome AlertEnterprise Admin

Navigation
Role Repository

Modify Role

Details

* Role Name: Finance Manager Role    Role Type: Enterprise Role    Resource(s): Corp Active Directory, SAP PR1, GE Facility Badging    « Minimize

Description: Finance Manager Job/Enterprise Role    Resource Type: Corp Dir, SAP, PACS

Edit Resources

Steps (1) * Attributes    (2) * Authorization Data    (3) * Processes    (4) Relationships (5) Risks    (6) Policies    (7) Owners    (8) Audit Log « Minimize

[Interactive Visualization]

(1) Attributes

Long Description: Finance Manager Role with enterprise entitlements.

Role Sub-Type: Business ▽    Role Stage: Approved ▽

Role Level: High ▽    Organization: Alert Corp   ○

Status: Active ▽    Business process: Finance   ○

Role Alias: Fin_Mgr    Sub-process: P2P, O2C   ○

Location: San Francisco, CA   ○

[ Next Step >> ]

*Drill down report*

| AlertEnterprise | | | | | Settings \| About \| Contact \| |
|---|---|---|---|---|---|
| True Convergence of Physical and Logical Systems | | | | | |
| | | | | | Welcome AlertEnterpris |
| Home \| Dashboards \| Reports \| Risk Library \| Set Up \| Help | | | | | |

Reports
Provisioning
Risks
User Activity
Compliance

Roles

View [All Roles ▽] ~2502

| | Name _2506_ | Description _2508_ | Type _2510_ | Status _2512_ Search |
|---|---|---|---|---|
| ☐ | Vendor Master Creation | Finance Role for Vendor Creation Role | Single | Production |
| ☐ | General Ledger Display | Accounting display role for general ledger | Single | Development |
| ☐ | New Hire | Default Role for New Hire full time employees | Enterprise | Production |
| ☐ | Position Assignment | HR Role for employee position for assignment | Single | Production |
| ☐ | Inventory Scrapping | Material management role to order scrapping of inventory | Single | Production |
| ☐ | Warehouse Clerk | Facility and application access for warehouse clerk | Enterprise | Production |
| ☐ | Check Signing equipment | Physical access to the check signing equipment vault | Single | Production |

(2504 brackets the rows above)

ACTIVE POLICY ENFORCEMENT

CROSS REFERENCE TO RELATED APPLICATIONS

This patent application is a Continuation-In-Part of U.S. patent application Ser. No. 12/953,318, Method And Apparatus For Risk Visualization And Remediation, filed Nov. 23, 2010, now U.S. Pat. No. 8,769,412 which is a Continuation of PCT Application No. PCT/US10/57485, Method And Apparatus For Risk Visualization And Remediation, filed Nov. 19, 2010, which claims benefit of U.S. Provisional Patent Application Ser. No. 61/263,284, Alert Enterprise, filed Nov. 20, 2009, the entirety of each of which is incorporated herein by this reference thereto.

BACKGROUND OF THE INVENTION
TECHNICAL FIELD

This invention relates generally to the field of computer-related methodologies for handling complex risk and security challenges of an enterprise. More specifically, this invention relates to active policy enforcement for preventing, detecting, mitigating, and responding to blended risks and threats across IT, Physical and Operational domains, and various organizations within an enterprise, with an overall objective of protecting the critical infrastructure.

DESCRIPTION OF THE RELATED ART

Every industry has sensitive assets. For example, some critical assets for utilities may be devices running in sub-stations, devices running in nuclear plants and so on. Some assets may be physical, some may be operational systems such as the above-mentioned devices, and some may be information technology (IT) systems. Another example of an asset is a logic controller that controls, for example, how much gas may flow through a pipe. Smart grid systems such as smart meters are another example of an asset.

Assets need to be protected from threats. Examples of areas of risk or threats include, but are not limited to:
Physical and Cyber protection of Sensitive Assets & Intellectual Property
Blended threats that occur across IT, Physical and Operational domains
Sensitive Asset Diversion (Dangerous Chemicals, Pathogens, Nuclear material)
Cyber Attacks—Utilities (Water, Power, Gas), Smart Grids, Transportation
Terrorism (Chemicals stolen to make explosives)
Bio Terrorism (Food & Beverage, Consumer Products)
Fraud (Fake employees/contractors)
Insider Threat—Disgruntled employees/contractors (both current and past)

Thus, it would be desirable to provide a system and method that has the capability, including active policy enforcement, to look across the board of assets belonging to different organizations, e.g. within an enterprise, and apply policies and rules across the board, e.g. but not limited to across IT systems, physical systems, and industrial systems.

SUMMARY OF THE INVENTION

A method and apparatus is provided that includes techniques for providing complete solutions for role-based, rules-driven access enforcement, the techniques including active policy enforcement. An embodiment addresses blended risk assessment and security across logical systems, IT applications, databases, physical systems, and Operational technology systems in the context of threat and fraud detection, risk analysis and remediation, active policy enforcement and continuous monitoring. Further, an embodiment provides out of the box workflow rules that give the ability to add, modify, or delete the applicability parameters for policy enforcement.

BRIEF DESCRIPTION OF THE DRAWINGS

FIG. 3 is a diagram of an example appliance model, according to an embodiment;

FIG. 12 is a sample screen showing five roles to be added, according to an embodiment;

FIG. 13 is a sample screen showing how a user may track and log privileged access for IT applications as well as physical access to facilities and critical assets, according to an embodiment;

FIG. 14 is a sample screen for modifying a role, according to an embodiment;

FIG. 16 is a sample screen showing six views about particular security aspects for a particular individual, according to an embodiment;

FIG. 19 shows a sample screen shot of how users are allowed to select compliance frameworks from multiple authoritative sources when testing controls delivering a continuous compliance automation solution, according to an embodiment;

FIG. 25 is a sample screen shot of a particular drill down report for roles, according to an embodiment;

FIG. 38 is a sample screen shot of the compliance solution showing violations, according to an embodiment.

DETAILED DESCRIPTION OF THE INVENTION

OVERVIEW OF ARCHITECTURE AND INTERFACE

Figure 1:
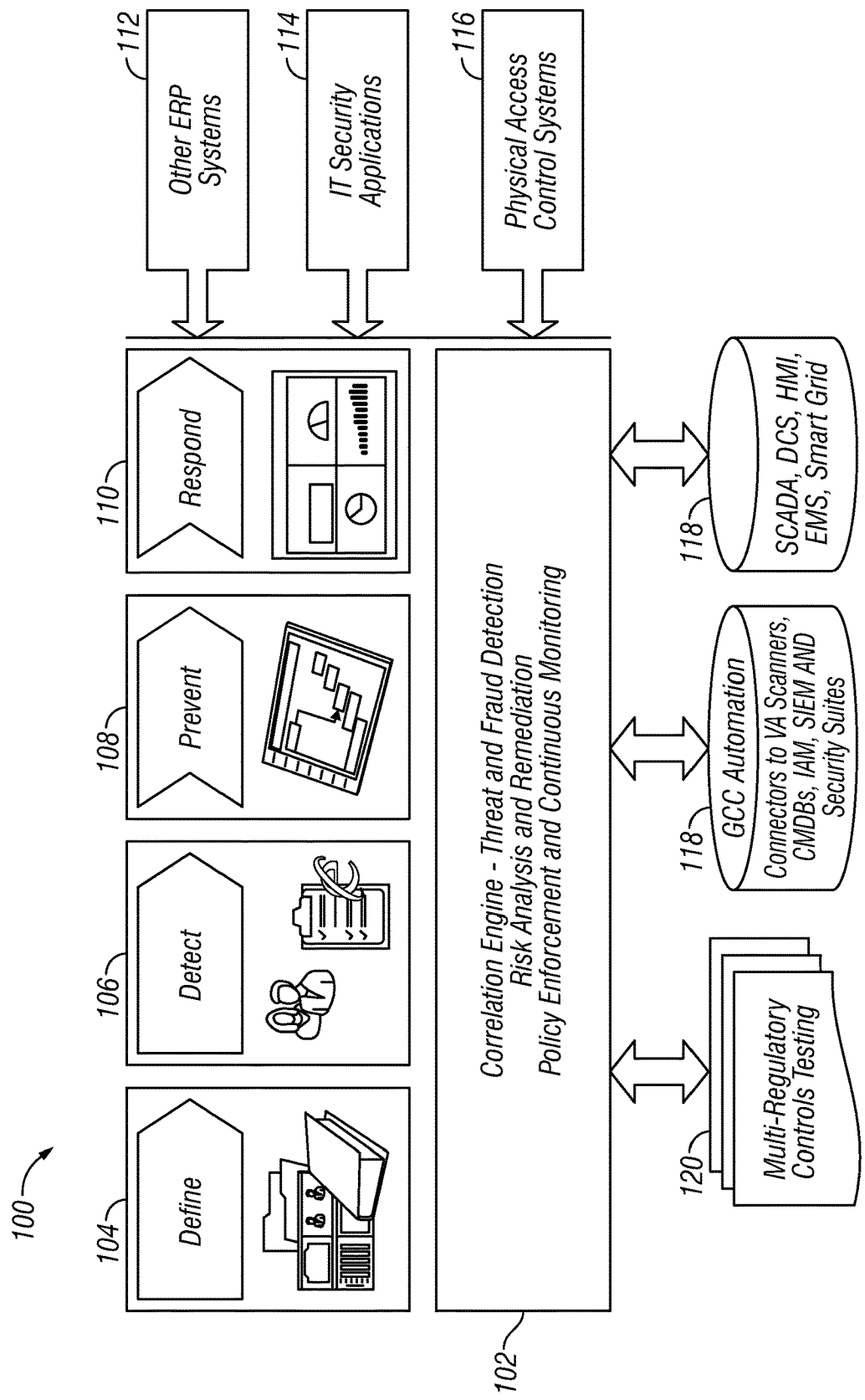
FIG. 1 is a schematic diagram showing an alert enterprise system and its relationships with multiple diverse systems, sources of security related data; according to an embodiment.

This section provides an overview of one or more embodiments for understanding the claimed subject matter. Further detailed discussions are presented in the sections that follow thereafter.

Introduction

An embodiment provides a solution for Incident Management, Critical Infrastructure Protection, Command and Control Challenges, such as, but not limited to, those presented below:
  Sophisticated Attack Trajectory
    Threats that leverage the weakest links
    Blended Attack Vectors
    High probability of malicious Insider
    Advanced Persistent Threats
  Geographically Dispersed assets/locations
    Guards with guns—expensive and not cost-effective
    Impossible to cover all locations
    Putting guards/employees at unnecessary risk
  Three-ring binders approach—not suitable for modern times
    Being up against Organized and State Sponsored Crime
    Response has to be instant and appropriate
  Audit trail of incident management—very important
    How incident was handled—to learn from mistakes for future
    Making sure no one took advantage of an emergency
    Monitoring activity in real-time
  Leveraging investments in technology
    Non-lethal weapon systems (rubber bullets, sticky foam, non-lethal gas)
    Cameras, sensors, alarms, physical access control systems, etc.

An embodiment provides an enterprise security apparatus and methodology that bridges an overlooked gap in enterprise security, i.e. prevention and detection of cross-enterprise threats by linking physical access, Information technology (IT) & Operational Technology (OT). An essential aspect of this is Active Policy Enforcement, which ensures that policies are embedded and enforced as part of the various processes. An example is Employee On-Boarding/Off-Boarding. Active policy enforcement provides a method to enable and embed risk analysis and compliance/checks before provisioning the user. An embodiment provides capabilities for visualizing previously undetectable threats and assists enterprises in remediating security risk across the enterprise.

Monitoring both Access and Behavior

An embodiment provides capabilities to monitor both access and behavior. For example, an embodiment monitors the following:
  Whether the right people have access to assets, e.g. job, certifications, background
  Any suspicious behavior or activities
  Personal access certifications and credential expiration and timely revocation of the access
  Monitoring Privileged Users and "Access Creep"
  Predictive Analytics to predict early warnings of anomalous behavior Industry Specific Compliance An embodiment provides mechanisms for industry specific compliance and standards, such as for example, but not limited to:
  NERC, FERC, FISMA, PCI, HIPAA, CFATS, etc.

Capabilities

An embodiment integrates IT and physical security across diverse systems, applications, databases and geographically distributed assets. An embodiment provides a risk management capability that follows a three-step process that aggregates blended threats from IT systems, Physical Security Systems and Operational Systems to uncover previously undetectable threats and risks.

An embodiment provides the following capabilities:
Risk analysis across all three domains: IT, physical, and Operation Technology/industrial control systems
Detect, identify and eliminate risks before they manifest
True prevention of threats from thefts, sabotage and terrorism
Incident management & Situational Awareness with built-in programmed remediation
Compliance to various regulations/industry standards Delivered Solutions An embodiment provides, but is not limited to, the following solutions:
Rules-driven risk prevention for cross-enterprise access security and activity/behavior
Real-time monitoring and correlation of IT and physical access events for timely detection, alerting and response to security violations.

For Corporations

Figure 6:
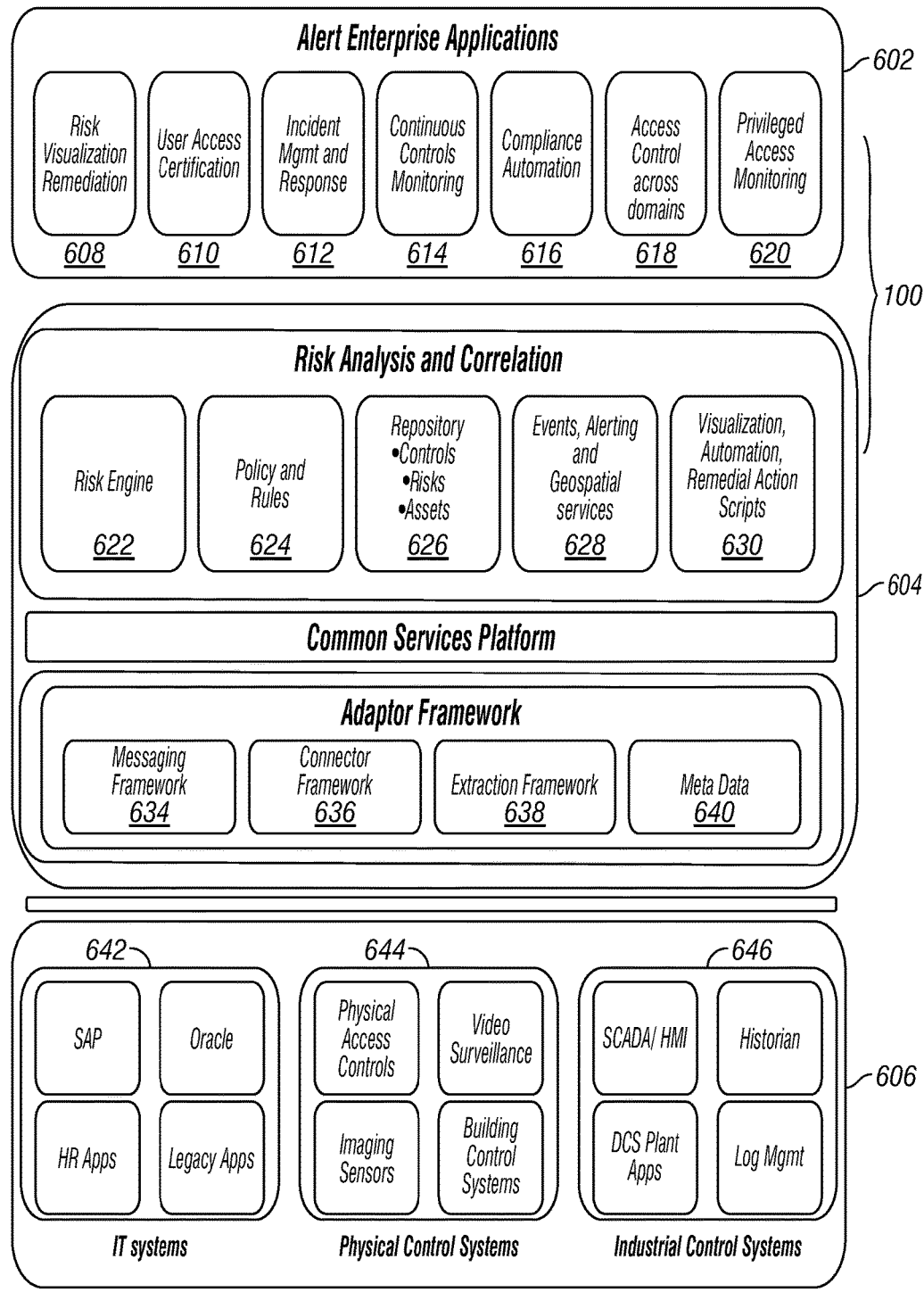
FIG. 6 is a schematic diagram showing an alert enterprise system and its components and shows external systems with which alert enterprise system is in communication, according to an embodiment.

An embodiment allows corporations the ability to perform the following. It should be appreciated that such list is by way of illustration and is not meant to be limiting:
Perform blended risk analysis to detect and prevent cross-enterprise threats
Predictive Analytics
Monitor and correlate user access events displayed on a geo-spatial map
Embed policy enforcement in particular processes such as employee on-boarding, off-boarding, and change Exemplary Alert Enterprise System Embodiment An embodiment of an alert enterprise system 100 can be understood with reference to FIG. 6. FIG. 6 is a schematic diagram showing an alert enterprise system 100 and its components and shows external systems 606 with which alert enterprise system 100 is in communication, according to an embodiment.

Alert enterprise system 100 contains a connector framework that provides an open and pre-defined set of data connectors (connector types) to gather data for each solution through the data controller. It also provides the ability for outgoing information though the service controller by enabling SMS, Email or voice messages. The data may be collected through relational databases, XML, RSS, PI, Excel, ERP applications (i.e. Asset management, Workforce management, Outage management, Network management, and Customer Billing), Geo and Custom data feeds. The frequency of the data updates may be modified through a design module. The data connectors are the gateways between the alert enterprise system 100 and the underlying source systems such as ERP systems, physical access systems, control systems, and other legacy systems. The connector framework does support various industry standard protocols and interfaces like Web Services, HTTP, TCP/IP, JDBC/ODBC, file interfaces, natively built scripts and programming API's to extract the data from the source systems for Access Reviews, Risk Analysis, Controls Monitoring, etc. The data may be synchronized from the source systems to alert enterprise system 100 solutions in many ways. Some of such ways are, but are not limited to (a) batch mode—extracts the data in predefined frequency, (b) real-time connectivity from the source systems for on need basis look up for the data, and (c) event mode in both push and pull methodologies depends on the need. Alert enterprise system 100 may also support agent base, e.g. install natively built APIs/programs, and agent less, e.g. direct reads, leveraging industry standard interfaces and protocols. The data may also sync up in full mode or incremental.

Alert enterprise system 100 contains one or more applications 602, as well as a common services platform 604. The set of one or more applications 602 may contain a risk visualization and remediation subsystem 608, a user access certification subsystem 610, an incident and management response subsystem 612, a continuous controls monitoring subsystem 614, a compliance automation subsystem 616, an identity and access governance across domains subsystem 618, and a privileged access monitoring subsystem 620.

Common services platform 604 contains one or more risk analysis and correlation engines, services, and scripts and one or more adaptor framework components. In the embodiment, common services platform 604 contains a risk engine 622, a policy and rules engine 624, controls, risks, and assets repository 626, events, alerting and geospatial services 628, and visualization, workflow engine, automation, and remedial action scripts 630. In the embodiment, common services platform 604 contains a messaging framework 634, a connector framework 636, an extraction framework 638, and a meta-data repository 640.

According to the embodiment, some example systems of external systems 606 with which alert enterprise system communications are IT systems 642, physical control systems 644, and industrial control systems 646. A couple of examples of IT system 642 are SAP, Waldorf, Germany, and Oracle Corporation, Redwood Shores, Calif. A couple of examples of physical control systems 644 are imaging sensors and building controls systems. A couple of examples of industrial control systems 646 are Supervisory Control and Data Acquisition (SCADA) systems and Distributed Control System (DCS) plant applications. It should be appreciated that such examples are illustrative only and are not meant to be limiting.

Another Alert Enterprise Embodiment—Marketing Perspective

Figure 7:
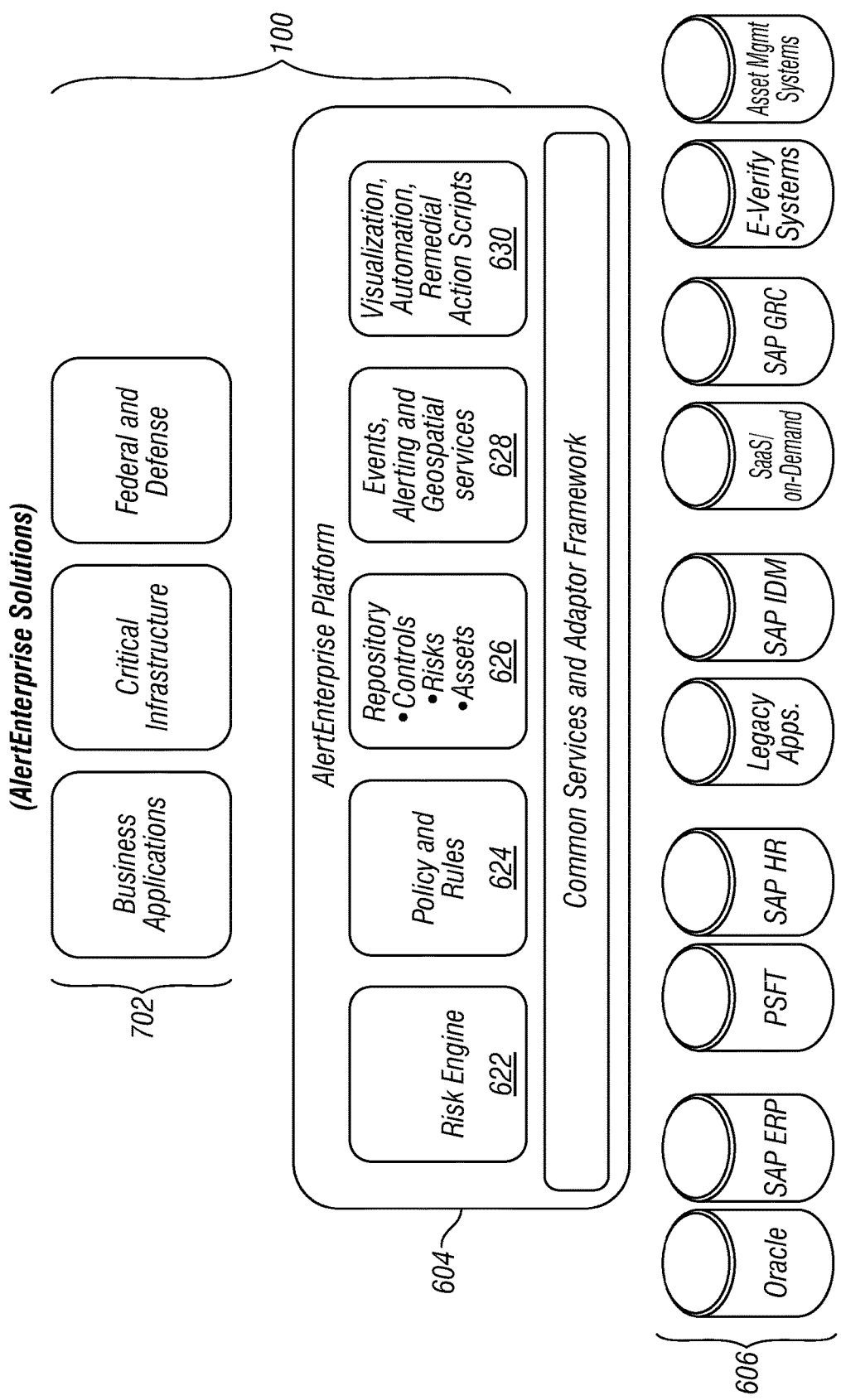
FIG. 7 is a schematic diagram showing alert enterprise system and its components and shows external systems with which alert enterprise system is in communication, according to an embodiment.

An embodiment of alert enterprise system 100 from a marketing perspective can be understood with reference to FIG. 7. FIG. 7 is a schematic diagram showing alert enterprise system 100 and its components and shows external systems 606 with which alert enterprise system 100 is in communication, according to an embodiment. In this embodiment, alert enterprise system 100 contains one or more subsystems 702 that provide solutions for applications in the business sector, solutions for infrastructure that may be critical, and federal solutions as well as solutions for national defense.

As well, the embodiment contains common services platform 604 that contains one or more of the same engines, repositories, and scripts as shown in FIG. 6, the description of which is not repeated here. Further, common services platform 604 contains a messaging framework 634, a connector framework 636, an extraction framework 638, and a meta data repository 640 as shown in FIG. 6.

Product Modules

An embodiment provides an architecture that supports an agnostic and adaptable nature of such system. One or more embodiments may be captured in one or more products, examples of which are discussed hereinbelow. It should be appreciated that the particular products discussed hereinbelow are for illustrative purposes only and are not meant to be limiting.

AlertAccess and AlertIdentity: An embodiment provides a subsystem, which may be referred to herein as Alert-Access and AlertIdentity, that provides rules-driven and policy-compliant user access management and provisioning across the enterprise, analyzing risk across all IT applications, physical systems, and the network.

Such subsystem is architected to take advantage of existing Segregation of Duties (SoD) engines for Enterprise Resource Planning (ERP) applications and provide an enterprise view for access control exposure across the enterprise.

AlertInsight: An embodiment provides a subsystem, which may be referred to herein as AlertInsight, which is a highly visual computer-implemented system solution with powerful graphical modeling capability to remediate risk and user access violations from a common user interface in a single screen session. The subsystem promotes alignment between business and IT functions and includes data from multiple sources, different ERP systems, Identity and Access Management, Corporate Directories, HR systems, and even GRC applications; all displayed in a business-friendly context.

AlertAction: An embodiment provides a subsystem, which may be referred to herein as AlertAction, which provides geo-spatial monitoring and remediation of cross-enterprise threats, serious acts of sabotage/terrorism, fraud and theft etc. Such subsystem provides capabilities to co-relate seemingly innocent events and activities to detect real threats and risks, while providing powerful alerting and automated Remedial Action Strategies (RAS) for decisive action.

AlertCertify: An embodiment provides a subsystem, which may be referred to herein as AlertCertify, which provides a highly visual computer-implemented system solution with powerful graphical modeling capability to completely automate, monitor and track the numerous re-affirmation projects that risk and compliance analysts, IT security and business managers must complete. Additionally re-affirmation tasks are set up as individual projects with business and IT stakeholders identified. Such subsystem automates the scheduling, the frequency and the levels of workflow within the subsystem.

AlertControls: An embodiment provides a subsystem, which may be referred to herein as AlertControls, which is an enterprise-level computer-implemented system that allows companies to conduct multiple assessments simultaneously, test controls across multiple regulations, include human response via e-surveys, automate testing of controls and leverage built-in configurable workflow to adapt to existing organizational structures and business processes.

AlertMonitor: Active Policy Enforcement, Enterprise Continuous Monitoring, Controls and Risks automation, risk analysis capabilities through automation of rules and Predictive Analytics.

AlertWatch: An embodiment provides a subsystem, which may be referred to herein as AlertMonitor, which is a multi-domain, multi-platform privileged user management application. Such subsystem enables organizations to automate the monitoring of individuals entrusted with the most critical access in the organization. Auditors and regulators have stepped up the focus on closing this gap. Thus, such subsystem enforces least privilege principle in an organization and ensures that business is run with minimal risk even when privileged critical access is used in an operational environment. Such subsystem delivers compliance with various regulations and monitoring of supervisory access across IT and physical access control systems.

AlertRoles: An embodiment provides a subsystem, which may be referred to herein as AlertRoles, which is a cross-systems role management and mining subsystem.

Alert Enterprise Platform

An embodiment provides common services platform 604 that provides and performs some of the underlying functionality of alert enterprise system 100. Particular components of alert common services platform 604 are discussed in no particular order hereinbelow.

Data Connectors: An embodiment provides an open and pre-defined set of data connectors, e.g. connector types, to gather data for each solution through a data controller. The embodiment also provides the ability for outgoing information though the service controller by enabling SMS or Email. The data may be collected through relational databases, XML, RSS, PI, Excel, ERP applications, such as Asset Management, Workforce Management, Outage Management, Network Management, and Customer Billing, and Geo and Custom data feeds. The frequency of the data updates may be modified through a designer, such as one provided by AlertEnterprise, Fremont, Calif. The Data Connectors are the link between alert enterprise system 100 and the underlying systems 606 such as ERP systems, Physical access systems, Control systems, and other legacy systems. All the communication that occurs is done by the pre defined customizable data connectors.

Process Engine: An embodiment provides a process engine that is used to develop solution specific workflows in the application and customize the scenarios for specific business needs. For example, an embodiment may provide simple the drag & drop method in a wizard setup format to develop specific workflows to meet with variety of requirements. Process engine manages the system workflows. Administrators may define new workflows as well as modify existing workflows. A workflow defines the number of stages during the completion of the tasks and various actor(s) involved at each stage. Each workflow has a set of conditions on which it is initiated. When the attributes of a user request match with the initiator conditions of a business process workflow, that business process is selected for the request. For example, if the request type is New Hire and department is Finance then the business process workflow to be followed is HiringWorkflow.

Security: In an embodiment, alert enterprise system 100 provides inbuilt security and user management to enable application access, based on roles and privileges. Alert enterprise system 100 maintains security across the organization. This means a user may view functions, controls, control sets, mitigation controls only for the organization to which he/she belongs. Embodiments may provide access protection via an administration password, a database password, default passes and so on.

Reporting: An embodiment provides a reporting tool to generate the reports after analyzing the data from the underlying systems. The reporting tool may allow the user to create custom reports and to plug in the external reports. In an embodiment, compliance automation is facilitated using prescribed formats, such as NERC CIP format, CFATS etc.

Scheduling: An embodiment enables a user to get information about scheduled data synchronization jobs. The user may create the jobs and schedule the jobs according to business or other particular needs and perform the desired operation accordingly. For example, a provided interface may provide one screen hot spot to get information about the jobs scheduled for risk analysis, extractor, rule engine, mitigation, etc. For example, a user may scheduling risk analysis on a weekly basis.

Event Management: An embodiment provides event management capability that captures the events from various sources such as ERP, weather feeds, and security alerts.

Policy engine: An embodiment provides a policy engine that follows a pre-defined business process workflow for manual as well as automated completion of tasks of the organization. It may be the responsibility of the administrator to define the workflow as per the needs and management structure of the organization.

Video analytics: An embodiment provides a video analytics subsystem that provides an ability to continuously monitor video feeds from multiple cameras. Video analytics helps the authority to track what exactly is happening at a particular location. The video feed may be seen live and accordingly the manager may make a decision, whether the particular situation is considered a risk or not.

Risk analysis services: Alert enterprise system 100 provides risk analysis services and the rules and compliance standards that the company may need to follow are part of these services. The risk engine compares these set rules with the actions being performed in the system. If any of the rules is violated the system identifies the particular action as a risk and notifies the administrator.

Geo spatial services: An embodiment provides a geo spatial service that is manifested as a subsystem that helps in tracking down the risk to a particular geographical location. This module provides the inside view of what exactly is happening at the site where the risk is detected. In an embodiment, such subsystem is actively used in the subsystem, AlertAction, which may be specifically designed for drilling down the location where risk is reported. This service may be actively used for risk monitoring and remediation that provides geospatial remediation of cross-enterprise threats, cross-application and cross-subsystem threats, serious acts of sabotage, terrorism, fraud and theft, etc. such geo spatial services co-relates seemingly innocent events and activities to detect real threats and risks and generates powerful alerting and automatic remedial action strategies for decisive action.

Workflow services: In an embodiment, a designed workflow is a part of the process engine. The workflow may be designed according to the company structure. It is according to the workflow defined in alert enterprise system 100 that the managers are notified. In response to such notification, the managers act accordingly on the desired task. The administrators may define new workflows as well as modify the existing ones. A workflow defines different stages of task groups. Each task groups may contain one or more tasks. Each task has a task owner and each task group has a task group owner. Such owners are the actors who act at different remediation tasks of the remediation task group. Each workflow has a set of conditions on which the workflow is initiated. When the attributes of a user request match with the initiator conditions of a business process workflow, that business process is selected for the request.

Database Repository: an embodiment provides a database repository and subsystem that collects the information that is archived. Alert enterprise system 100 extracts the information from the underlying system, which is then analyzed for the risks and then archived to the database.

Technical Capabilities

Following are particular technical capabilities provided by an embodiment.

Automated Control Testing and Multi-Regulatory Compliance Management

Built-in repository of common controls to support multiple regulations and frameworks Controls mapped to risks and vulnerabilities to prioritize and help in risk mitigation Common rule sets defined in flexible rule engine Automated case management to help remediate the risk violations Ease of use of the workflow to support the compliance, controls, remediation and the approval process Integration with Multiple Enterprise Resource Planning (ERP) Systems and Business Process Automation An embodiment allows integration with multiple ERP systems and business process automation, e.g.:

Out of the box integration with enterprise systems, such as, for example, those provided by SAP, Waldorf, Germany, and Oracle Corporation, Redwood Shores, Calif.

Integration with the human resources (HR) applications, e.g. SAP and PeopleSoft now by Oracle Corporation Integration with Physical Access and Control Systems (PACS) for physical access control monitoring Integration with IT Security Automation An embodiment allows integration with IT security automation, such as, but not limited to, the following, for example:

Identity and Access Management

Lightweight Directory Access Protocol (LDAP) and Active Directory

Configuration and Change Management Solutions

Access logs and provisioning history

Security Incident Management and Event Management

Data Loss Prevention and Content Filtering

Integration with Physical Security and Physical Access Control Systems

An embodiment allows integration with physical security and physical access control systems, such as, but not limited to, the following:

Integration with building control and card access systems

Access Card Provisioning and De Provisioning

Integration with video surveillance and biometrics

Integration with radio frequency identification (RFID) technology, sensors and control systems Integration with Operational Technology Systems An embodiment allows integration with Operational Technology (OT) systems, such as, but not limited to, the following:

Integration with SCADA systems

Integration with Distributed Control System (DCS)

Integration with OT devices such as Programmable Logic Controllers (PLC), Remote Terminal Units (RTU)

Risk Analysis Engine to Render Risk Following Detection of Blended Threats

An embodiment provides an engine that analyzes data from diverse systems across the enterprise for rendering risk following the detection of blended threats, such as for example, but not limited to, the following:

Detect and control threats and risk from logical, physical and control systems

Aggregate threats from IT security, Physical Access and Control Systems

Accept external feeds, e.g. iDefense Labs by VeriSign, Inc. in Sterling, Va., National Vulnerability Database (NVD); by the National Institute of Standards and Technology, United States of America, and other threat sources for correlation and risk mapping Fetch access and control violations from a variety of sources An embodiment provides an architecture that supports the convergence of IT security, physical access controls, and industrial control systems to uncover blended threats and can be understood with reference to FIG. 1. FIG. 1 is a schematic diagram showing alert enterprise system 100 and its relationships with multiple diverse systems, sources of security related data, according to an embodiment. Alert enterprise system 100 contains a correlation engine 102 that performs the following functions, but is not limited to the following functions: threat and fraud detection, risk analysis and remediation, policy enforcement and continuous monitoring. Alert enterprise system 100 provides a process by which a user, such as a representative of a particular alert enterprise system, provides the definitions of particular risks, threats, and fraud 104. Further, given the defined definitions, such process provides for detecting the particular risks, threats, and fraud 106. As well, such process provides for preventing the defined risks, threats, and fraud 108. Further, in response to detecting the particular risks, threats, and fraud, such process provides for responding to such particular risks, threats, and fraud 110.

Alert enterprise system 100 is in communication with other ERP systems 112, with IT security applications 114, and with physical access control systems 116.

Also, alert enterprise system 100 is in communication with data repositories that store security also diverse data from data sources. Such data may include, but are not limited to, regulatory data, security data, utilities data, industrial data, logic controller data, compliance data, corporate IT data, and other types of data from diverse organizations 118.

Alert enterprise system 100 also provides for multi-regulatory controls testing 120.

Thus, alert enterprise system 100 supports the convergence of IT security, physical access controls and industrial control systems to uncover blended threats.

Integration Framework

An integration framework is provided for integrating alert enterprise system 100 to logical systems, physical and control systems, and meta data.

Logical: A logical integration framework is provided. In an embodiment, logical integration framework is a layer in alert enterprise system 100 that is configured to attaching alert enterprise system 100 to external systems, such as, but not limited to, SAP, Oracle, SAAS systems, e-Verify systems by the United States Citizenship and Immigration services, and legacy systems. In an embodiment, alert enterprise system 100 is in communication with such external systems through connectors, which extract data from underlying systems of the external systems.

Physical: In an embodiment, alert enterprise system 100 provides a physical system integration framework that enables alert enterprise system 100 to interact with physical systems, such as but not limited to Physical Access Card System, Industrial Control Systems, Video Surveillance Biometric Systems and the RFID Integration Servers. Thus, physical system integration framework that enables alert enterprise system 100 to extract data from underlying systems of such physical systems and analyzes the data for risks.

Control systems: In an embodiment, alert enterprise system 100 interacts with control systems via direct integration with SCADA/HMI systems, Integration through Historians/Middleware or Integration through Log Management Systems. Control Systems include SCADA (Supervisory Control and Data Acquisition) systems, DCS (Distributed Control Systems) etc. The embodiment is capable of receiving events (e.g. change of device settings, Alteration of Alarm Hi/Lo settings, Disabling of protection systems/Alarms, etc.) and correlate with other enterprise events obtained from the other sources to calibrate and detect Risk Incidents.

A meta data framework is provided that allows mapping with source/target systems and data fields into the product. In an embodiment, alert enterprise system 100 extracts data from the underlying systems and saves such extracted data for risk analysis. The underlying data are mapped to the corresponding fields of alert enterprise system 100, as defined by an administrator.

Risk Analysis

In an embodiment, a risk analysis engine ("correlation engine", not shown) is provided within alert enterprise system 100 that allows complex event processing on a spatial and temporal phenomenon. The engine registers events along with user defined filters. As the user defined event is triggered, the engine starts the processing and automatically analyzes the event and the analysis of such event within a defined correlation matrix In an embodiment, an alert enterprise simulation engine (not shown) is provided. Processing, planning, and simulations are based on the alert enterprise simulation engine for predictive processing and analysis. Such alert enterprise simulation engine provides statistical analysis that may be used for financial and risk mitigation, within geo-context sensitive and interactive dashboards.

Integration with External Sources Solutions

Alert enterprise system 100 enables easy integration with various data sources in an enterprise. In an embodiment, alert enterprise system 100 enables users to view and analyze data in a security and risk management context by providing a visual analytics and by initiating the workflow and business intelligence, and remedial action schemes and workflow processes.

It should be appreciated that the solutions that may be provided to a customer may be limitless, as alert enterprise system 100 may be only dependent upon the data it collects. In an embodiment, alert enterprise system 100 reads such data, presents visualization of such data, and through customer defined rules and requirements builds an RAS to help solve a specific business problem.

Below is an example of a solution deployed in various forms by alert enterprise system 100.

Example: Enterprise Asset and Service Management Solution

It should be appreciated that in such example and according to an embodiment, alert enterprise system 100 collects data from the following:

Field Information
SCADA
Historian
OMS

Asset Data
  EAM
  Outage Management
  OMS
  Asset Status
Customer Care
  CIS/Trouble tickets
Workforce Data
  WFM
  Qualification/scheduling data
Other data
  Vehicle tracking
  Environmental data (Fire, Hurricane, weather, Earthquake)
  Traffic In accordance with an embodiment, the data above are collected by alert enterprise system 100, are seamlessly integrated, and presented in visualization in a geo-spatial canvas. A user may be then able to view such data in various layers, assess the situation of geographic data at any location in real-time, be alerted (e.g. by visual, SMS, email) of a situation, analyze the situation, rubber band a specific location to perform what-if analysis, take automated remedial action, and also file a complaint report to ensure regulatory compliance.

Alert Enterprise System Landscape

Figure 2:
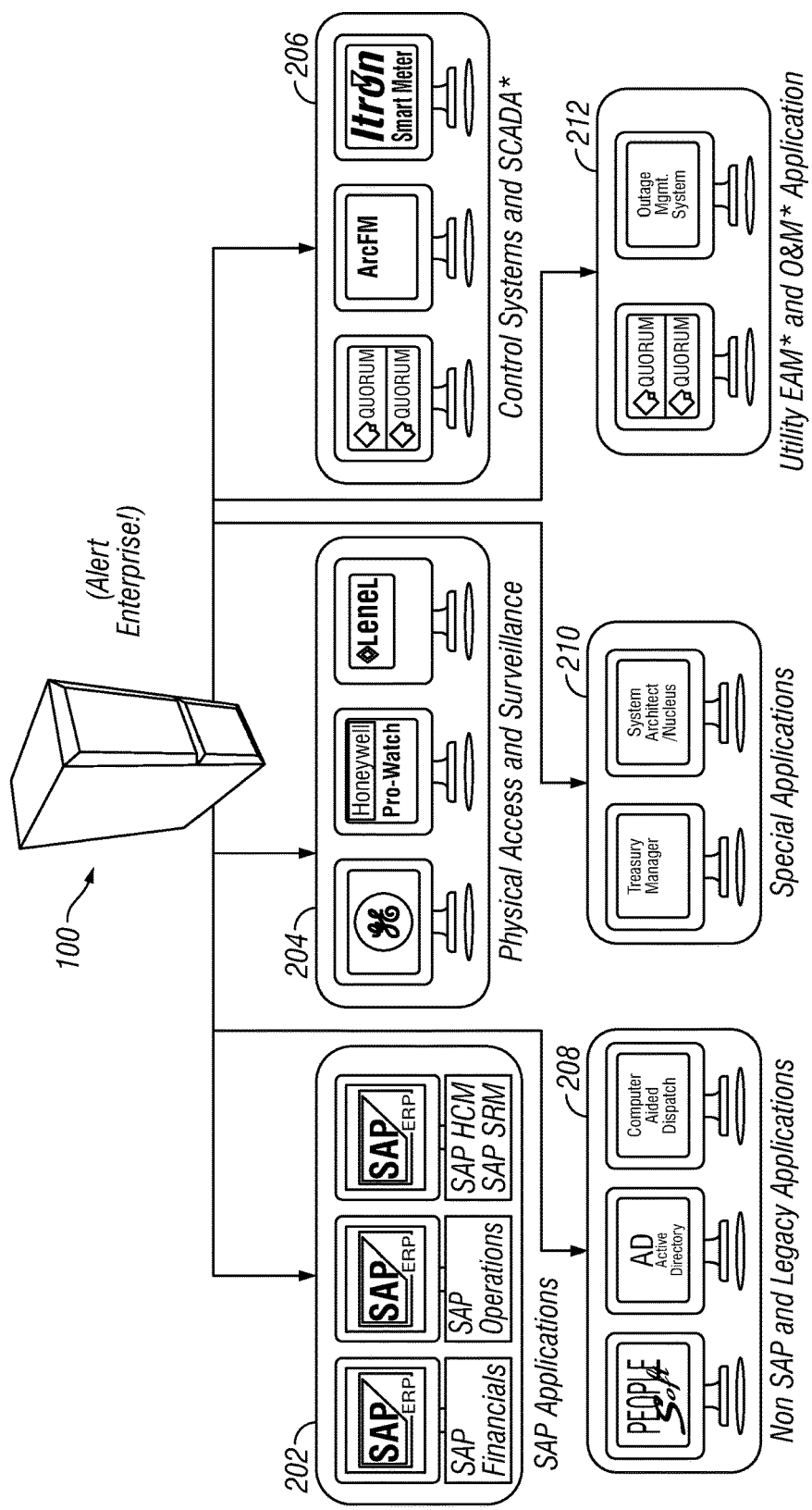
FIG. 2 is a schematic diagram showing an alert enterprise system in communication with other external systems, according to an embodiment.

An embodiment provides a three tier architecture, which may be based on JAVA technology. An embodiment can be understood with reference to FIG. 2, a schematic diagram showing alert enterprise system 100 in communication with other external systems. Alert Enterprise system 100 may connect to different systems, for example but not limited to, SAP Applications 202, physical access and surveillance systems 204, control systems 206, non SAP and legacy applications 208, special applications 210, and utility EAM and O&M applications 212. System 100 connects to these applications via connectors and extracts the data from underlying applications. Then the data are analyzed through risk assessment, unifying security and compliance processes.

Deployment Module

Alert enterprise system 100 may be deployed on various deployment models, such as, but not limited to:
  Single node
  Multiple node for load balancing
  Cluster node for scalability Each model may be defined based on the following requirements:
  On premise deployment
  Applicant model
  SaaS (On demand/hosted)

An example of an appliance model according to an embodiment is shown in FIG. 3.

Adaptor Framework

An embodiment provides a connector framework that provides adapters as part of a connector library for connection to various systems, databases, historians and web services. The adaptor framework supports the following:
  Real-Time Data Bus, which is a high speed connection pool typically for real-time or near real-time data streamed to the system, such as PI, SCADA, etc.
  Enterprise Information Bus, as a connection for the data communication of enterprise data such as business data from enterprise systems such as EAM, WFM, etc. as well as native databases
  Support offline and real time extraction
  Agent and agent-less connection for the underlying system Application Servers An embodiment provides servers defined as logical servers, which may be implemented in a distributed mode or a single server mode, based upon customer requirements, such as amount of data, performance criteria, number of users, number of scenarios, etc.

An embodiment provides a persistence database, such as an Oracle or SQL compliant database, which may house the data used for risk analysis and reporting. The persistence layer is used for storage of configuration data and application data model for the alert enterprise system 100. User preferences and roles are also stored in this database.

An embodiment provides a multi-server cluster framework dedicated to the spatial and temporal processing. In large scale deployment, the cluster scenario may be used to support load balancing and high availability in case of failure. The number of servers required for the processing may be dependent upon the amount of data, scenarios, and the performance required by the customer, with a minimum of one server efficient for a particular number of customers with no maximum limit on the number of servers.

An embodiment provides a risk engine 622 that manages the correlation of user access and activity events with a risk/rule library. Alert enterprise system 100 may be configured to automatically initiate a workflow action when potential security and compliance risk are detected.

Application Programming Interface

In an embodiment, alert enterprise system 100 includes a series of Application Programming Interface (API) which specifies the data characteristics from the sources to ensure quick and easy integration with the system. Each of the APIs is categorized for each specific solution integration, as follows. It should be appreciated that such list is for illustrative purposes and is not meant to be limiting.

Work Management Integration
    Service Notifications, Service Orders, Work Requests
    Service Dispatches, Service Assignment, Scheduling, Load Forecasts
    Estimated Restoration time Calculations
  Qualification Management Interface
    Skill-set & Qualification matching, Mobile Workforce integration
    Assignment of service engineers and spare parts to work orders
  Enterprise Asset Management Interface
    Inventory of Equipments, Bill of Materials and Measurement Documents
    Inventory of Service Logs, Failure History, and FMEA analysis
  Environmental Interfaces
    Traffic feeds and Vehicle tracking for Field Service Scheduling
    Fire, Earthquakes, Weather, Hurricane feeds for Situational awareness
    Predictive path analysis of natural events like hurricanes
    Impacted Asset Analysis—Cost-to-Serve analysis
  Asset Maintenance Interface
    Asset Revaluation—Identification of defective assets
    Preventive Maintenance, Condition based maintenance and Scheduled Maintenance
    Failure pattern prediction and recognition
    Estimated Restoration time Calculations Customer Care and Trouble Ticket Interface
  Inbound calls, trouble tickets
    Integration with outcall dispatching system for service tracking
    SAIDI, SAIFI, etc—Customer disruption analytics
  Analysis of Economic impact by customer type
SCADA Field Device Integration
  Integration with Historian/SCADA devices for real time process feeds
  Notification Alerts for violations of operating thresholds
Remedial Action Scheme and Compliance Reporting
  Automatic NERC/FERC reporting on operating threshold violations
  Remedial Actions for Instant Process workflow on critical issues
Wide Area Management (WAM) Interface
  Alerts and notifications for wide area frequency and Phase deviations
  Islanding Zone identification derived from threshold calculations
  Root Cause Analysis with full-context temporal playback
Transmission and Distribution Asset Reliability
  Identification of aging and below-par assets
  Remedial action scheme for replacement of worn assets
  Upstream and downstream impact analysis
Smart Metering and Demand Response Interface
  Simulation of remote shutdown, disconnect operations
  Load shaping analytics by price points, weather patterns and appliance types
Human Resource System Integration
  On Boarding/Of boarding
  Change in Position
  Qualification
ERP (For example—SAP)
  User
  Roles
  Authorization
  User Activity and transaction log
  User Information
Physical and Cyber Security Risk Analytics
  Feeds from Access Control Systems for instant identification of Physical threats to Critical Infrastructure components
  Live video feeds at key infrastructure facilities provides visual threat identification
Risk, Vulnerability and Liability Exposure Analysis
  Risk Exposures arising from asset failures, malfunction and reliability loss
  Liability exposure arising from outages or vulnerable assets
Physical Access Control Systems Integration
  Badge
  Users
  Access levels
  Users Activity and access log
  User information
Data Sources
  In an embodiment, data sources for alert enterprise system 100 may include, but are not limited to:
  Excel, CSV, XML files
  Database
  RSS feeds
  Web services
  HTTP
  XML
  PI
  EAM, WFM, OM, etc. from various vendors such as SAP, Oracle, Ventyx, Click Software, etc.
  GIS
  Custom
  KML data
  Further, data sources included in the connector library are listed below but are by no means limited by the list below. For example, such list of data sources may be from integrating with third party and partner solutions. It further should be appreciated that such list grows as more data sources are integrated into alert enterprise system 100 based on customer requirement.
  Integration with third party/partner solutions
  SAP GRC
  IDM
  Log Management System (e.g. Splunk)

An Exemplary Alert Enterprise System Embodiment

Figure 4:
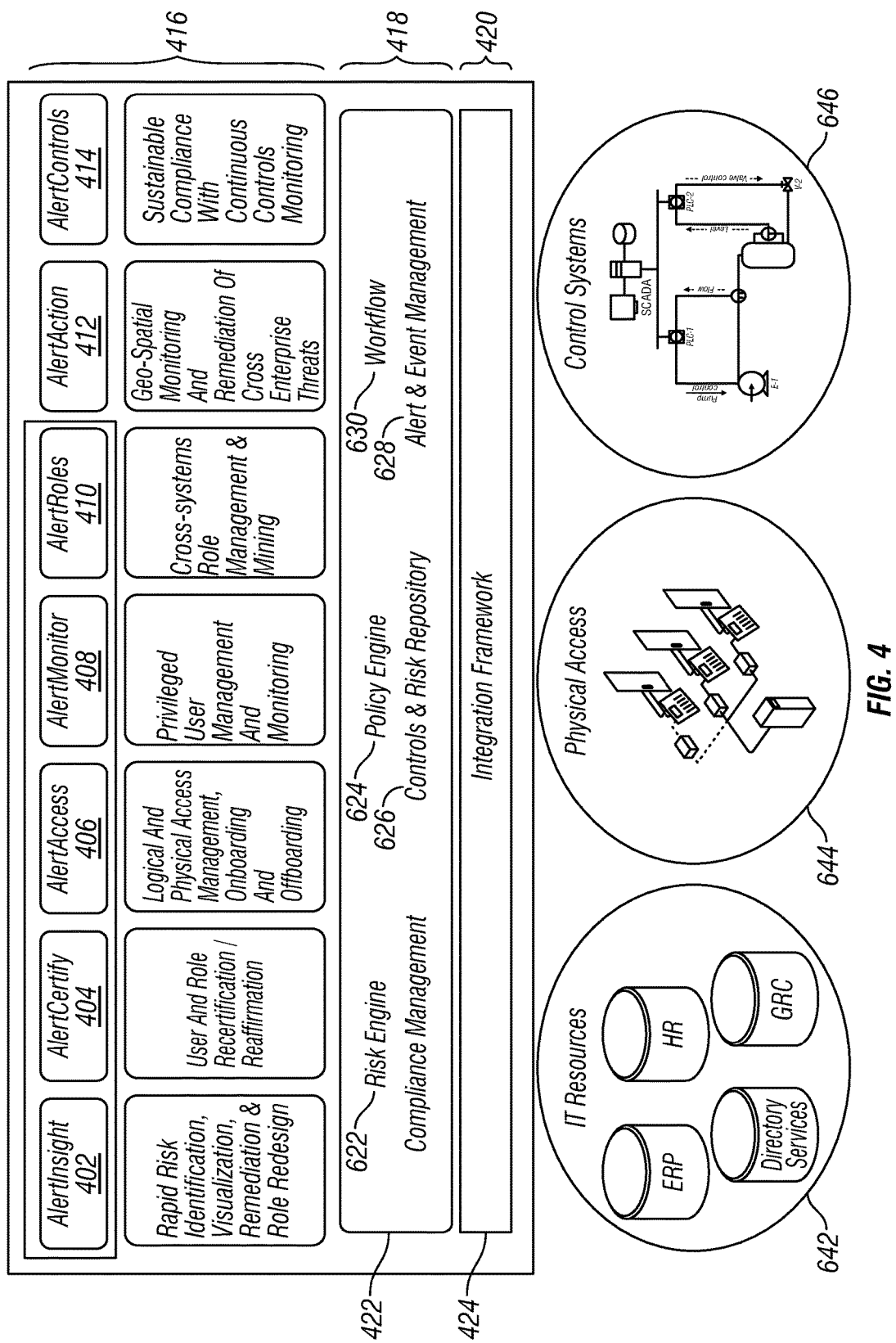
FIG. 4 is a schematic diagram showing an alert enterprise system and its components and shows external systems with which alert enterprise system is in communication, according to an embodiment.

Another exemplary embodiment of alert enterprise system 100 can be understood with reference to FIG. 4. FIG. 4 is a schematic diagram showing a particular enterprise architecture to which a particular implementation of alert enterprise system has been applied, according to an embodiment. In particular, FIG. 4 a subsystem layer 416 may contain one or more of the product modules or subsystems discussed hereinabove. In particular, subsystem layer 416 is shown to contain the following subsystems in this embodiment: AlertInsight 402, AlertCertify 404, AlertAccess 406, AlertMonitor 408, AlertRoles 410, AlertAction 412, and AlertControl 416. Some of which subsystems are discussed in further detail hereinbelow. Further, this embodiment contains a repository and engine level 418. Repository and engine level 418 may contain the following engines or repositories: risk engine 622, compliance management 422, policy engine 624, controls and risk repository 626, workflow 630, and alert and event management 628. Alert enterprise system 100 contains an integration framework 424 that provides the messaging framework 634 (not shown), connector framework (636), extraction framework 638 (not shown), and a meta data repository or framework 640 (not shown). FIG. 4 also shown the external systems and resources, such as IT resources or systems 642, Physical access systems or physical control systems 644, and industrial control systems 646.

As shown in FIG. 4, AlertInsight 402 may be used for rapid risk identification, visualization, remediation and role redesign. AlertCertify 404 may be used for user and role recertification and reaffirmation. AlertAccess 406 may be used for logical and physical access management, on-boarding and off-boarding. AlertMonitor 408 may be used for privileged user management and monitoring. AlertRoles 410 may be used for cross-systems role management and mining. AlertAction 412 may be used for geo-spatial monitoring and remediation of cross-enterprise threats. AlertControls 414 may be used for sustainable compliance with continuous controls monitoring.

Streamlines on-Boarding/Off-Boarding and Closes Security Gaps

Figure 5A:
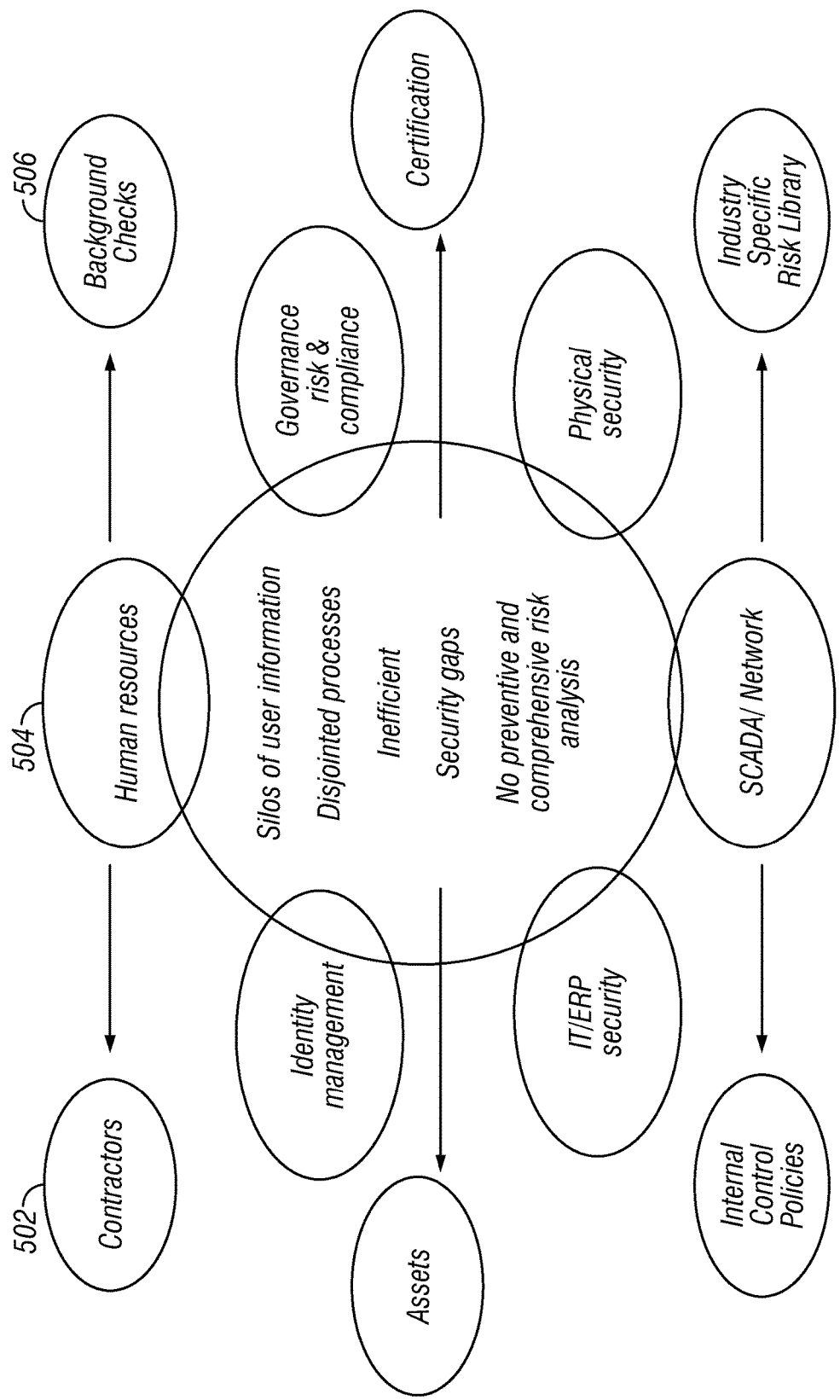
FIG. 5a is a schematic diagram showing too many silos, according to the prior art.
Figure 5B:
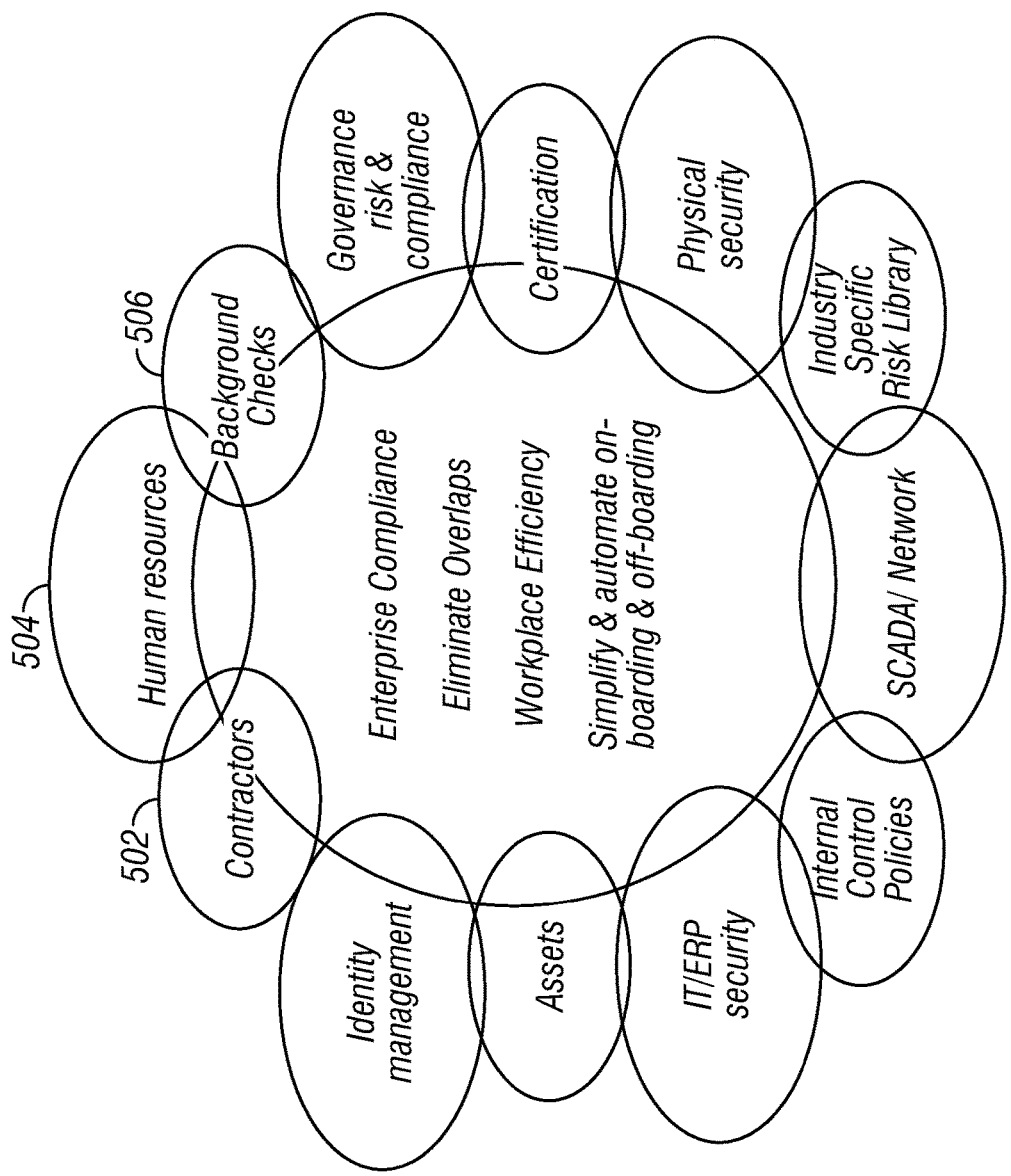
FIG. 5b is a schematic diagram representing a solution that streamlines on-boarding and off-boarding and closes security gaps, according to an embodiment.

It should be appreciated that an embodiment allows an enterprise from having too many silos to a streamlined architecture, where a silo is an entity that is not well-connected with another entity or silo. Too many silos can be understood with reference to FIG. 5a. FIG. 5a is a schematic diagram showing a plurality of entities of an enterprise that are not well-connect. In contrast, FIG. 5b is a schematic diagram representing a solution that streamlines on-boarding and off-boarding and closes security gaps, according to an embodiment. Some examples of silos are contractors 502, human resources 504, background checks 506, and so on.

An Exemplary Subsystem—AlertInsight

An embodiment provides an exemplary subsystem for rapid risk identification, visualization, remediation and role redesign 402, referred to herein for convenience as AlertInsight.

Overview

Organizations need to manage risk out of their IT applications. While organizations spend a lot of time and effort securing the enterprise from outside threats, it is also important to focus on the inside. Segregation of Duties (SoD) monitoring may help identify risks from insider malicious activity and even unintentional actions that may result in large potential losses. Traditional SoD remediation reports contain pages and pages of text and end up extending across 15 or 20 ERP application screens. IT security, business teams and compliance analysts need to pour over reports and attempt to identify violations. These efforts are limited to one kind of business application or ERP system and are time consuming and costly.

Sometimes the Biggest Threat is the Threat from within

In an embodiment, AlertInsight 402 provides a highly visual system solution with powerful graphical modeling capability to remediate risk and SoD violations from a common user interface in a single session without the need to traverse through dozens of applications screens. IT security, compliance analysts and business managers may collaborate to arrive at the best remediation decision by visualizing the impact prior to applying remediation actions. With AlertInsight remediation teams may visualize SoD violations, roles and related risks within the same context, on the same screen.

AlertInsight Remediation Manager Delivers Business and IT Alignment

In an embodiment, AlertInsight 402 enables alignment between business and IT by visualizing results from a common set of data. Business managers may understand the root causes of risk and take steps to remediate those risks without relying on IT. Consequently it reduces the time and effort IT has to spend on interpreting security and risk data in a form that can be consumed by business analysts.

In an embodiment, AlertInsight 402 includes data from multiple sources, different ERP systems, Identity and Access Management, Corporate Directories, HR systems, and GRC applications; such data displayed in a business-friendly context. Risk and compliance analysts may assess risk across the board covering IT applications, IT assets, corporate assets, critical assets and the physical access that users and administrators have to them. In an embodiment, this holistic picture of risk may be the starting point from which all remediation activity takes place providing a more secure, policy-driven and compliant result.

Figure 8:
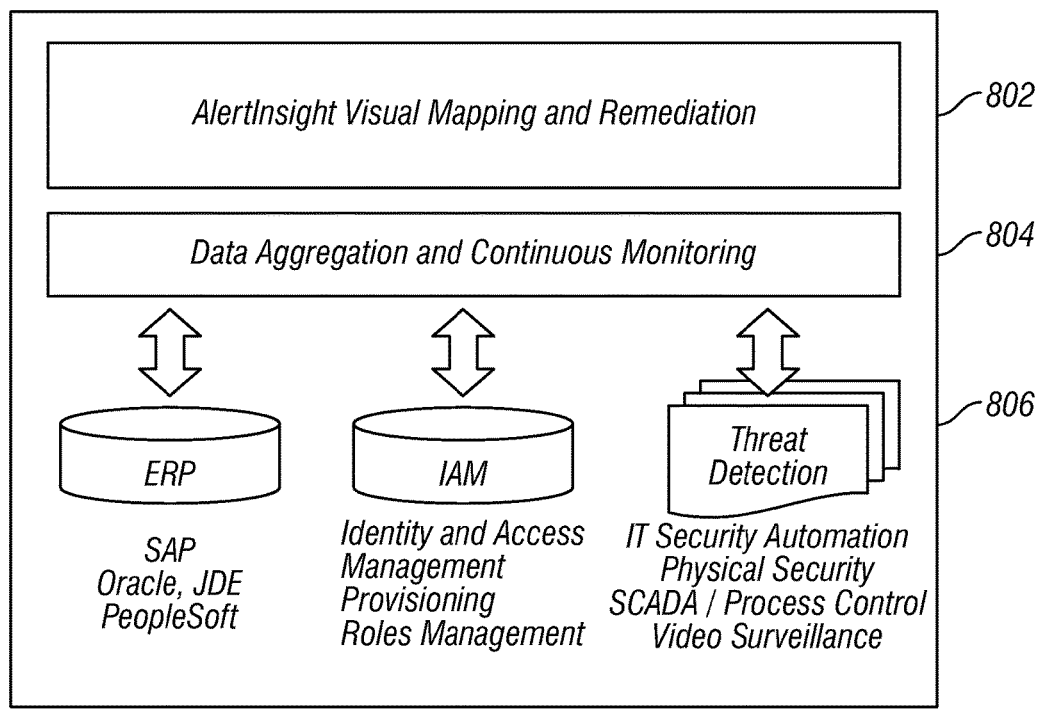
FIG. 8 shows a subsystem for rapid risk identification, visualization, remediation and role redesign, according to an embodiment.

An embodiment can be understood with reference to FIG. 8. FIG. 8 shows an AlertInsight subsystem according to an embodiment. Such subsystem contains a visual mapping and remediation layer 802, a data aggregation and continuous monitoring layer 804, and a sources of data layer 806. Such sources of data layer 806 are, for example and not limited to, ERP systems, Identity and Access Management (IAM) Provisioning and Roles Management systems, and sources of threat detection. Such sources of threat may come from IT Security Automation and Physical Security/SCADA, Process Controls Systems and video surveillance systems.

Figure 9:
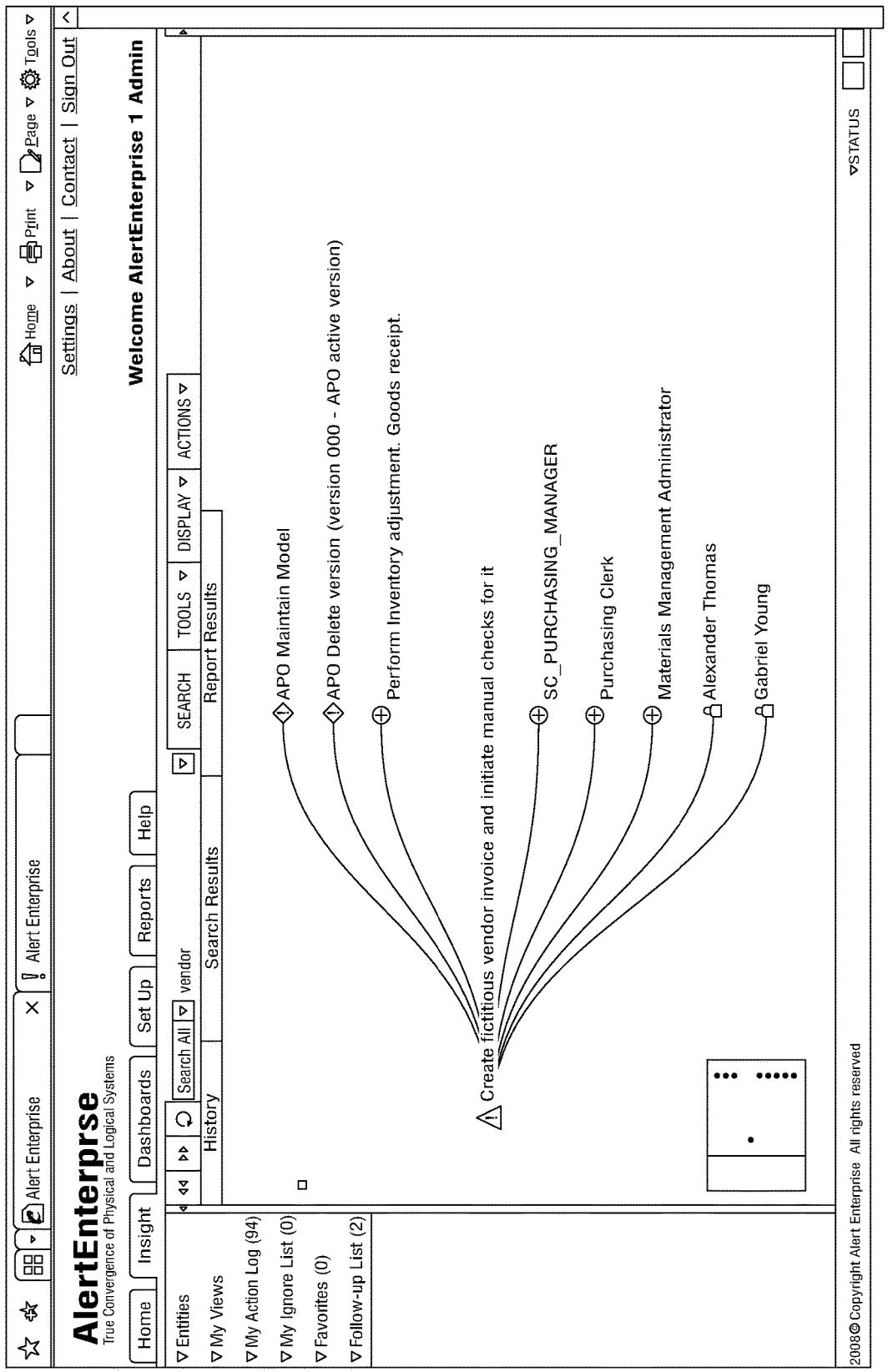
FIG. 9 shows an exemplary user-interface for rapid risk identification, visualization, remediation and role redesign, according to an embodiment.

An embodiment of a user-interface can be understood with reference to FIG. 9. FIG. 9 shows an exemplary user-interface for rapid risk identification, visualization, remediation and role redesign, according to an embodiment. In the embodiment, drilling down on a risk item may show the details of processes, transactions, roles with permissions and the users all in one screen. Such subsystem 402 may initiate remediation actions with a single click, thus providing powerful actionable response to risks.

Figure 20:
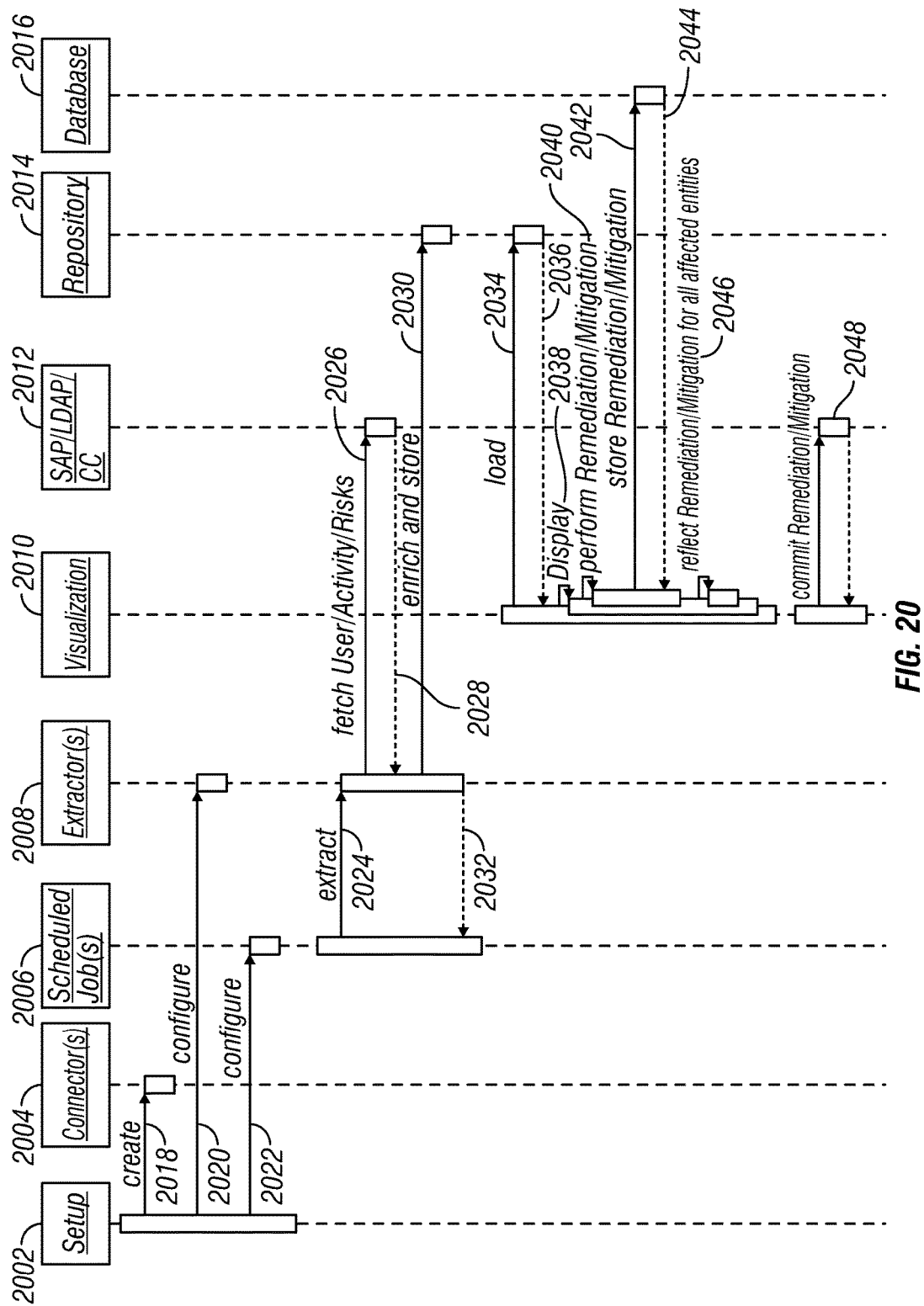
FIG. 20 is a schematic diagram for depicting a particular sequencing of actions from one entity to another for rapid risk identification, visualization, remediation and role redesign, according to an embodiment.

An embodiment can be understood with reference to FIG. 20. FIG. 20 is a schematic diagram for depicting a particular sequencing of actions from one entity to another for rapid risk identification, visualization, remediation and role redesign. In this embodiment, a setup processor 2002 sends a create message 2018 to a connector(s) processor 2004, a configure message 2020 to an extractor(s) processor 2008, and a configure message 2022 to a scheduled job(s) processor 2006. Scheduled jobs processor 2006 sends an extract message 2024 to extractor(s) processor 2008 and receives a message 2032 from extractor(s) processor 2008. Extractor(s) processor sends a fetch user activity and risks message 2026 to an SAP/LDAP/CC processor 2012, which sends a response 2028 back to extractor(s) processor 2008. Extractor(s) processor 2008 also sends an enrich and store message 2030 to a repository 2014. A visualization processor 2010 sends to and receives from repository 2014 the messages (2034, 2036). Visualization processor 2012 then causes a display message 2028 to execute. As well, visualization processor 2010 causes a perform remediation and mitigation message 2040 to execute. Visualization processor 2010 also sends a store remediation and mitigation message 2042 to a database 2016 and receives a return message 2044 therefrom. In response, visualization processor 2010 executes a reflect remediation and mitigation for all affected entities message 2046. As well, visualization processor 2010 sends a commit remediation and mitigation message 2048 to SAP/LDAP/CC processor 2012 and receives a return reply 2048.

Features

An embodiment provides, but is not limited to particular features, as listed hereinbelow:
  Easy to understand—Business and IT can get aligned by viewing a common set of data.
  Quickly and visually identify security and compliance violations and exposure points; and remediate these violations.
  Automated security and compliance data extraction from ERP, IDM, Human Resources and GRC systems for analysis.
  Search for various entities like users, roles, risks, controls etc and see the relationships through a visual representation with drill—down.
  Actionable visualization through which changes can be made to users, roles, risks and simulated before those changes are performed in the target systems Customer Benefits An embodiment provides, but is not limited to particular benefits for, but not limited to, customers, as follows:
  Promotes visual collaboration between IT and business functions to remediate risk
  Reduces cost of compliance by eliminating costly and time consuming process of reviewing textual data
  Visual simulations allows impact to be viewed prior to investing in remediation actions
  Provides most comprehensive view of risk combining logical and physical security Verifiable compliance with regulations, standards and best practice frameworks Secures the gap between critical assets, IT systems and business applications Reduced audit preparation time and cost An Exemplary Manager for Re-Certification of User, Access, and Role Overview Recent rogue trader and insider breaches involving losses exceeding hundreds of millions of dollars have highlighted the lack of oversight when it comes to reviewing who has access to highly critical applications within the organization. The risks are huge and threaten the viability of the enterprise. Additionally, regulations, standards and best practice frameworks are continuously being updated with more stringent access review policies and varying rules on how often user access and roles need to be reviewed. Highly critical roles such as treasury functions may need to be reviewed weekly. The most prevalent way of addressing this, even in large organizations, is via spreadsheets and face-to-face meetings in a war-room environment. Not exactly the best way to conduct business.

An embodiment provides a highly visual system solution with powerful graphical modeling capability to completely automate, monitor and track the numerous re-affirmation projects that risk and compliance analysts, IT security and business managers may have to complete. Additionally reaffirmation tasks are set up as individual projects with business and IT stakeholders identified. An embodiment automates the scheduling, the frequency and the levels of workflow within the application. The embodiment may provide value in highly regulated industries such as utilities and financial services, as well as critical infrastructure and essential services.

Re-Certification as a Risk Management and Compliance Process

Traditional Segregation of Duties (SoD) utilities and Access Management applications have focused on just user access re-affirmation generally providing a one-size-fits-all solution. Managing risk across the enterprise requires not only assessing user access, but examining roles. To truly determine who has access to these systems and monitor their activity, it is essential to link the physical access to the logical access and provide real-time visibility into background checks, certifications and training.

It should be appreciated that an embodiment of a manager for re-affirmation relies on its underlying technology to aggregate previously undetectable risks by collecting blended threats from IT Systems, Physical Access Controls Systems and Production Control Systems. Such subsystem provides a complete risk analysis and provides roles-based dashboards to reviewers, administrators, auditors and risk managers with added capability of remediating risk, such as with a single click.

Figure 10:
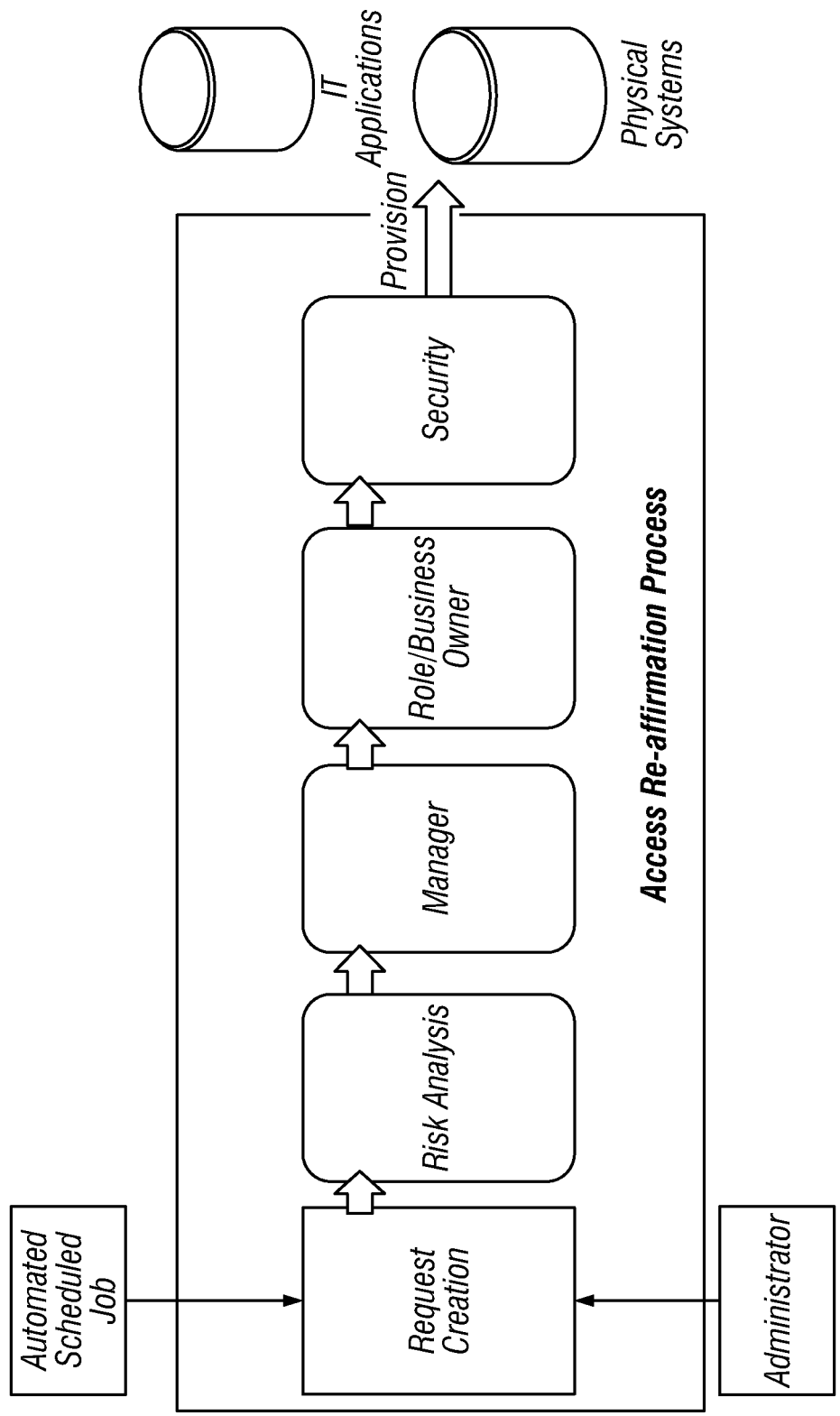
FIG. 10 is a flow diagram showing automated scheduled job information and administrator information being input into a request creation processor, according to an embodiment.

An embodiment of a re-affirmation process can be understood with reference to FIG. 10. FIG. 10 is a flow diagram showing automated scheduled job information and administrator information being input into a request creation processor. Request creation processor sends data to a risk analysis processor, which processes the data and then makes the processed data available to a manager. The manager or manager subprocess determines appropriate role and business ownership. Such role and business ownership data is compared with security data by a security subprocess, which then provisions the request for access to IT applications or systems and physical systems. Thus, an embodiment provides a configurable solution with multi-level workflow that extends beyond user-access to include re-affirmation for roles, assets, controls and physical access including, but not limited to, certifications.

It should be appreciated that an embodiment provides a highly visual system solution with powerful graphical modeling capability to automate, monitor and track the numerous re-affirmation projects that risk and compliance analysts, IT security and business managers may have to complete. Additionally re-affirmation tasks are set up as individual projects with business and IT stakeholders identified. The embodiment automates the scheduling, the frequency and the levels of workflow within the application.

Figure 11:
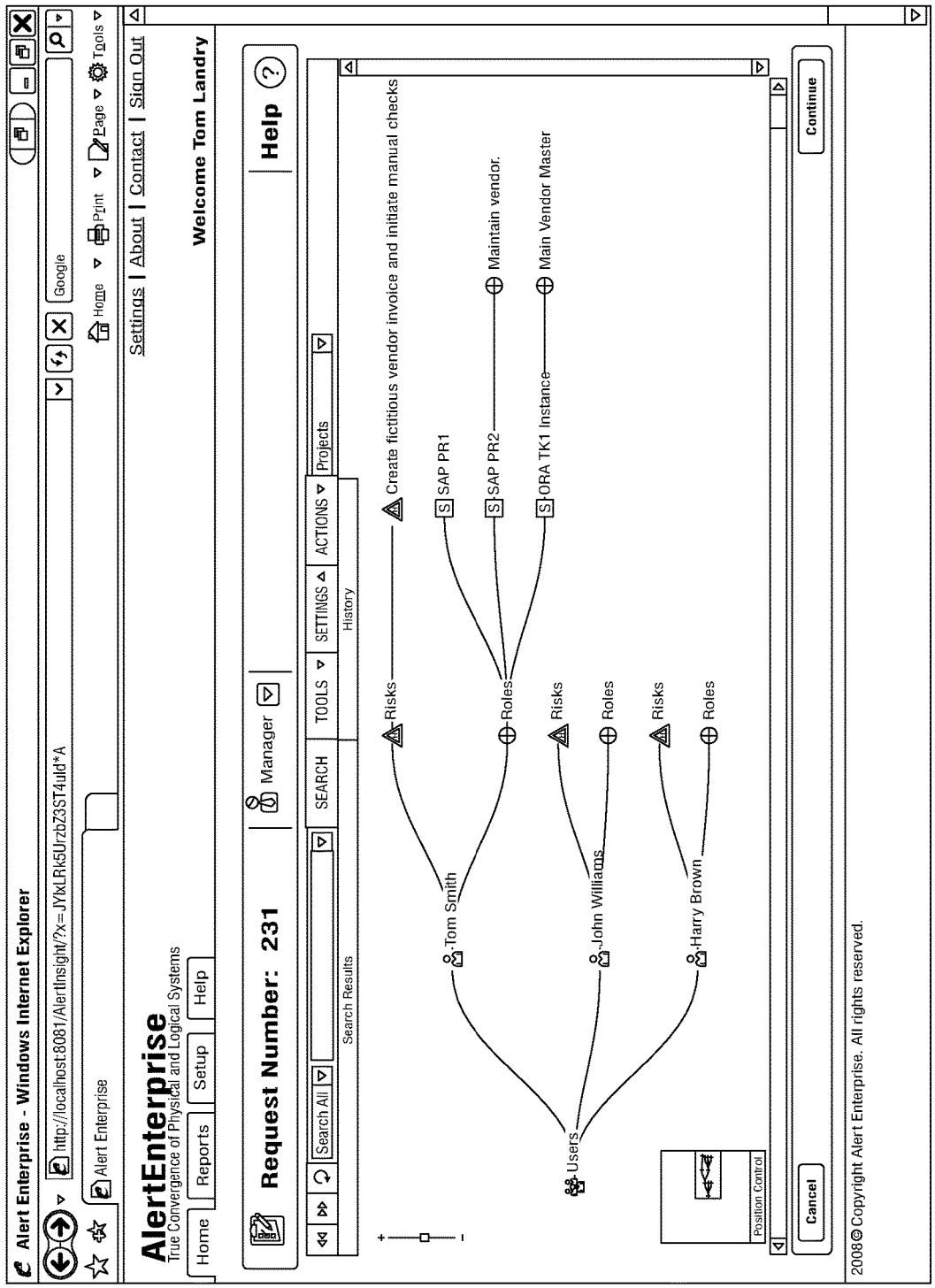
FIG. 11 is a sample screen shot showing the visual simulation of risks and the ability to add or remove transactions related to that role and see the resulting impact, according to an embodiment.

An embodiment of a manager for re-affirmation can be understood with reference to FIG. 11. FIG. 11 is a sample screen shot showing the powerful role modeling capabilities that include visual simulation of risks and the ability to add or remove transactions related to that role and see the resulting impact.

Features

Quickly and visually reaffirm access, roles, risks, assets, certifications and training.

Flexible scoping capabilities for re-affirmation projects

Intuitive visualizations for enhancing business and IT alignment

Configurable workflow with visual design for holistic impact analysis

Automated security and compliance data extraction from ERP, IDM, Human Resources and GRC systems for analysis Search for various entities like users, roles, risks, controls etc and see the relationships through a visual representation with drill—down Reports and dashboards for process monitoring, auditing and administrative functions Customer Benefits Detect, notify and then prevent incidents including thefts, sabotage and acts of terrorism Provides most comprehensive view of risk combining logical and physical security Reduces cost of compliance by eliminating silos and duplicate spending Verifiable compliance with regulations, standards and best practice frameworks Secures the gap between critical assets, IT systems and business applications Reduced audit preparation time and cost An Exemplary Manager for Remediation for Delivering the Power of Visual Risk Analysis and Remediation Sometimes the Biggest Threat is the Threat from within.

An embodiment of a remediation manager provides a highly visual system solution with powerful graphical modeling capability to remediate risk and SoD violations from a common user interface in a single session without the need to traverse through dozens of applications screens. IT security, compliance analysts and business managers can collaborate to arrive at the best remediation decision by visualizing the impact prior to applying remediation actions. With such subsystem, remediation teams may visualize SoD violations, roles and related risks within the same context, on the same screen.

An embodiment provides a highly visual software solution with powerful graphical modeling capability to remediate risk and SoD violations from a common user interface in a single screen session. The embodiment promotes promoted alignment between business and IT functions and includes data from multiple sources, different ERP systems, Identity and Access Management, Corporate Directories, HR systems, and GRC applications; displayed in a business friendly context.

An embodiment for remediation can be understood with reference to FIG. 9. According to the embodiment, a user may drill down on a risk item, which may show the details of processes, transactions, roles with permissions and the users in one screen. The embodiment may initiate remediation actions with a single click, thus providing powerful actionable response to risks.

Features

An embodiment provides particular features listed, but not limited to those below:
- Easy to understand—Business and IT can get aligned by viewing a common set of data.
- Quickly and visually identify security and compliance violations and exposure points; and remediate these violations.
- Automated security and compliance data extraction from ERP, IDM, Human Resources and GRC systems for analysis
- Search for various entities like users, roles, risks, controls etc and see the relationships through a visual representation with drill—down
- Actionable visualization through which changes can be made to users, roles, risks and simulated before those changes are performed in the target systems Customer Benefits
- Promotes visual collaboration between IT and business functions to remediate risk
- Reduces cost of compliance by eliminating costly and time consuming process of reviewing textual data
- Visual simulations allows impact to be viewed prior to investing in remediation actions
- Provides most comprehensive view of risk combining logical and physical security
- Verifiable compliance with regulations, standards and best practice frameworks
- Secures the gap between critical assets, IT systems and business applications
- Reduced audit preparation time and cost AlertInsight Storyboard An embodiment provides particular processes for rapid risk identification, visualization, remediation, and role redesign, such as AlertInsight subsystem 402, in a story board presentation as follows. It should be appreciated that the following is to be illustrative only and is not meant to be limiting.

An embodiment provides a logon interface to the end user consistent with other applications of alert enterprise system 100. A customizable application homepage is provided that provides a dashboard view on risks and a list of any outstanding tasks. An Interactive Role Details Visualization screen is provided that visually displays risks associated with roles, users, and assets. A SAP Role Representation-Technical View is provided that provides a default technical view of transactions that form part of the role and the user that has the role. A SAP Role Relationships Business View is provided that simplifies the complex technical definitions into business friendly text for assimilation. A SAP Role Relationship Actionable Menu is provided that provides the ability to execute tasks on the role from the interactive screen. An Actionable Risk Analysis screen is provided; root cause analysis can be performed for highlighted risk and other associated actions like add mitigation control, remove user from role can also be performed from this screen. A Risk Analysis screen is provided that shows that the risk analysis indicates the cause of risk due to two transactions inherent in the role being analyzed. A Risk Remediation view is provided where the user may remediate the risk identified e.g. by removing the transactions from the Role being analyzed. A confirmation of the risk remediated and current risk status is provided. The visual may be changed to reflect dotted lines to indicate completed risk remediation. A User Analysis View is provided. Any user can be searched from within the application for access, any relevant risks or other user information. A User to Corporate Assets view is provided. Such view provides detailed view of all corporate assets owned by the user. A User to System Access View is provided. Such view provides detailed view of system accesses of the user. A User to Access Detailed View is provided that offers a drill down level view of the system access. A User Supplemental Information view is provided that provides additional information on the user being analyzed from corporate directories. A User to Role within Systems view is provided where associated roles of a user profile may identify a role with inherent risk. A Risk Mitigation view is provided that is used for mitigating risk on account of the role interactively. As well, a view is provided that shows that completed risk mitigation reflects the highlighted changes on the roles of the user. A reports view is provided for out-of-the-box reports on risks, roles, users and related accesses.

An Exemplary Subsystem—AlertCertify

An embodiment provides an exemplary subsystem for user and role recertification and reaffirmation 404, referred to herein for convenience as AlertCertify.

AlertCertify Storyboard

An embodiment provides particular processes for user and role recertification and reaffirmation, such as AlertCertify subsystem 404, in a story board presentation as follows. It should be appreciated that the following is to be illustrative only and is not meant to be limiting.

Subsystem 404 provides a logon interface to the end user consistent with other applications and subsystems of alert enterprise system 100. An embodiment provides a customizable application homepage that provides a dashboard view on outstanding tasks and a pictorial view of the progress indicators. A setup screen defines reaffirmation projects—their type/owner/schedule. Such screen provides the set up options on a reaffirmation project. A project may span multiple systems and may be of different type. Project Type definition determines the additional attributes associated with the reaffirmation project. Scope definition enables addition of filters and exceptions for project creation. The display options available to the approver for any request are configurable from the set up screens. Scheduling and workflow enablement for the reaffirmation projects are also completed from the set up screens. The setup screen enables the user to associate desired deadline with each process name and modify templates for notifications. A confirmation upon successful creation of a project provides the user the ability to move to the next task. A reaffirmation request provides the roles owned by the approver to be reviewed. It also has a count of the users and status pertaining to the review of each role. The detailed role view from the request displays the attributes, users and risks associated with the role being reviewed. An expanded attribute view displays the transactional attributes linked to the role. Each of the attributes provides an actionable icon to approve or deny the attributes on the role. Each of the attributes give the approver the ability to add a note against the action performed for the attribute; e.g. this is at a group level and a line item level. The users expanded view indicates the individuals that have access to the role being reaffirmed. A progress indicator reflects overall completion status on the reviews done on the request. Subsystem 404 provides the ability to save the actions taken as a draft or submit a completed request. A confirmation of the submission of the request is displayed to the approver to complete the action. Reaffirmation of the users as part of the request may provide a tabular view on users' roles and may display a review status. Subsystem 404 provides a graphical representation of the users that form part of the request. The interactive visualization of the request displays risks and roles linked to the user being reaffirmed. Upon review of the request interactively subsystem 404 updates the review status for the corresponding user. A detailed grid user view is provided that lists risks associated with the roles and accesses of the user. A confirmation of the submission of the request is displayed to the approver to complete the action.

An Exemplary Subsystem—AlertAccess

An embodiment provides an exemplary subsystem for logical and physical access management, on-boarding and off-boarding 406, referred to herein for convenience as AlertAccess.

It has been found that the world never stops turning and neither does the clock. Around the world, around the clock, business runs on IT. Securing business means securing the underlying IT infrastructure—the applications and the systems they run on. Organizations need employees, partners and customers to access applications right now to get their jobs done. Customer information must be secured, privacy must be protected and corporate assets secured. This may mean tracking not only who has access to business systems, but who has physical access to critical facilities and corporate assets. Threats are everywhere and risks abound.

Further, it has been found that current methodologies look for risk after provisioning users. Such technique is considered to be like closing the barn door after the horse has bolted.

It further has been found that more regulations require more oversight and of course more ever changing rules. Information Security professionals need to worry about insider threats as much, if not more than attacks from the outside. Figuring out the balance between how much access is enough and making sure the job gets done may be difficult. Throw in compliance with regulations and corporate policies on top of that. User provisioning for hundreds and sometimes thousands of employees across multiple enterprise systems may make the task un-scalable.

Access for HR systems, Active Directory, ERP systems and Business-Critical applications is being handled in silos, such as those depicted in FIG. 5a. In the current regulatory environment auditors are more meticulous and are uncovering many kinds of control violations. Organizations are under more pressure than ever before to manage risks from user access.

A Risk-Based User Access Management and Provisioning System Solution

An embodiment provides a risk-based user-access management and provisioning system for providing such solutions. An embodiment, such as subsystem AlertAccess 406, may analyze risk across applications in multiple domains that include IT Systems, Physical Access Control Systems and Process Control Systems to detect and monitor risks prior to enabling user access.

An embodiment utilizes a roles-based, rules-driven framework for access management. Organizations can realize substantial cost savings and efficiencies through reduced audit costs, reduced time-to-compliance. The embodiment is architected to take advantage of existing Segregation of Duties (SoD) engines, as well as Identity and Access Management systems for ERP applications and provide an enterprise view for access control exposure across the enterprise.

Referring to FIG. 1, it can be understood that an embodiment may analyze risk across multiple domains that include IT Systems, Physical Access Controls and Process Control Systems prior to enabling access.

A Roles-Based, Rules-Driven User Access Management System Solution

An embodiment of alert enterprise system 100 provides a unique risk management capability that aggregates blended threats from IT systems, Physical Access Control Systems and Critical Control Systems and uncovers previously undetectable risks. By analyzing and correlating all networked access events and integrating data from HR applications, the embodiment may ensure that critical infrastructure access is denied for those who would pose an intentional or unintentional threat.

An embodiment can be understood with reference to FIG. 12. FIG. 12 is a sample screen showing five roles to be added. Two are of physical type for a facility badging system, two are of logical control type for a plant distributed control system, and the last is of logical type for an ERP system.

Particular Capabilities

An embodiment provides particular capabilities for Alert-Access 406, such as, but not limited to the following:
  Analyze blended risks across the entire enterprise—IT Application, Databases, Networks and Physical Systems
  Monitor access to IT Systems, Facilities, Critical Assets and High Impact Applications.
  Leverage roles and policies in existing Identity and Access Management and GRC software.
  Perform risk analysis at the object and organization level—Assign mitigating controls and ensure compliance
  Identify risks related to physical locations, and corporate assets
  Enforce user access policies based on certification and training.
  Manage employee/contractor onboarding and off-boarding processes
  Automate testing and controls for regulations including NERC-CIP, CFATS, HIPAA and FISMA.
Solution Benefits
  Eliminate risk of theft, fraud, sabotage and terrorism
  Provides cross-enterprise user access enforcement
  Leverage existing investments in Identity Management and GRC software
  Eliminate waste and inefficiency by reducing non-productive on-boarding time
  Eliminate risks, loss of corporate assets and data leakage during off-boarding
  Enable secure and auditable management of user access by business owners.
AlertAccess Storyboard
  An embodiment provides particular processes for logical and physical management, onboarding and offboarding, such as AlertAccess subsystem 406, in a story board presentation as follows. It should be appreciated that the following is to be illustrative only and is not meant to be limiting.

An embodiment provides a User Self Service Screen that presents representations of available options for request and use categories. A User Self Service Access Request Form is provided that provides a detailed user access request form with customizable fields. A Resources Selection Page—Requestor View is provided that provides a representation of available resources to obtain access from and the ability to select the profile based on any other user or available categorization. A view for Resource selection and modeling from desired profile is provided that enables the requestor to choose a desired user to mimic access with other advanced options and available categories. A user request summary screen is provided that allows the user to validate with a summary and view the contents of the request prior to final submission. A view a request queue is provided that displays the requests in various stages of the workflow with their unique identifiers and associated status. An approver view of a submitted request is provided that allows the approver to be presented with an itemized view of the contents of the request to ease the approval process. A view is provided for the listing of risks associated with granting access per request. The screen lists the risks linked to the granting of access per request. A view is provided for the listing of mitigating controls for identified risks. The approver is presented with the associate mitigation control to the identified risk. A view is provided for presenting evaluation of risks associated with request. The evaluate risk tab analyses possible risks associated with the request and presents them to the approver for further analysis. An Approver (Manager) view of requests is provided. The Approver (Manager) has a summary view of the requested resources that belong to this request. A Policy Maintenance Screen is provided. Policies enforce rules onto the provisioning process in an automated manner and allow for customizing attributes enforced thereby. A view for Policy Detailed Definitions is provided. Policies created may be enforced and prioritized based on execution of rules inherent within the policy. A Workflow Process Designer view is provided. For example, a drag and drop workflow enablement tool is used to set the process on ease of use. A view of listing of process configurations available out of the box is provided. A predefined set of process configurations that exist within the application as listed. A Workflow Rules view is provided. Out of the box workflow rules give the ability to add, modify, or delete the applicability parameters for policy enforcement. A Rule Definition Screen is provided. The rule definition view provides the ability to identify applicability and additional attributes. A Reports Capability view is provided. Subsystem 406 provides out-of the box reports and provides custom reports development as part of configuration.

An Exemplary Subsystem—AlertWatch

An embodiment provides an exemplary subsystem for privileged user management and monitoring 408, referred to herein for convenience as AlertMonitor.

What do You do when the Very People Entrusted with Running Your Most Critical Systems and Applications are Turning to the Dark Side?

An embodiment provides an AlertWatch subsystem 408 that provides the ability to give administrators or technicians, highly privileged access for pre-set duration to conduct emergency response to incidents presently occurring. During this special access period all tasks are monitored, analyzed and logged ensuring complete visibility and transparency. When the tasks are complete, the normal restrictions to access are automatically restored while avoiding potential high-impact vulnerabilities. The subsystem 408 provides an innovative solution that extends the risk analysis of IT access to include Physical Access Control Systems (PACS) as well as video surveillance. Such system provides a more complete picture of systems, applications, facilities and critical assets that a privileged user has touched while they have enhanced access.

In an embodiment, subsystem 408 provides a privileged user management subsystem that includes, but is not limited to the following:

Monitor emergency access to all applications and assets
Peruse large activity logs with search engine provider—like search capabilities
Continuously monitor super—user activity and enforce policies
Rich alerting and response capabilities including automated remediation
Logging and reporting for compliance and audit support It has been found that it is no longer sufficient to monitor just IT access alone. Real-world incidents don't occur in IT and non-IT silos. Events that occur in any one domain by themselves may appear completely innocent. When correlated with physical security, events or changes in critical processes may paint a more sinister picture.

An embodiment provides subsystem 408, which provides a system solution that monitors privileged access across enterprise and legacy applications and then extends the correlation of IT access to physical access controls as well as video surveillance.

Figure 13:
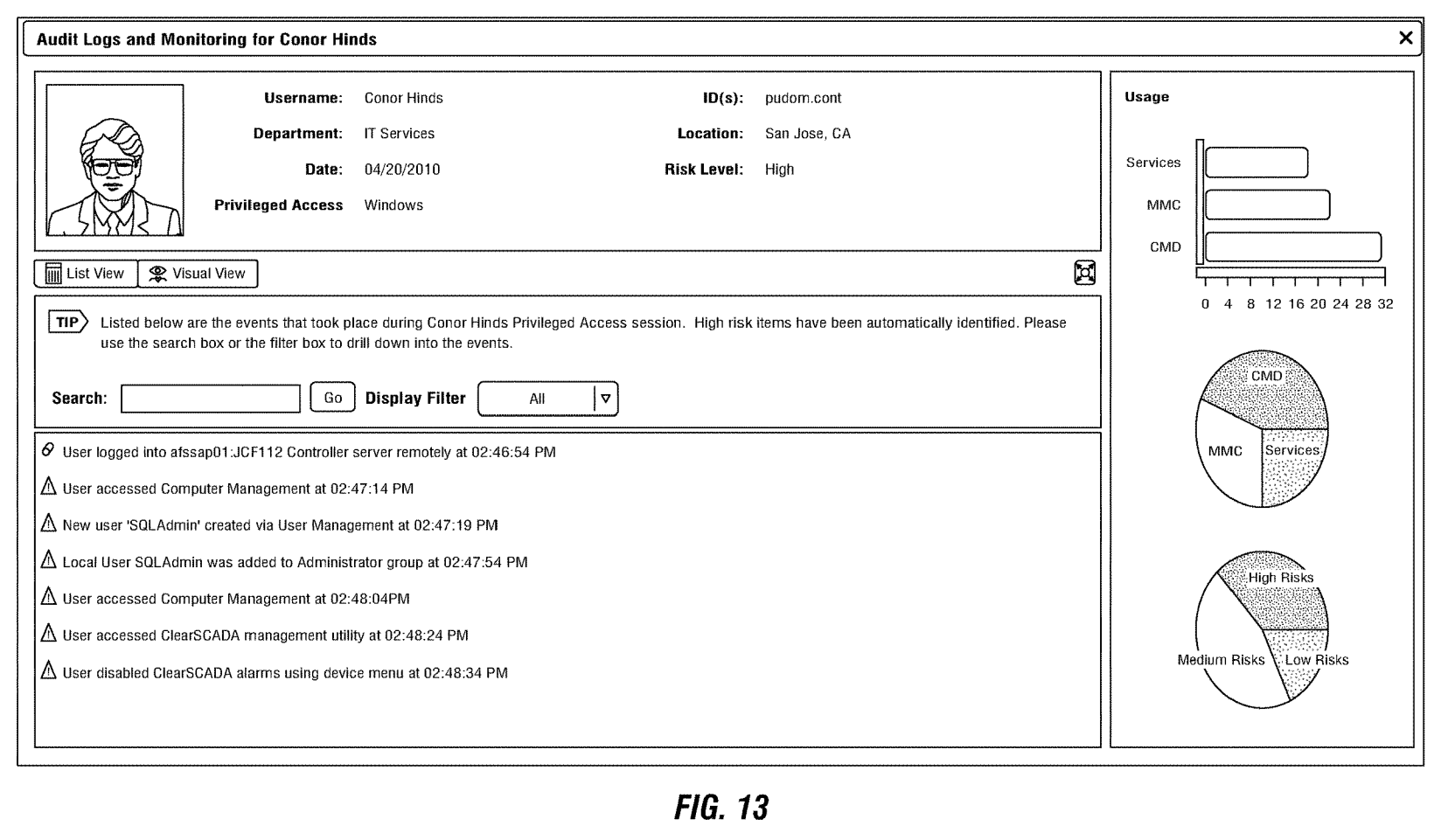

An embodiment of a privileged user management and monitoring system can be understood with reference to FIG. 13. FIG. 13 is a sample screen showing how a user may track and log privileged access for IT applications as well as physical access to facilities and critical assets, thus providing a complete risk posture across many applications. In particular, FIG. 13 shows a list of events that took place during an individual's privileged access session. High risk items are automatically identified. The embodiment allows drilling down into particular events.

According to an embodiment, AlertWatch subsystem 408 is a multi-domain, multi-platform privileged user management application. It enables organizations to automate the monitoring of individuals entrusted with the most critical access in the organization. Auditors and regulators have stepped up the focus on closing this gap. AlertWatch subsystem 408 enforces the least privilege principle in an organization and ensures business run with minimal risk even if privileged critical access is used to in an operational environment. The application delivers compliance with various regulations and monitoring of supervisory access across IT and physical access controls systems.

Features

An embodiment provides particular features such as, but not limited to, the following:

Grant and monitor temporary emergency access to Major ERP and Legacy Application
Extend emergency access monitoring to physical access and industrial control systems
Manage granting, monitoring and removal of emergency access privileges
Identify and manage complex access risk and compliance violations
Configure and actively enforce access policies with notification workflow Peruse large activity logs with sophisticated search capabilities Rich alerting and response capabilities including automated remediation Powerful visual user interface enables collaboration between Business and IT Benefits An embodiment provides particular benefits such as, but not limited to, the following:

Uncover risks lurking between application and operating system silos

Single interface to manage insider threat and for IT, Physical Access Control and Critical Assets Unify disjointed processes of granting and removing access privilege in a single application Eliminate mistakes and oversight such as forgetting to remove emergency access Ability to intercept and respond to incidents in real-time Stay in continuous compliance at all times Sophisticated logging and reporting for enhanced audit support Actively enforce policies with mitigating controls like video surveillance and proximity sensors.

Best—Practice Recommendations to Reduce Insider Threat

An embodiment provides best practice recommendations to reduce insider threat and provides the underlying alert enterprise system 100 and subsystems to perform such best practices. Such best practices include, but are not limited to, the following:

Organizations must deal with insider threat as a security incident—not just cyber or physical or safety Implement systems to correlate information from ERP applications, facilities, critical assets, and control systems Develop an Insider Incident Response plan—leverage existing IT and Surveillance systems to provide real-time situational awareness to operational managers Create a program to monitor privileged users like system administrators even closer—leverage Key Risk Indicators (KRIs) and Risk Libraries Terminations: Deactivate IT Access and Physical Access immediately.

An Exemplary Subsystem—AlertRoles

An embodiment provides an exemplary subsystem for cross-systems role management and mining 410, referred to herein for convenience as AlertRoles. In an embodiment, AlertRoles subsystem 410 provides intelligent role lifecycle management.

An embodiment provides techniques that help organizations manage roles and entitlements including their definition, modeling, and lifecycle management for various resources including ERP applications, legacy systems, physical badge access systems and control systems. AlertRoles subsystem 410 seamlessly integrates with SAP, Oracle and other enterprise applications based on a core understanding of each intrinsic security model.

In an embodiment, AlertRoles subsystem 410 provides a comprehensive intelligent role lifecycle management application that includes:

Role Modeling: flexible role modeling capability that allows for custom models based on resources, enterprise roles etc. Customers may build roles using these models.

Role Repository: enterprise, business or resource level roles may be defined in a central repository and driven by role models. Relationships to organizational structure and jobs may be defined as well as when the role should be provisioned.

Role Mining: rules engine which may recommend new roles based on pre-defined role models and best practice rules. Roles assignment may be based on policies, existing roles, entitlements, usage, and relationships.

Role Lifecycle Management monitors change management for roles and entitlements including the assignment of roles and entitlements to users based on various policies. AlertRoles subsystem 410 detects changes done directly in backend systems like SAP or Oracle. Changes that that might circumvent the prescribed process can be tracked as exceptions.

Role Analytics: Providing powerful analytics that may help with optimizing roles. These analytics may include who has the roles, relationships, usage, changes and assignments.

You have 10,000 Employees and 100,000 Roles! What's Wrong with this Picture?

It has been found that managing roles within the enterprise manually is a costly and time consuming process that can cost millions of dollars. These processes are difficult to scale and the organization ends up with a proliferation of roles that spin out of control, jeopardizing compliance and security. Added to the cost and complexity, is the burden on IT during internal and external audit periods.

An embodiment streamlines the management of roles and eliminates the need to manage and audit access for each individual user. Access management processes may be automated assisting with the entire onboarding and offboarding process particularly during the assignment of resources and access to critical systems and assets.

An embodiment enables role mining across multiple brand enterprise applications, identity and access management systems as well as GRC and directory services. Creating roles based on business requirements, current roles and enterprise policies, enables the management of access in a more efficient, secure, and compliant manner.

An embodiment can be understood with reference to FIG. 14. FIG. 14 is a sample screen for modifying a role, according to an embodiment. A details panel presents and receives input about particular details about particular roles. A steps panel is shown, which lists a series of steps that are determined that a user should perform. Shown is the first step is selected, i.e. Attributes. Details about the Attributes step are presented in the third panel. For example, it is shown that the role sub-type is business. As another example, it is shown that role level is high. Thus, FIG. 14 shows that AlertRoles subsystem 410 features a role repository that contains role definitions. With powerful search capability, even thousands of roles may be reviewed and managed. Roles may be modified based on pre☐defined attributes, policies and relationships.

In an embodiment, AlertRoles subsystem 410 helps organizations manage roles and entitlements including their definition, modeling, lifecycle management, etc., for various resources including ERP applications, legacy systems, physical badge access systems and control systems. Alert Roles subsystem 410 seamlessly integrates with SAP and Oracle based on a core understanding of each intrinsic security model.

Features

An embodiment provides particular features that include, but are not limited to, the following:

Manage roles and entitlements flexible role modeling capability-custom models based on various other attributes Manage roles across ERP applications, legacy systems, badge access systems and control systems Includes best practice roles model templates that can be customized Roles for different applications and systems to be defined in a single roles repository Recommend (new) roles based on configurable roles models Match customer change management processes for deploying roles Detect changes made on backend systems (e.g. SAP, Oracle) to circumvent change process Benefits An embodiment provides particular benefits that include, but are not limited to, the following:

Automate time consuming manual processes to reduce cost

System of record for roles management—supports audit and compliance

Figure 15:
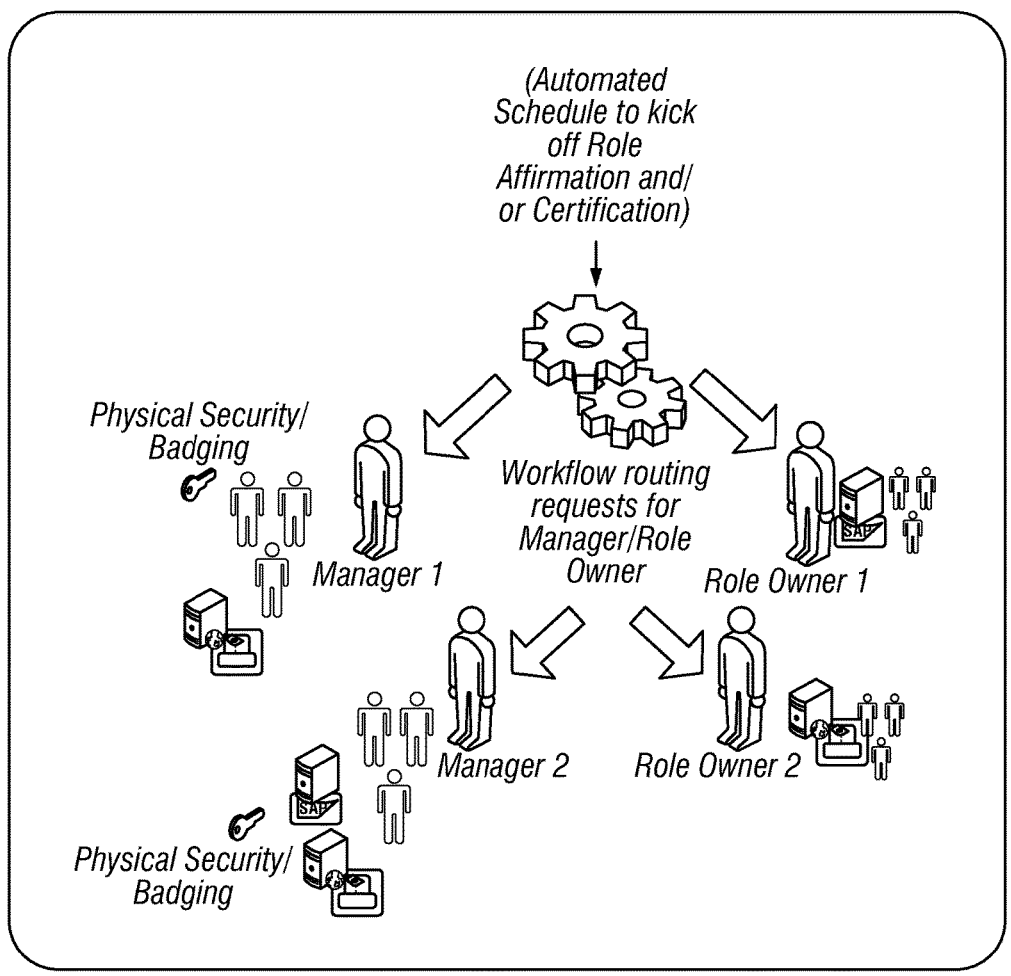
FIG. 15 is a schematic diagram showing an automated schedule to kick off role affirmation and/or certification, according to an embodiment.

Single roles repository allows uniform security policies to be applied across multiple applications Innovative support for user provisioning and access authorization across IT, physical and control system domains Automated workflow and approval significantly cuts down approval time Role modeling allows risk analysis prior to provisioning An embodiment of AlertRole subsystem 410 can be understood with reference to FIG. 15. FIG. 15 is a schematic diagram showing an automated schedule to kick off role affirmation and/or certification, according to an embodiment. In response to the automated schedule to kick off role affirmation and/or certification, workflow routing requests for particular managers (e.g. Manager 1 and Manager 2) and role owners (e.g. Role Owner 1 and Role Owner 2) are initiated.

An Exemplary Subsystem—AlertAction

An embodiment provides an exemplary subsystem for geo-spatial monitoring and remediation of cross-enterprise threats 412, referred to herein for convenience as AlertAction.

In an embodiment, AlertAction subsystem 412 provides continuous monitoring and automated incident response.

As the number of regulations grows exponentially, so do the reporting requirements for fraud, intrusions and security incidents. Individuals and groups are mounting organized campaigns that target IT systems, Physical Access Systems and Control Systems. Companies that just monitor IT incidents without taking physical access and control system security into account are leaving themselves exposed to huge risks.

In conjunction with alert enterprise system 100, AlertAction subsystem 412 monitors and reports on blended threats that exist across these domains and allows organizations to provide a coordinated response.

In an embodiment, AlertAction subsystem 412 combines risk analysis, continuous monitoring, geo-spatial scene analysis, fraud detection and real-time remedial action scripts to provide a visual command and control application for unfolding incidents.

AlertAction subsystem 412 immediately enhances the protection of high-value business applications, critical infrastructure installations, defense and intelligence application and legacy applications where it is important to monitor who has access to critical applications and what they are doing with that access. An embodiment provides Remedial Action Strategies (RAS) that provide policy-compliant actions to incident responders.

Figure 16:
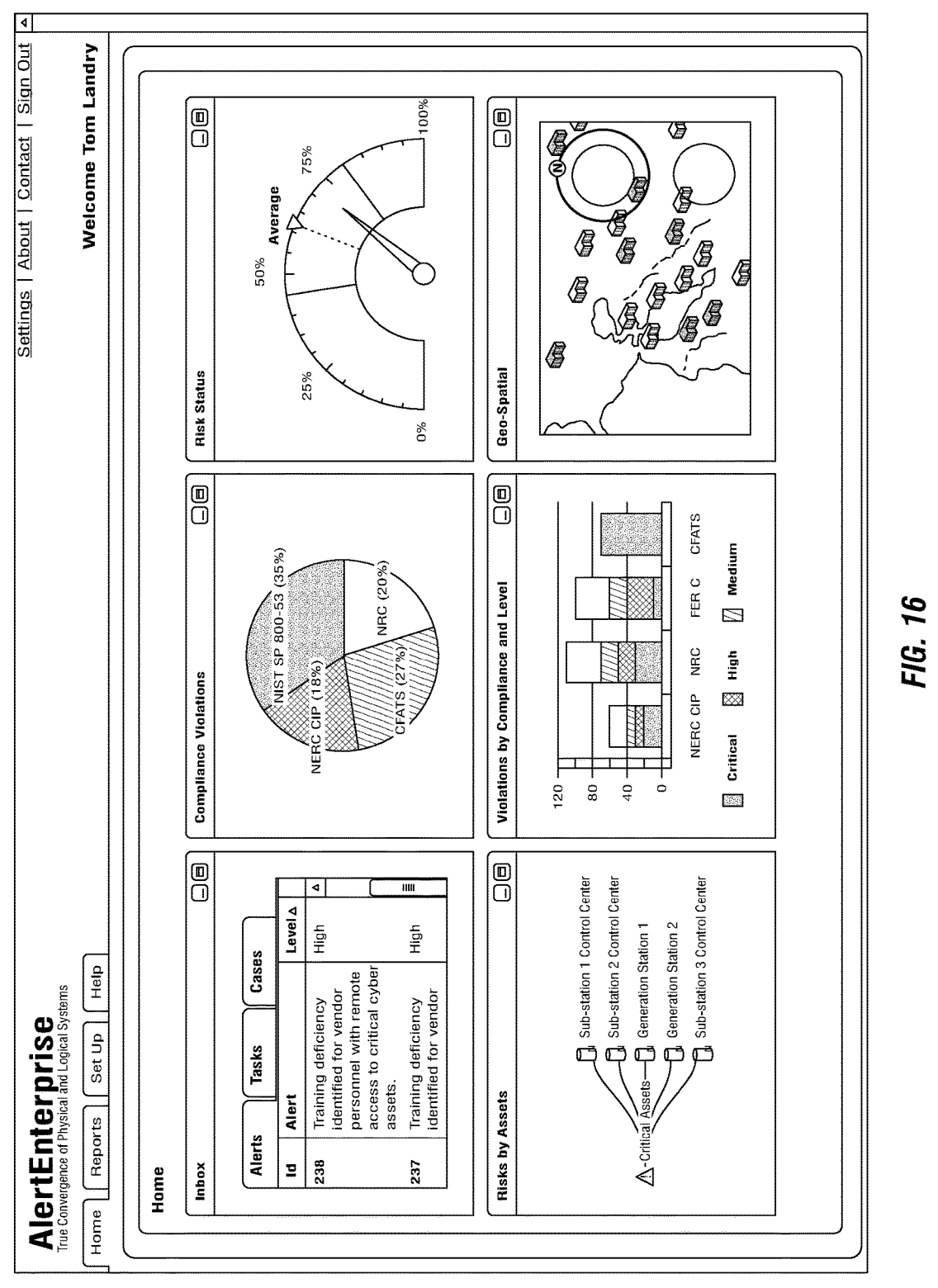

An embodiment can be understood with reference to FIG. 16. FIG. 16 is a sample screen showing six views about particular security aspects for a particular individual, according to an embodiment. For example, the top left view shows current alerts. The window to the right shows a pie chart of compliance violations. The following view to the right shows the current risk status is comparison to an average risk status. The bottom left view shows risks by assets, e.g. a list of critical assets. The next view to the right shows violations by compliance and level. The last view at the bottom right shows a geo-spatial view of assets, where such assets depict a particular level of risk.

Thus, as can be shown in FIG. 16, AlertAction subsystem 412 may provide information to situation managers in security as well as operational roles via configurable roles-based dashboards that include risk, compliance and incident information. Geospatial capabilities automatically pin-point the location of the incident and provide drill-down capability for optimum response.

In an embodiment, AlertAction subsystem 412 provides geo-spatial monitoring and remediation of cross-enterprise threats, serious acts of sabotage, terrorism, fraud and theft etc. The system solution offers capabilities to co-relate seemingly innocent events and activities to detect real threats and risks, while providing powerful alerting and automated RAS for decisive action.

Figure 17:
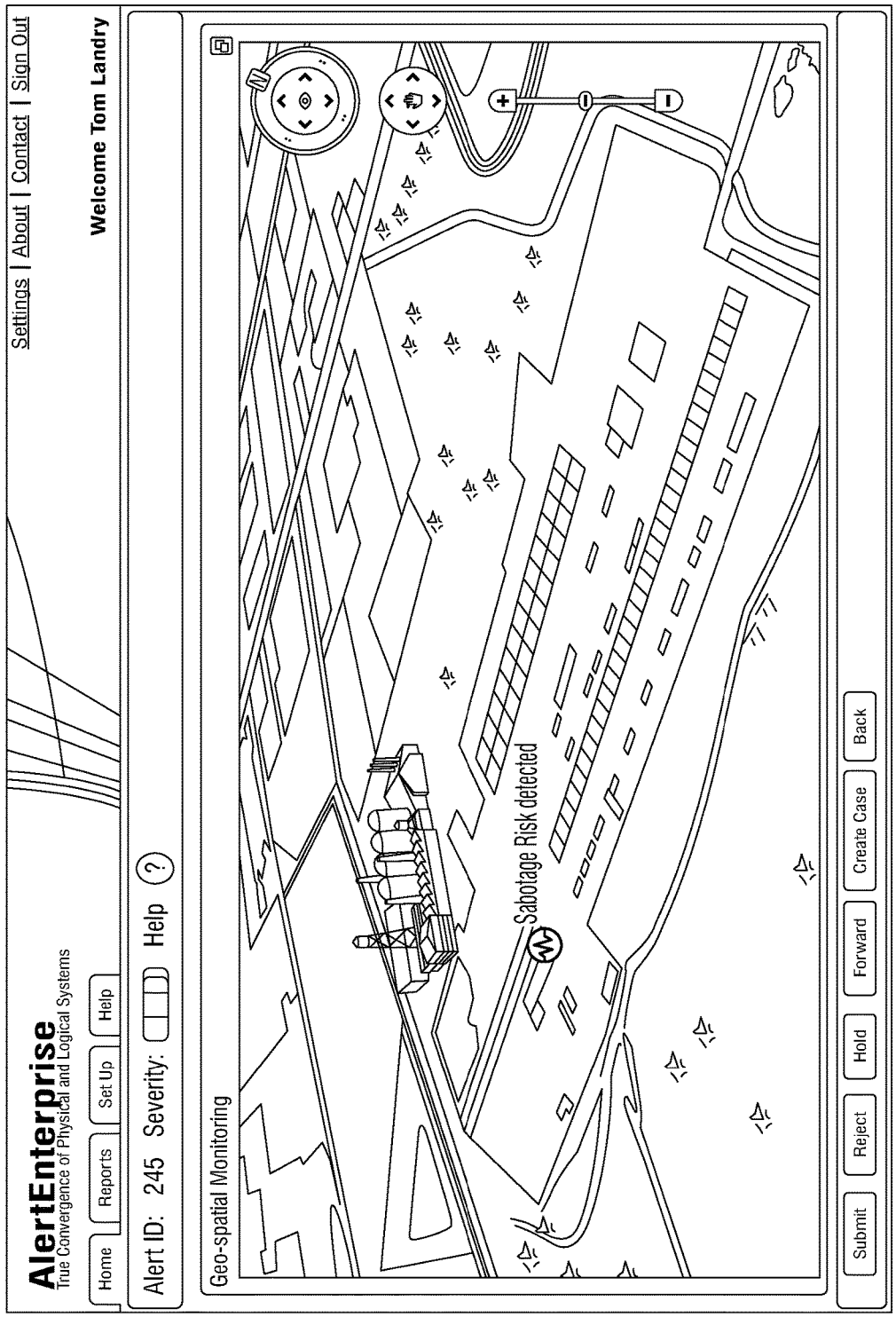
FIG. 17 shows a sample screen shot of a physical substation that is defined as a critical asset in a utility network, according to an embodiment.

An embodiment can be understood with reference to FIG. 17. FIG. 17 shows a sample screen shot of a physical substation that is defined as a critical asset in a utility network. As can be understood from FIG. 17, AlertAction subsystem 412 may identify a physical intrusion incident occurring at the substation. In an embodiment, AlertAction subsystem 412 overlays this facility on Google Maps, by Google, Mountain View, Calif., to automatically locate the source of the threat.

Figure 18:
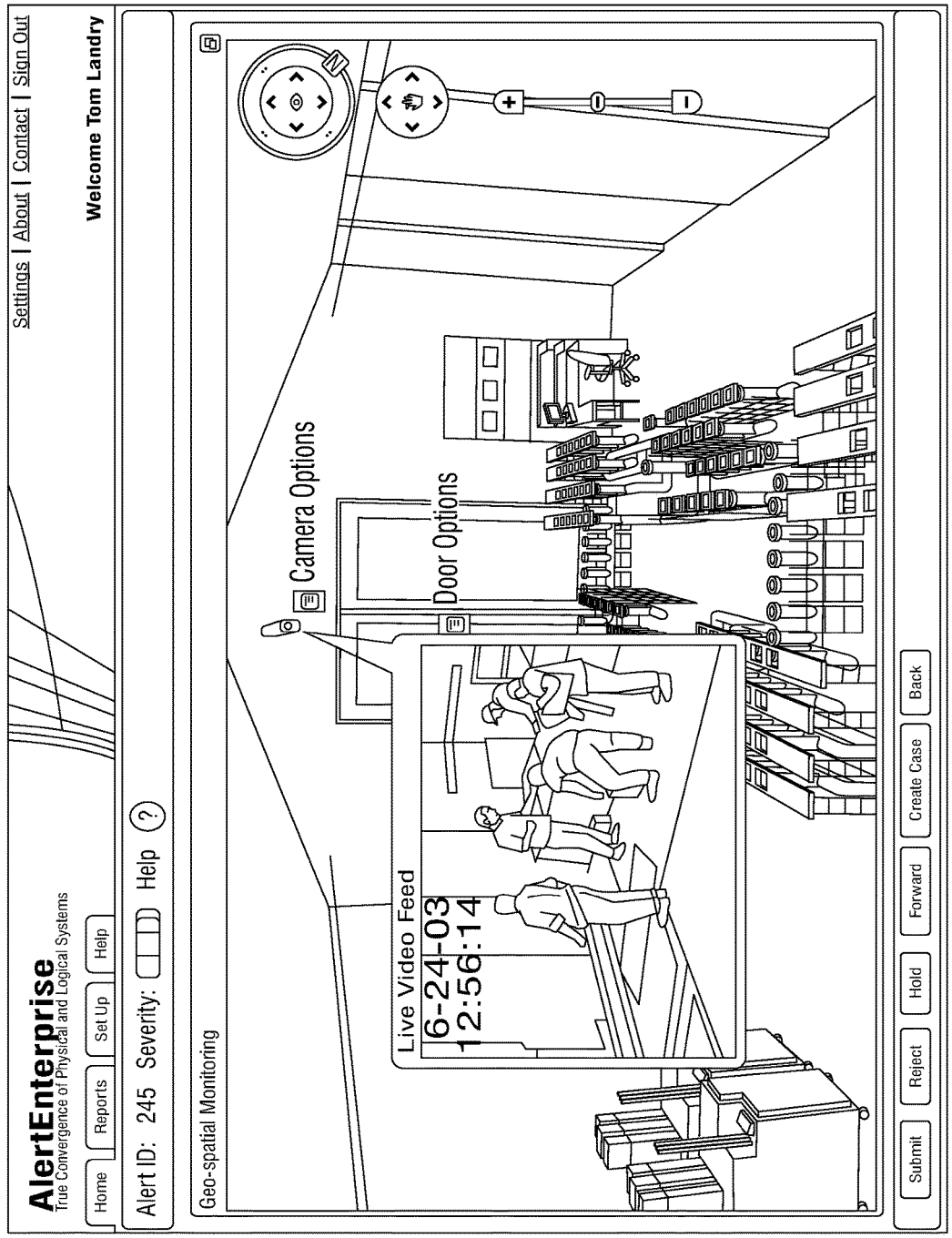
FIG. 18 shows a sample screen shot of a model room of a facility overlaid by a video view of the actual room and the activity therein, according to an embodiment.

An embodiment can be understood with reference to FIG. 18. FIG. 18 shows a sample screen shot of a model room of a facility overlaid by a video view of the actual room and the activity therein. Situation managers may zoom inside the facility and view a model of the control room that has cameras and door locks etc. set up as smart tags in the software. Clicking on the camera icon pulls in live video from the surveillance system allowing managers to verify the incident and then remotely lock doors while informing first responders or law enforcement of the incident underway.

Features

An embodiment provides particular features that include, but are not limited to, the following:

Fully configurable command and control dashboard view with the ability to send alerts through email, SMS, wireless mobile etc.

Connectors to Physical Access Control, Building Controls and Sensor Networks

Automated event collection and analysis.

Pre-integrated with major ERP and business applications

Fast situation analysis via geo-spatial visualization layered on Google Maps and Microsoft Virtual Earth, by Microsoft, Redmond, Wash.

Support for industry specific regulations—CFATS, NERC-CIP, NRC etc.

Automated Remedial Action Strategies (RAS) to assist situation managers and first responders Benefits An embodiment provides particular benefits that include, but are not limited to, the following:

- Correlate seemingly innocent events to deuce to resolve blended threats and vulnerability.
- Deliver location spaced geo-spatial information to respond to events accurately in real-time
- Leverage investments in surveillance systems, sensor networks and other automation systems to get rich visual scene representation
- Real-time detection and interdiction reduces losses by stopping incident from progressing
- Can be deployed as an add-on system without requiring any system or equipment replacement
- Active Policy Enforcement guarantees continuous compliance with regulations and standards at all times.

AlertAction Storyboard

An embodiment provides particular processes for geo-spatial monitoring and remediation of cross-enterprise threats, such as AlertAction subsystem 412, in a story board presentation as follows. It should be appreciated that the following is to be illustrative only and is not meant to be limiting.

An embodiment provides a summary listing of all active alerts. A line level item detail view provides tasks associated with the particular alert. Remediation scripts associated with the alerts can be pre-configured to execute at a specified time or trigger based on a particular event. The line level summary of the task associated with the alert is actionable, subsystem 412 also provides the user an ability to create a new task to associate with this alert. A live video feed provides the responder crucial information to determine the nature of alert and take further action or to reject the alert to take no further steps. Subsystem 412 provides the user the status of completion of each remediation script item. A geo-spatial view of the alert is also provided by the application as part of the executable tasks. Drill down geo spatial feed gives the responder a complete scenario view on the alert.

Subsystem 412 gives a visual interface to the risk that is detected and provides actionable tasks to the responder of the alert. Subsystem 412 provides a single interface by connecting the CCTV camera installed in the sabotaged zone of the location to make meaningful decisions. Zoom capability is provided. Subsystem 412 provides the ability of the responder to initiate a lockdown of the zone to isolate the incident and to contain cascading damage.

An Exemplary Subsystem—AlertControls and AlertMonitor

An embodiment provides an exemplary subsystem for sustainable compliance with continuous controls monitoring 414, referred to herein for convenience as AlertControls.

An embodiment provides controls documentation, testing and compliance computer-implemented subsystems.

According to an embodiment, AlertControls subsystem 414 provides an intuitive and effective automated compliance program that can scale to monitor and test controls for cross-enterprise processes. Built—in controls covering multiple regulations, standards and frameworks reduce costs and streamline compliance by eliminating a multitude of point solutions and duplicate controls testing. With AlertControls subsystem 414, organizations may automate controls testing and deliver workflow-based remediation capabilities. AlertControls subsystem 414 extends beyond IT into the enterprise to include controls from Physical Access Control Systems and Industrial Control Systems to correlate blended threats, detect fraud and provide unprecedented protection from sabotage and malicious insider threats.

It should be appreciated that organizations are facing a crushing burden as they try to comply with increasing regulations and more intensive audits. Many regulations require that risk assessments include controls beyond IT.

Documenting controls is an essential step but it only provides a compliance snapshot in time, leaving too much room for error and potential for corporations to miss possible fraud or serious mistakes that could ruin corporate brand or reputation in addition to revenue losses and fines.

Thus, an embodiment provides automation of the compliance process. With AlertControls subsystem 414, companies may conduct multiple assessments simultaneously, test controls across multiple regulations and frameworks including ISO 27001/27002, NIST SP800-53, SOX, HIPAA, NERC-CIP, CFATS, PCI DSS etc., automate human response via e-surveys, eliminate duplicate testing and leverage built-in configurable workflow to adapt to existing structures and business processes.

It should be appreciated that with AlertControls subsystem 414 organizations can perform the following, but are not limited to performing the following:

- Leverage a business-friendly, intuitive compliance program that is easy to use and ensures sustainability
- Reduce cost and eliminate duplicate applications by leveraging the built-in multi-compliance framework and generic controls engine to automate controls testing across regulations
- Decrease their Total Cost of Ownership (TCO) exponentially by leveraging a modular design to include new controls.
- Scale their compliance program to an enterprise-level across hundreds of thousands of transactions.

Figure 19:
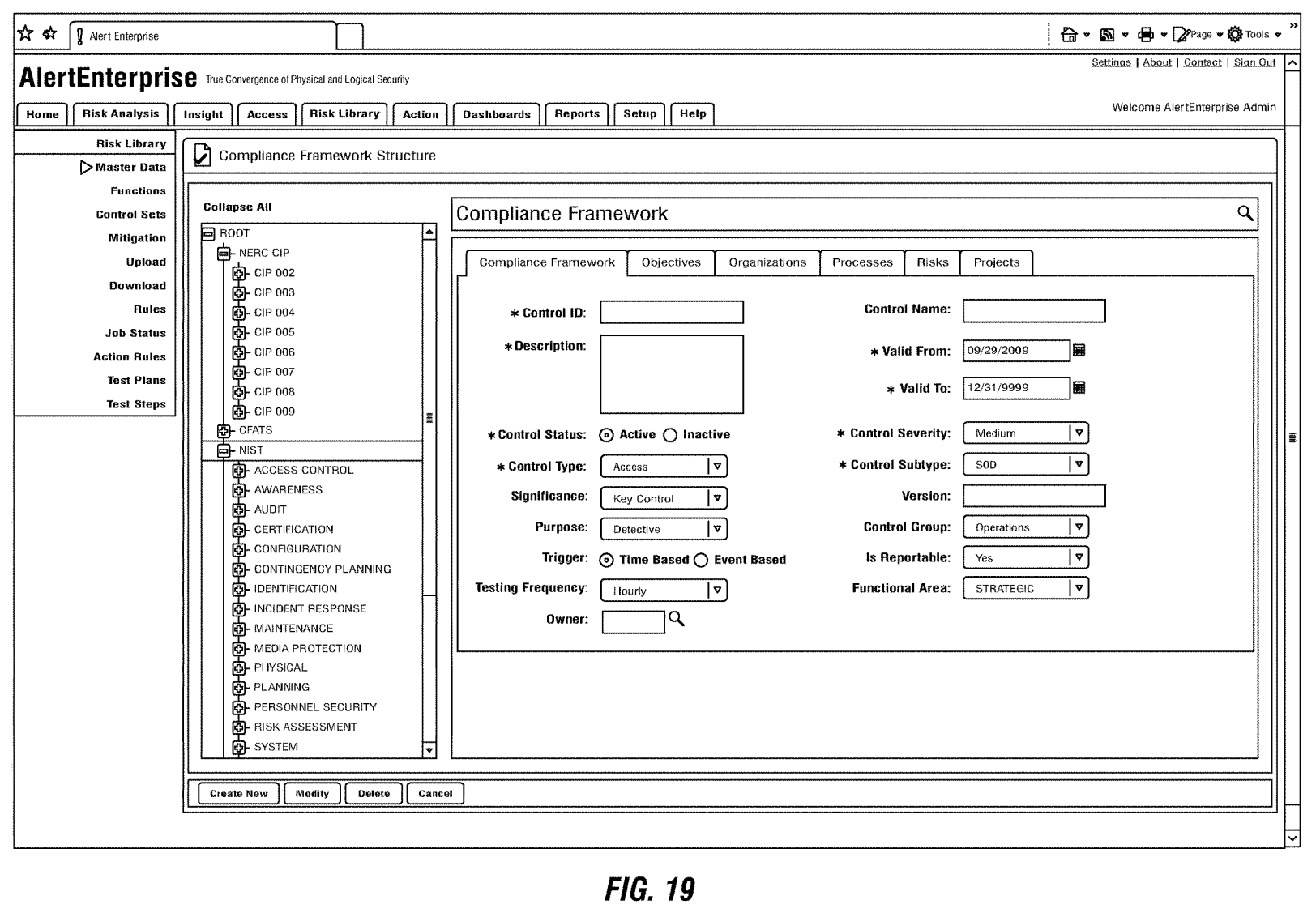

An embodiment can be understood with reference to FIG. 19. FIG. 19 shows a sample screen shot of how users are allowed to select compliance frameworks from multiple authoritative sources when testing controls delivering a continuous compliance automation solution. FIG. 19 shows a compliance framework tab is selected. Particular details are presented. For example, the control status is shown to be active. As another example, the control type is shown to be access. As a third example, the trigger type is shown to be time-based.

According to an embodiment, AlertControls subsystem 414 is an enterprise-level system that allows companies to conduct multiple assessments simultaneously, test controls across multiple regulations, include human response via e-surveys, and automate testing of controls and leverage built-in configurable workflow to adapt to existing organizational structures and business processes.

Features

An embodiment provides particular features that include, but are not limited to, the following:

- Active testing of Transactional, Master Data and Application Controls
- Continuous controls monitoring capabilities
- Ability to aggregate risks across enterprise applications including Oracle, SAP, PeopleSoft etc.
- Web-based application that integrates with portals to conduct risk and compliance management
- Common Controls Repository for Rationalizing Controls across Frameworks
- Support for Multiple Standards, Regulations and Best-Practice Frameworks Support for Control Documentation and ability to attach evidence Automated assessment support for assets, people, processes and applications Automated Controls Testing including e-Survey capability Integrated with Security Automation Tools and Web-feeds Built-in workflow to mirror organization's existing practices Benefits An embodiment provides particular benefits that include, but are not limited to, the following:

Creates a sustainable, repeatable process for continuous compliance

Integrated with correlation engine to detect threats and fraud

Reduces the time-to-compliance by eliminating duplicate testing

Enterprise-wide system-of-record for tracking many assessments

Eliminate dependence on spreadsheets and emails to complete assessments e-Surveys deliver human response automation to reduce time and complexity Track and store electronic evidence for audit support Assign and track compensating controls As can be understood from FIG. 1, AlertControls subsystem 414 provides continuous control monitoring across multiple regulations.

Further, AlertControls subsystem 414 provides continuous controls monitoring to:

Drive compliance accountability into the organization

Insure that each control is performing effectively

Standardize compliance procedures and retain knowledge

Actively enforce policies by making sure that controls remain active inbetween audit cycles AlertControls Storyboard An embodiment provides particular processes for sustainable compliance with continuous controls monitoring, such as AlertControls subsystem 414, in a story board presentation as follows. It should be appreciated that the following is to be illustrative only and is not meant to be limiting.

Subsystem 414 provides components of the risk library and displays such components on a screen from defining controls, the associated components and testing of the controls. The entities list on the screen are related and may be associated with one another and to the controls defined by the entity. Subsystem 414 provides for operational and reporting flexibility. Subsystem 414 provides an organization setup screen that allows the entities to define the hierarchical structure of their organization as it pertains to their framework. Subsystem 414 provides a process setup screen that allows the entities to define the hierarchical structure of their business or IT or any other processes as it pertains to their framework. An objective setup screen is provided that allows the entities to define the hierarchical structure of their business objectives or goals associated with processes and projects or controls. A compliance framework setup screen is provided for defining regulations mandated for the entity or any desired compliance framework and used for associated with any of the attributes. A process setup screen is provided for the components of the risk library to be displayed from defining controls, the associated components and testing of the controls. A controls search screen is provided for displaying the components of the risk library from defining controls, the associated components and testing of the controls. The components of the risk library are further displayed in a controls listing screen from defining controls, the associated components and testing of the controls. As well, components of the risk library are further displayed in a controls definition screen from defining controls, the associated components and testing of the controls. Subsystem 414 provides a control set definition screen. Such subsystem gives the ability to group the controls to create a control set; such feature enables batch execution of automated controls. A scheduling test of controls screen is provided; such screen gives the ability to select from available set of controls to execute operation of the controls. A scheduling of controls screen is provided for testing controls based on pre-set timeframes or manually scheduled giving flexibility to auditors and control owners to verify controls on an ad-hoc basis. A test steps creation screen is provided for manual testing of controls. Test steps are created to help control testers to use a guided procedure to execute controls testing. A test plan creation screen is provided to create test plans that aggregate test steps and associated them with controls that are being tested. An automated controls testing screen is provided for rule definition. Rule definition is a highly flexible feature that gives the ability to define conditions and execute rules—time-based or event-based. Automated controls are tested with such rules. A home page of the user is provided that is customizable with configurable dashboards and lists the tasks that the user is assigned to perform. A test plan task detail screen is provided that to display assigned test plans on the home page of the control owners. Detailed plan execution steps are presented from the homepage upon clicking the task item. A dashboards setup screen is provided for presenting drill down dashboards. Such dashboards may be executed for control failures based on associated parameters. A dashboard drill down screen is provided that generates a report on the cause of control failures. Further, the details of the failed control may be displayed to the test step level; such reports may be exported to different formats, such as pdf, excel or word formats.

An Exemplary Subsystem—Segregation of Duties

An embodiment provides a risk and vulnerability management system solution.

Overview

An embodiment provides a holistic risk and vulnerability assessment system solution, referred to herein as AlertInterceptor subsystem, that can identify access risks such as Segregation of Duties, Critical Access, Over Access, Super user access etc. across various ERPs, IT Applications, Facility Access Systems and Assets. AlertInterceptor deliver configurable rule sets that can be customized to key business applications to discover violations and generate alerts to decision makers. The rules based environment guarantees that changes to the underlying applications can be accommodated with simple rule changes.

Capabilities

Figure 37:
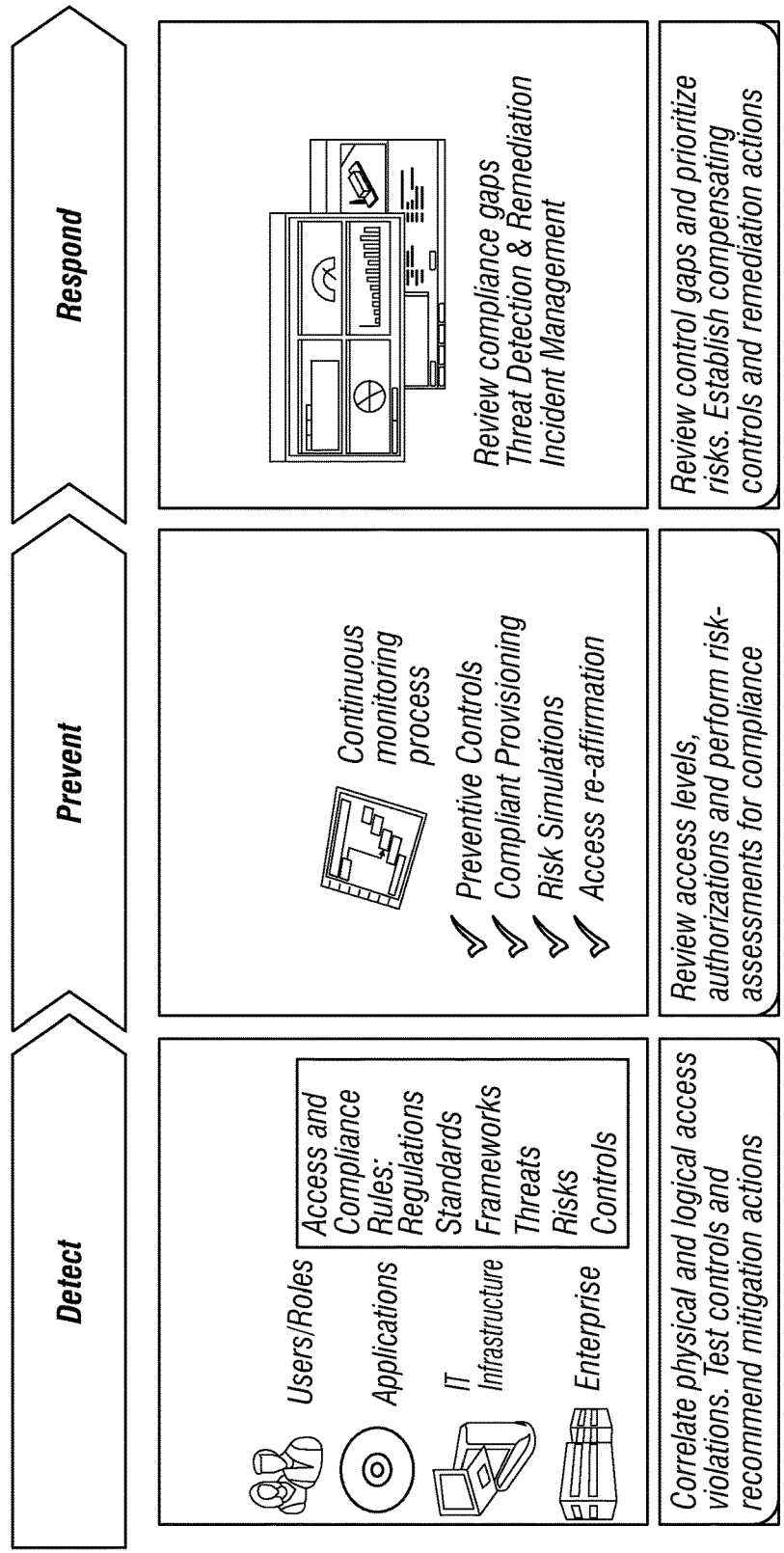
FIG. 37 is a schematic diagram showing particular detect, prevent, and respond step process to provide a continuous risk management process, according to an embodiment.

An embodiment provides, but is not limited to, the following capabilities:

highly optimized, generic, cross-platform and fast rule engine that can analyze entities for risks at a very high rate and identify blended threats Offers very powerful actionable reporting that provides capability for remediation and mitigation of risks through a business-friendly interface Ability to document and analyze risks & vulnerabilities for multiple compliance standards including SOX, PCI and other regulatory standards An embodiment can be understood with reference to FIG. 37. FIG. 37 is a schematic diagram showing particular detect, prevent, and respond step process to provide a continuous risk management process, according to an embodiment.

It should be appreciated that AlertInterceptor subsystem Identifies access risks, such as segregation of duties (SoD), critical access and "Super-User" (administrator) access, across multiple ERPs, IT applications, control systems, PI servers and physical access systems.

Features

An embodiment provides, but is not limited to, the following features:

- Powerful and generic access risk models that can scale to a multitude of IT apps, facility access and asset management systems;
- Industry specific, best practice set of risks and rules for compliance standards like SOX, PCI, and other regulatory standards, facilitates faster implementation;
- Enterprise level solution with ability to report by organizations, processes, areas etc and encourage collaboration among business users;
- Workflow driven risk mitigation and remediation capabilities allows for easy and automated projects; thus, helping avoid costly manual remediation and re-design projects;
- Business friendly risk methodology & interface for creating and modifying risks and rules;
- Out of the box reports and dashboards to expedite assessments and clean-up processes;
- Complete audit trails with action logs;
- Out of the box adapters for ERP systems (SAP, Oracle, People soft), IT Apps (Directory servers, IDM systems etc), Facility Access Systems (GE, Lenel, JCI) etc;
- Ability to run enterprise wide cross-platform risk assessments to provide holistic picture;
- Ability to integrate with external apps (like user provisioning etc) for user risk assessment purposes;
- Canned Security and audit reports and ability for business users to create own reports on fly;
- Web based application with an intuitive interface.

Benefits

An embodiment provides, but is not limited to, the following benefits:

- Reduce costs through automation of Audit and Compliance functions
- Faster time to compliance
- Free up IT staff to work on more strategic projects
- More secure, better visibility

An Exemplary Subsystem—Multi-Regulatory Compliance System Solutions

An embodiment provides a multi-regulatory compliance system solution for managing risks, reducing complexity, and lowering costs.

Overview

Even in the face of challenging economic times, companies have to meet their regulatory compliance obligations just to stay in business. As the number of regulations are continuing to grow and the cost pressures mount, auditors are getting more insistent on conducting complete assessments that include processes, people, IT assets and applications to evaluate risk. Dealing with compliance in silos as an afterthought just doesn't work.

Executives are challenged with responsibility for compliance but they lack visibility into the violations or compliance gaps at the business or IT level. AlertEnterprise delivers a compliance management solution leveraging its risk analysis engine that can look across existing enterprise applications, critical business applications, security automation tools and industrial control systems to aggregate information and conduct a true cross-enterprise risk analysis.

Additionally AlertEnterprise is the only solution that extends beyond just risk assessment to provide complete visual remediation of control violations and the ability to mitigate the risk.

It should be appreciated that alert enterprise system 100 provides Common Control and Risk Repository (CCRR) maps controls from multiple standards and regulations to a common framework eliminating duplicate testing. This reduces time to compliance by 70% and reduces audit costs by 30% or more.

Alert Enterprise System 100 Measures Risk Across it, Business Processes and Control Systems Most modern day business processes now run on IT systems. A key part of the securing the business is testing the underlying IT controls. This means application security, operating system hardening benchmarks, checking configuration management, patch management and network level security.

Many standards and best practice frameworks have evolved that provide a standardized set of General Computing Controls (GCC). alert enterprise system 100 can pull-in control results from security automation like vulnerability scanners, CMDBs, SIEMs, Integrated Security Managers (e.g. Symantec ESM and McAfee ePolicy Orchestrator) and DLP systems. Combining the test results from security automation tools that check for security gaps and vulnerabilities with control results from evaluation of business processes risk delivers the most comprehensive view of risk and compliance across the organization.

Regulations, standards and frameworks from authoritative sources include ISO 27001, ISO 27002, Sarbanes-Oxley, NIST SP800, HIPAA, GLBA, NERC-CIP, CFATS, PCI and many others. Alert enterprise system 100 includes e-survey capability for human response and attestation as well as multi-level workflow to automate the survey gathering and assessment process. An embodiment can be understood with reference to FIG. 1.

AlertEnterprise Multi-Regulatory Compliance Solutions

Alert enterprise system 100 provides a compliance management system solution that works with existing enterprise applications, security automation tools and critical business applications to aggregate information and conducts a true cross enterprise risk analysis. Alert enterprise system 100 Compliance Management system solution normalizes business level controls across multiple regulations, standards and frameworks and combines them with automated General Computer Control (GCC) test results to deliver the most comprehensive view of risk.

Figure 38:
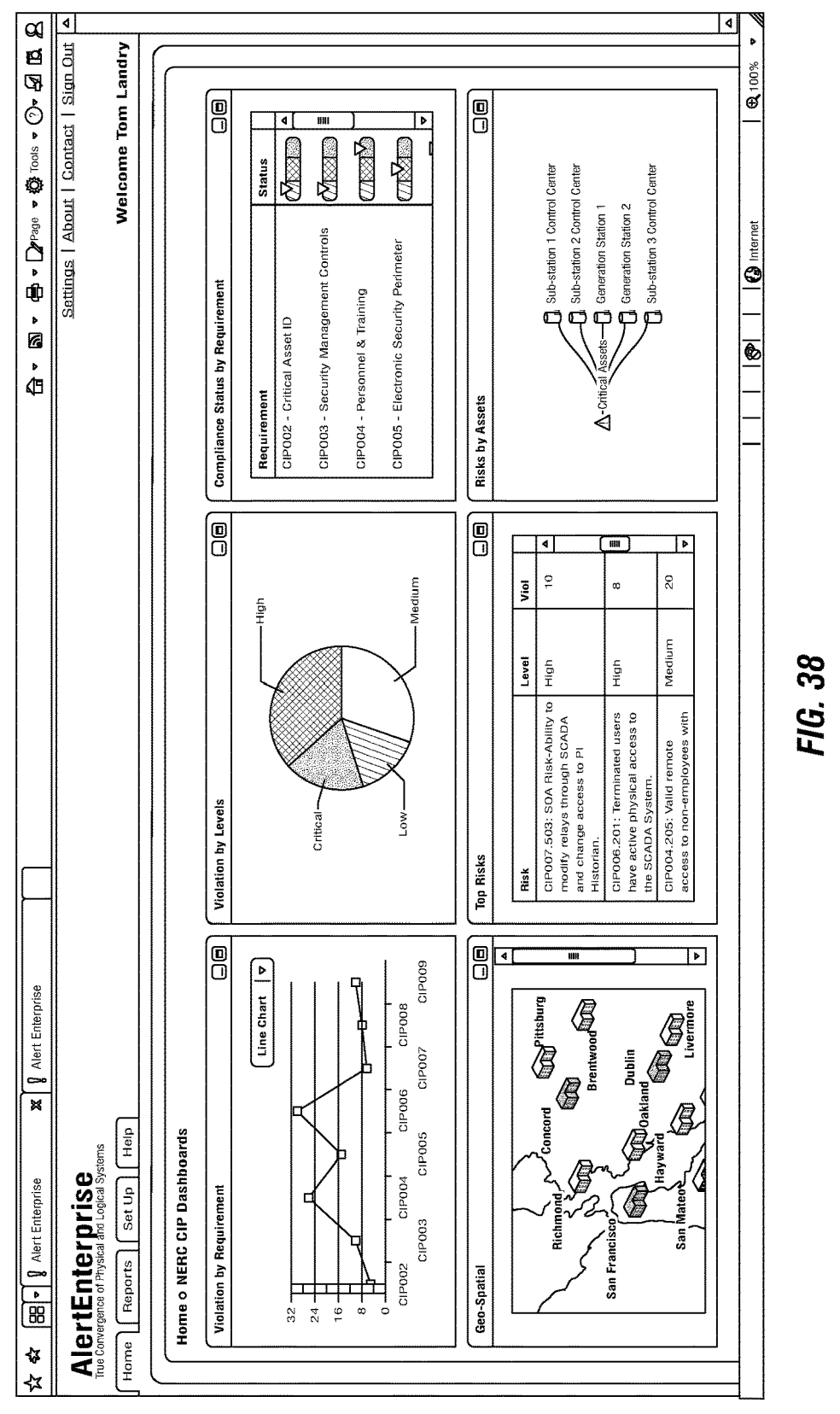

An Example of alert enterprise system 100 NERC CIP compliance system solution showing violations is shown in FIG. 38. FIG. 38 is a sample screen shot of the compliance solution showing violations, according to an embodiment.

Capabilities

- Automatic identification of control violations and mapping of controls to risks.
- Comprehensive risk analysis, visualization and exception handling.
- Powerful translation of controls into rules automating thousands of line items for testing and remediation.
- Accept test results from IT automation tools eliminating the need to re-test.

Multi-level workflow to support assessment, e-survey, attestation and audit functions.

Context based visual remediation with the ability to view risks and remediate in real-time delivering active policy enforcement Benefits Reduces time and cost for meeting compliance requirements Eliminate costly testing and re-testing of controls for internal assessments, compliance testing and audit purposes Technical controls included as part of standards and regulations do not have to be manually tested Most comprehensive view of risk with unprecedented visibility into complex risks Risk management can be "built-in" to the process Remediation of control violations can be automated, managed and tracked on a common dashboard Active policy enforcement delivers true compliance and security, not just check box documentation Common Controls and Risk Repository allows content related to regulations, standards and best-practice frameworks to be updated by users and customized to the organization's needs

An Exemplary Risk Repository and Control Document Design

Figure 21:
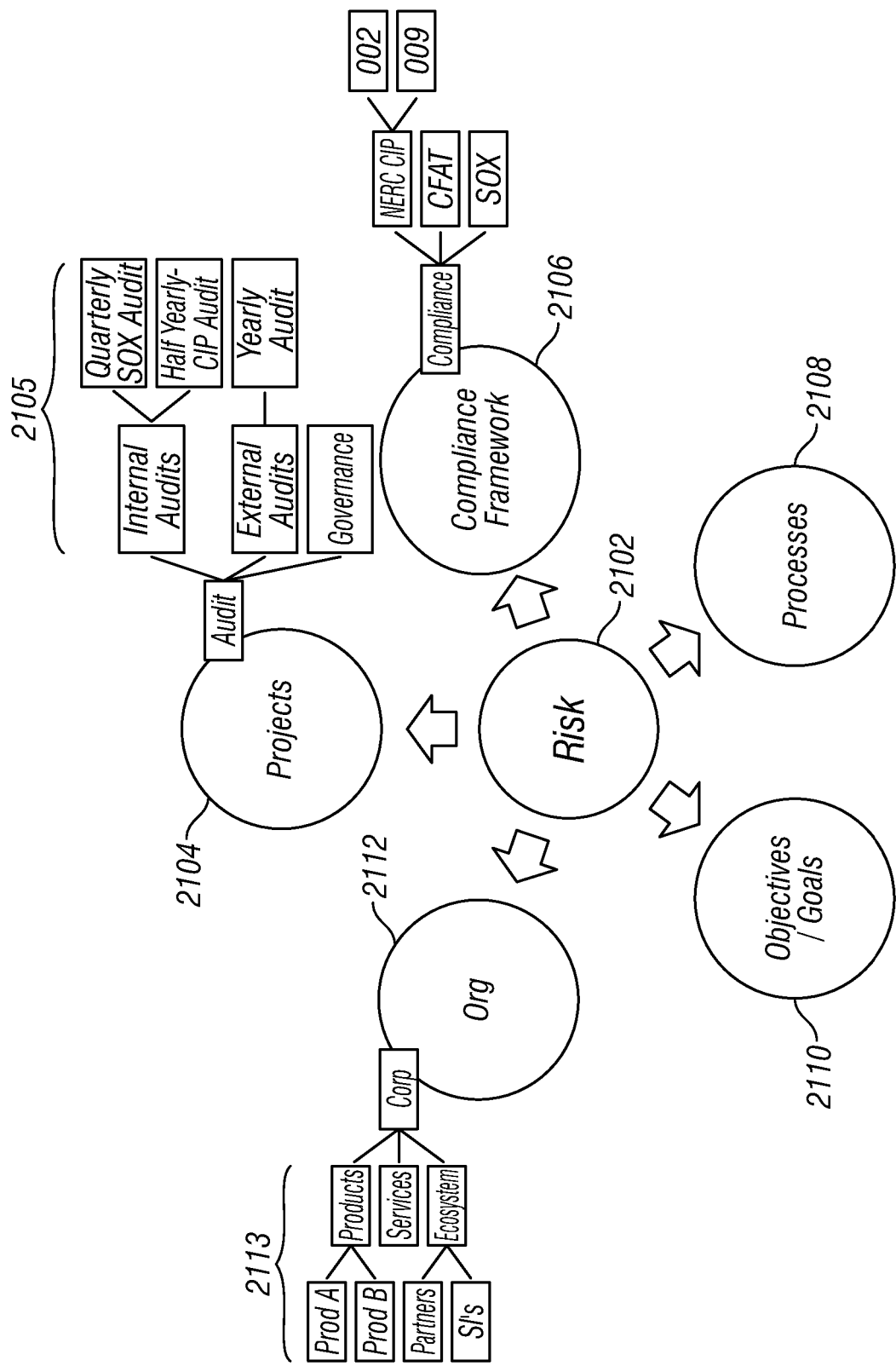
FIG. 21 is a schematic diagram showing a conceptual model view of how risk may affect and have influence over various aspects of an enterprise's assets, according to an embodiment.

An embodiment provides a risk repository and control document particular design. An embodiment of a risk based approach using a six NP model can be understood with reference to FIG. 21. FIG. 21 is a schematic diagram showing a conceptual model view of how risk may affect and have influence over various aspects of an enterprise's assets. For example, risk 2102 may affect an enterprise's projects 2014 that may include auditing processes 2105.

Risk 2102 may affect a compliance framework 2106 and its various processes. Risk 2102 may affect an enterprise's general and overall processes 2108. Risk 2102 may affect an enterprise's objectives and goals 2110. Risk 2102 may affect the organizations 2112 of an enterprise, including the products, services, ecosystems, partners, etc. 2113 of the enterprise.

Figure 22:
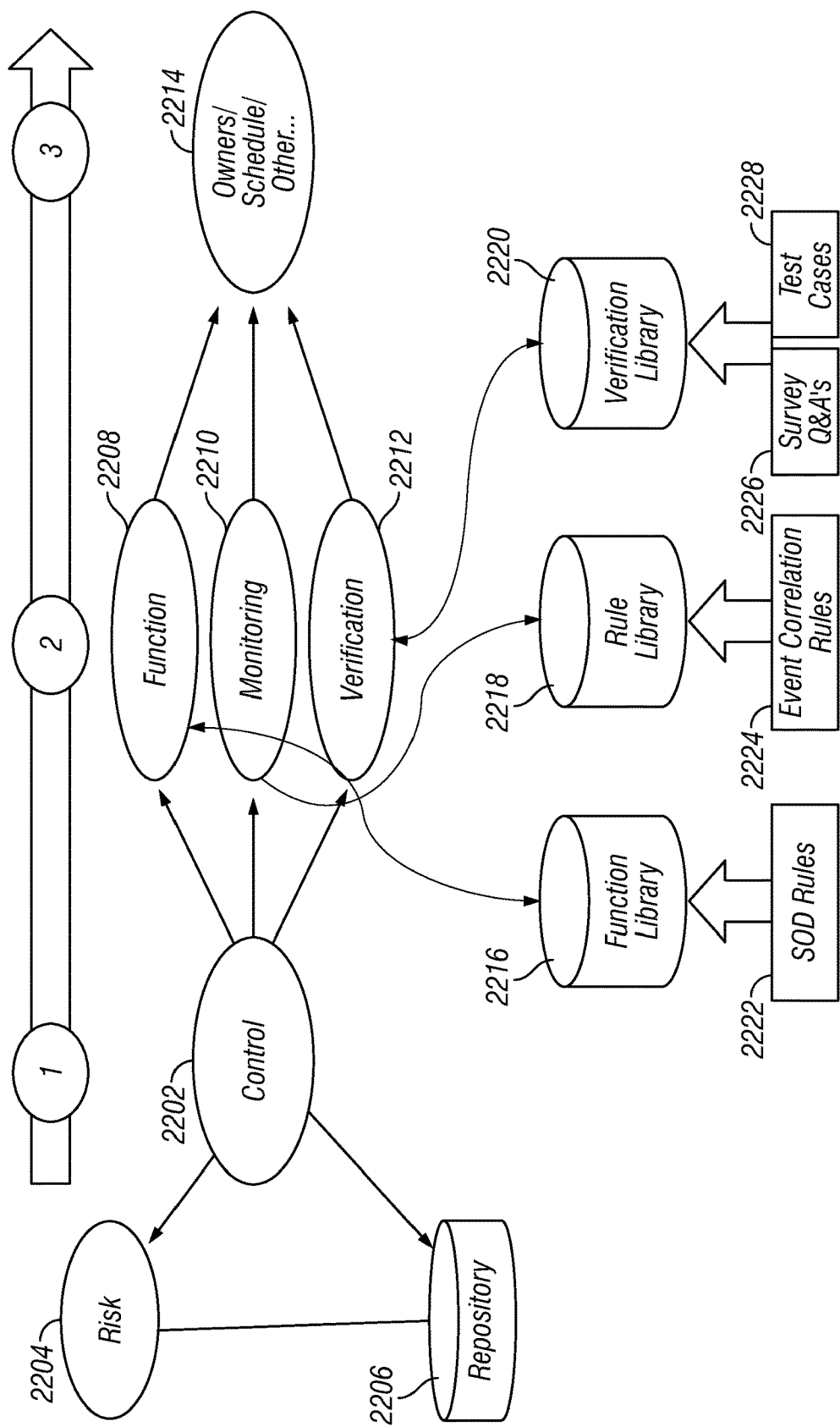
FIG. 22 is a schematic diagram showing a three-pronged architecture for risk and control documentation according to an embodiment.

An embodiment for risk and control documentation can be understood with reference to FIG. 22. FIG. 22 is a schematic diagram showing a three-pronged architecture for risk and control documentation according to an embodiment. A control processor 2202 is in communication with a risk processor 2204 and repository 2206, which is in communication with risk processor 2204, for sending messages thereto. Control processor 2202 also sends messages to a function processor 2208, a monitoring processor 2210, and a verification processor 2212, each of which may send respective messages to an owners processor, a scheduling processor, and other processors (collectively, 2214). As well, function processor 2208 is in communication with a function library 2216 that contains SOD rules 2222. Monitoring processor 2210 is in communication with a rule library 2218 that contains event correlation rules 2224. Verification processor 2212 is in communication with a verification library 2220 that contains survey question and answer data 2226 and test cases data 2228.

Report Repository and Registry

Figure 23:
FIG. 23 is a sample screen shot showing available reports, according to an embodiment.

An embodiment for report repository and registry can be understood with reference to FIG. 23. FIG. 23 is a sample screen shot showing available reports, according to an embodiment. In the particular sample, a reports tab is selected and four views of available reports are presented. One view shows a partial list of reports that reflect Role Analytics 2302. Another view shows a list of the Top ten (10) Reports 2304. Another view shows a partial list of reports related to User Analytics 2306. Another view shows a list of reports related to Custom Analytics 2308. It should be appreciated that the above particular views are by way of example only and are not meant to be limiting.

Graphical and Summary Report

Figure 24:
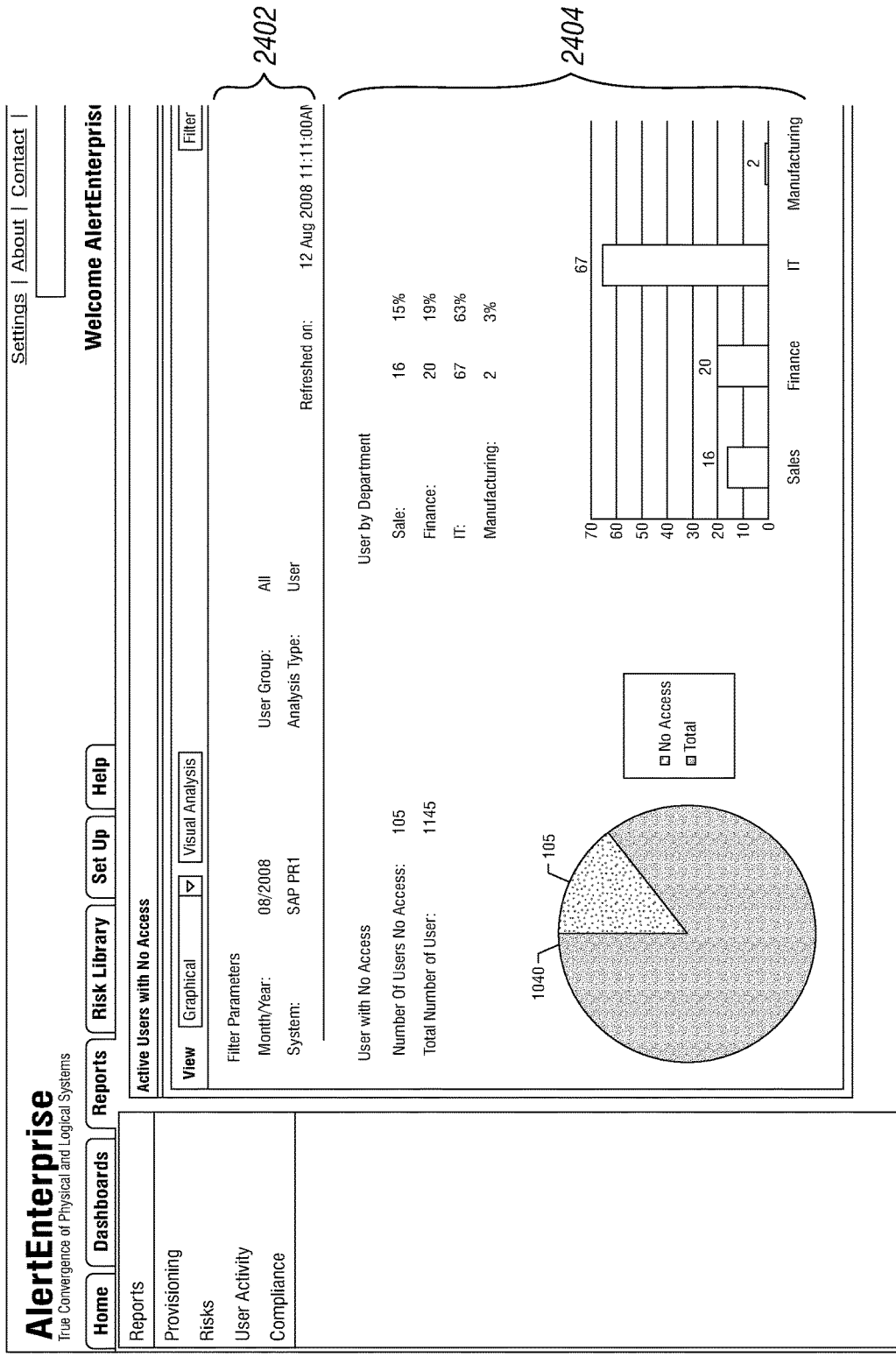
FIG. 24 is a sample screen shot of a graphical representation of a particular report, Active Users with No Access, according to an embodiment.

An embodiment provides a graphical and summary report, which can be understood with reference to FIG. 24. FIG. 24 is a sample screen shot of a graphical representation of a particular report, Active Users with No Access, according to an embodiment. In this example, a top panel 2402 is presented that displays the filtered parameters chosen or other related information. The bottom panel 2402 displays tabular data, as well as data presented in a pie chart and a histogram. It should be appreciated that the particular details displayed are by way of example only and are not meant to be limiting.

Drill Down Report

An embodiment provides information at a detailed level that can be accessed by a user by drilling down to a detailed report. An embodiment can be understood with reference to FIG. 25. FIG. 25 is a sample screen shot of a particular drill down report for roles, according to an embodiment. In this particular example, the all roles view is selected 2502. A particular list of seven roles is presented 2504. As well, for each role, the following attributes are displayed: a name attribute 2506, a description attribute 2508, a type attribute 2510, and a status attribute 2512. It should be appreciated that the particular details displayed are by way of example only and are not meant to be limiting.

An Exemplary Fabric Design Document

An embodiment provides an exemplary fabric design as shown below in Table A. It should be appreciated that such particular details are by way of example and are not meant to be limiting.

TABLE A 1.1 - Workflow

Workflow service can be found from spring application context using Service Locator and the below methods are defined.
public boolean initiateWorkflow(long reqId, String userId);
public boolean approveWorkflow(long reqId, String userId);
public boolean rejectWorkflow(long reqId, String userId);
public boolean holdWorkflow(long reqId, String userId);
public List getAllTasksInProcess(long processId);
See slide [6] for extensive information.
The workflow service uses the JBOSS BPM to
[Need more info from Kalyan]
In Alert Enterprise this workflow service is used for:
Submitting the request, approving the request.

1.2 - Scheduler

Scheduler can be found from spring application context using Service Locator and the below methods can be used to schedule the program.
Specified program once
    public boolean scheduleProgram (String programName);
Specified program once at specified date/time
    public boolean scheduleProgram (String programName, Date startDate);
Specified program in a given interval at specified time/date:
    public boolean scheduleProgram (String programName, Date startDate, Long duration);

TABLE A-continued

Specified program in a given interval at specified start/end for time/date
    public boolean scheduleProgram (String programName, Date
    startDate, Date endDate, Long duration);
1.4 - Connector Accepts Set of input params,
List of output params and retunrns single row map
Map invoke (Map inputParams, List outputParams) throws
ALEApplicationException;
Accepts Set of input params,
List of output params and retunrns mulitiple row map
Map invoke2 (Map inputParams, List outputParams) throws
ALEApplicationException;
Accepts Set of input params,
List of output params and retunrns void
Map invoke3 (Map inputParams, List outputParams) throws
ALEApplicationException;
void close( ) throws ALEApplicationException;
void reconnect( ) throws ALEApplicationException;
void invoke3(Map inputParams, Map inoutTables) throws
ALEApplicationException;
1.8 - Configuration Connector public SysConnector loadSystemConnector(long sysConnectorId) throws
ALEApplicationException, ALESystemException;
public SysConnector updateSysConnector(SysConnector sysConnector)
throws ALEApplicationException, ALESystemException;
public List updateSysConnector(List sysConnectors) throws
ALEApplicationException, ALESystemException;
public void removeSysConnector(SysConnector sysConnectors) throws
ALEApplicationException, ALESystemException;
public void removeSysConnector(List sysConnectors) throws
ALEApplicationException, ALESystemException;
These common components are used across the all the module. The
abstract explains where the common components are used.
1) Across all the module Logger Utils and Exception components are
used.
2) Globalization, Messaging, Business Delegates are used in UI Layout.
2) Data Services are used by all the Config services.
1.9 - Globalization Globalization has two parts to its component, Internalization and
Localization. See slide [8] for information; starts with the login screen.
Internalization -
Displays labels and messages in specific languages based on user
selection.
GetI18NValue (key, local)
→ Returns labels for a given key in a given local format.
Genl18NValue (key)
→ Returns label for a given key in a default local format.
Localization -
Displays the dates and currencies in the local specific format.
ConvertDatetoDBFormat (date)
→ Returns date in a default format.
ConvertDatetoDBFormat (date, pattern)
→ Returns date in a given pattern format.
ConvertDateToUIFormat (date)
→ Returns date in the specified date format.
The UI date format will be taken from the database.
ConvertCurrencyToDBFormat (currency)
→ Returns currency in a default format.
ConvertCurrencyToDBFormat (currency, format)
→ Returns currency in a given pattern format.
ConvertCurrencyToUIFormat (currency)
→ Returns currency in the specified date format.
The UI currency format will be taken from the database.
1.10 - Messaging Used to get error messages in the local specific format.
It uses the I18N utility to retrieve the local specific messages.
GetMessage (message code, local)
→ Returns the error message for a given message code in a given local
specific format.
GetMessage (message code)
→ Returns the error message for a given message code in a default local
format.
Get Message (message code, msgArgs, local)
→ Returns the dynamic message by applying the message arguments.

TABLE A-continued

The purpose of the exception is to trace the application handling errors
effectively, handling the application and system errors. In the case of when
there is a business error related business validation system exception, there
are communication errors with the external system.
ALNTApplicationException - error codes.
ALNTSystemException
All these exception are extended from Java exceptions. In addition to that,
if it is necessary, the developer can create his or her own exception. Each
exception is associated with the error code. The message for the error
code
is defined in the AlertEnterprise database. These messages are converted
to language-specific states using the globalization component.
BUSINESS VALIDATION
For example, 1 - User does not exist in the external system.
1.13 - Logger Alert Enterprise uses the Log4J component to handle the logging. To trace
the application flow, finding the errors and unexpected behavior of the
application logging needs to be done effectively.
For Alert Enterprise, there are wrappers written on top of Log4J, which
uses all Log4J API to log the messages. The entire configuration is
done through Log4Jconfigiruation.xml, which contains the location of
the log file, format of the logging message, and facility to switch on/off
the logging.
There are different APIs defined in the logger wrapper:
    ALNTLogger.info (class name, message)
    ALNTLogger.debug (class name, message)
    ALNTLogger.error (clean name, message, exception)
1.14 - Utils All the Alert Enterprise utility wrappers are categorized as utils, which can
be used for conversion of data, currency, I18N, messaging, etcetera.
    I18N utils:
        GetI18NLabel (key, local)
        GetI18NLabel (key)
    Message utils:
        GetMessage (key, local)
        GetMessage (key, string [ ] args, local)
        GetMessage (key)
    Localization utils:
        ConvertDateToDBFormat (date)
        ConvertDateToDBFormat (date, format)
        ConvertDateToUIFormat (date)
        ConvertCurrencyToDBFormat (currency)
        ConvertCurrencyToDBFormat (currency, format)
        ConvertCurrencyToUIFormat (currency)
    String utils:
        FormatDate (date)
        FormatDate (date, pattern)
        ParseDate (date)
        ParseDate (date, pattern)

An Exemplary SAP HR Implementation

An embodiment provides a particular SAP HR implementation, some details of which are shown in Table B hereinbelow. It should be appreciated that such details are by way of example and are not meant to be limiting.

TABLE B 2.1 - Abstract

Figure 26:
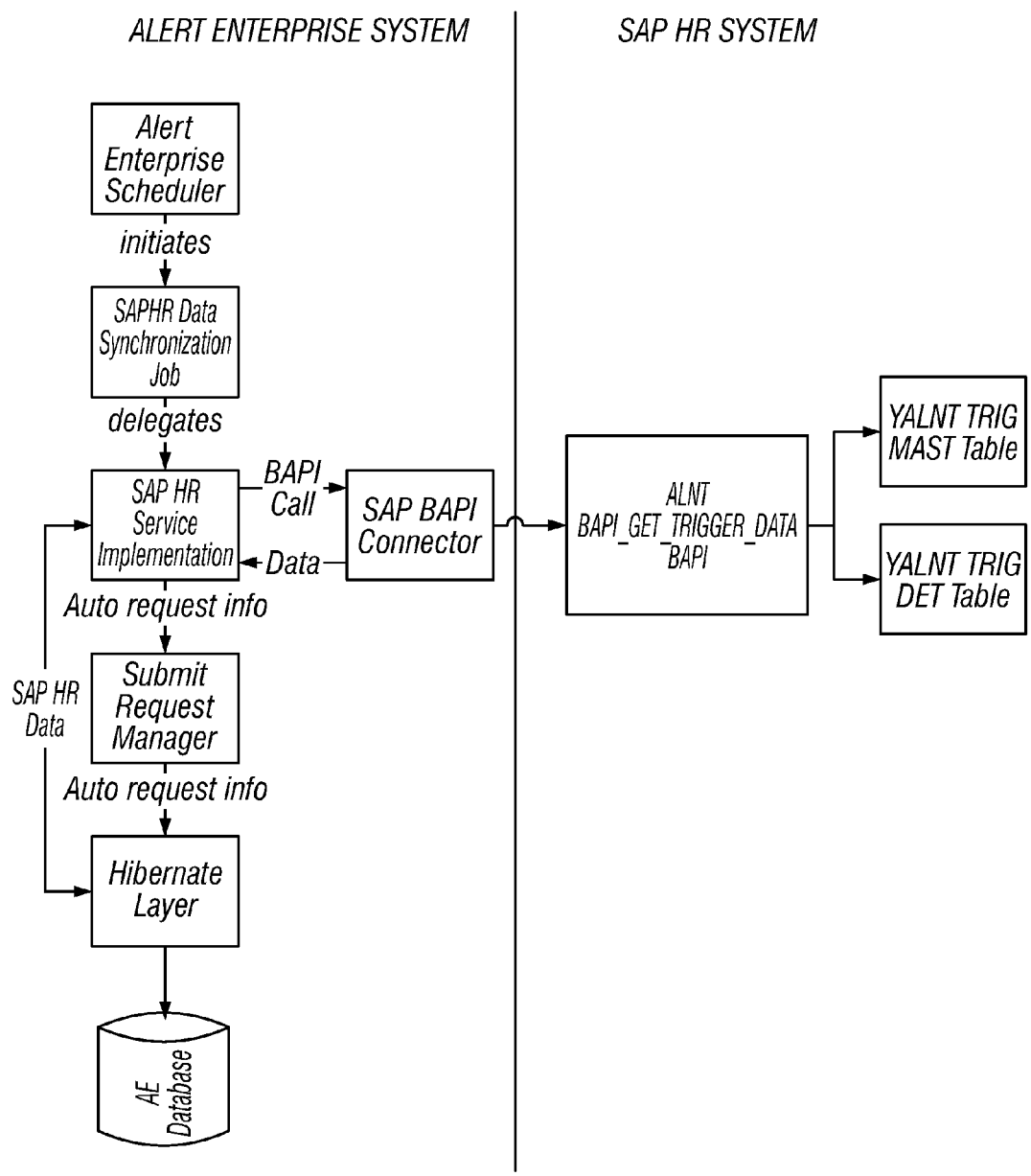
FIG. 26 is a process flow diagram, according to an embodiment.
Figure 27:
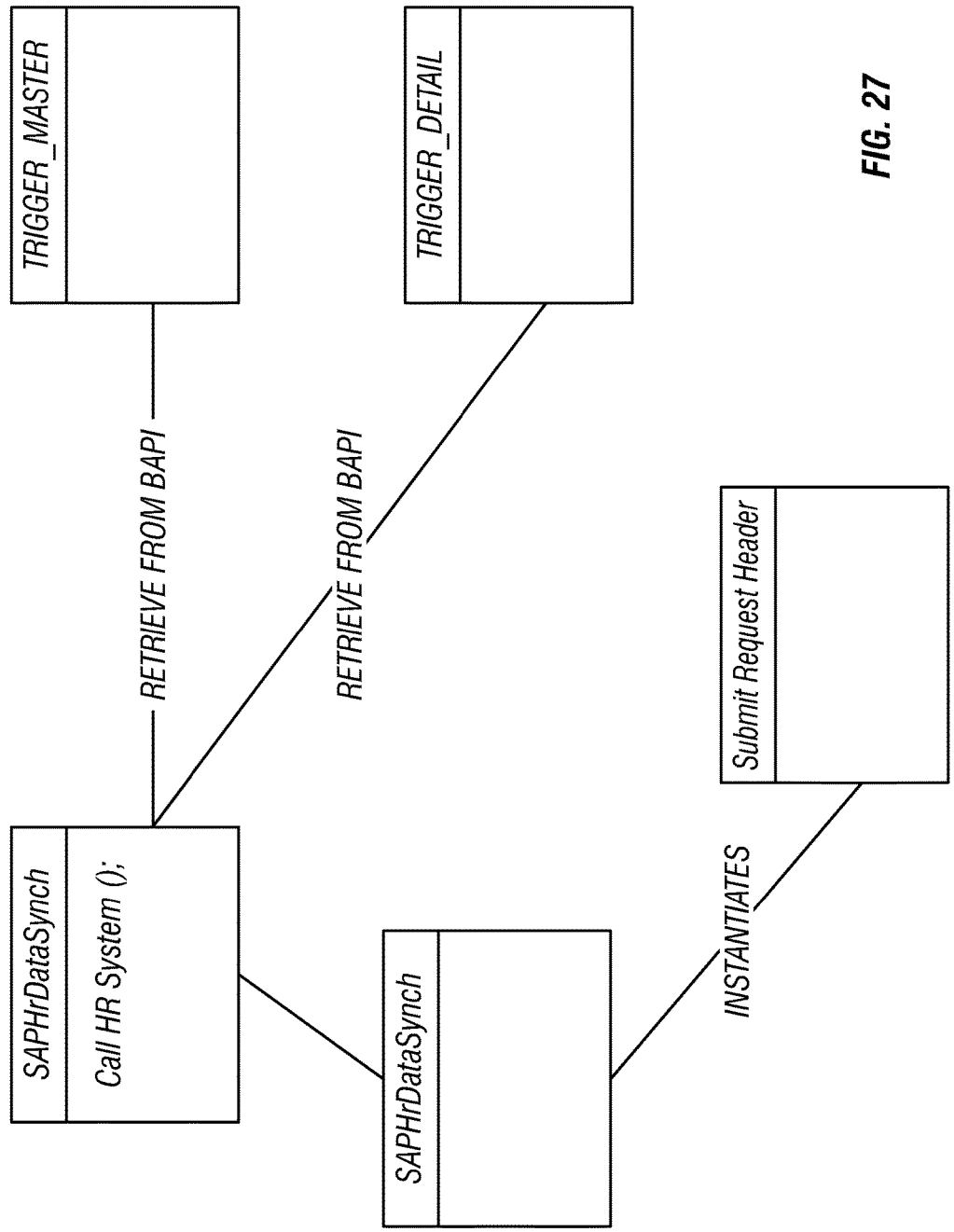
FIG. 27 is an object diagram, according to an embodiment.
Figure 28:
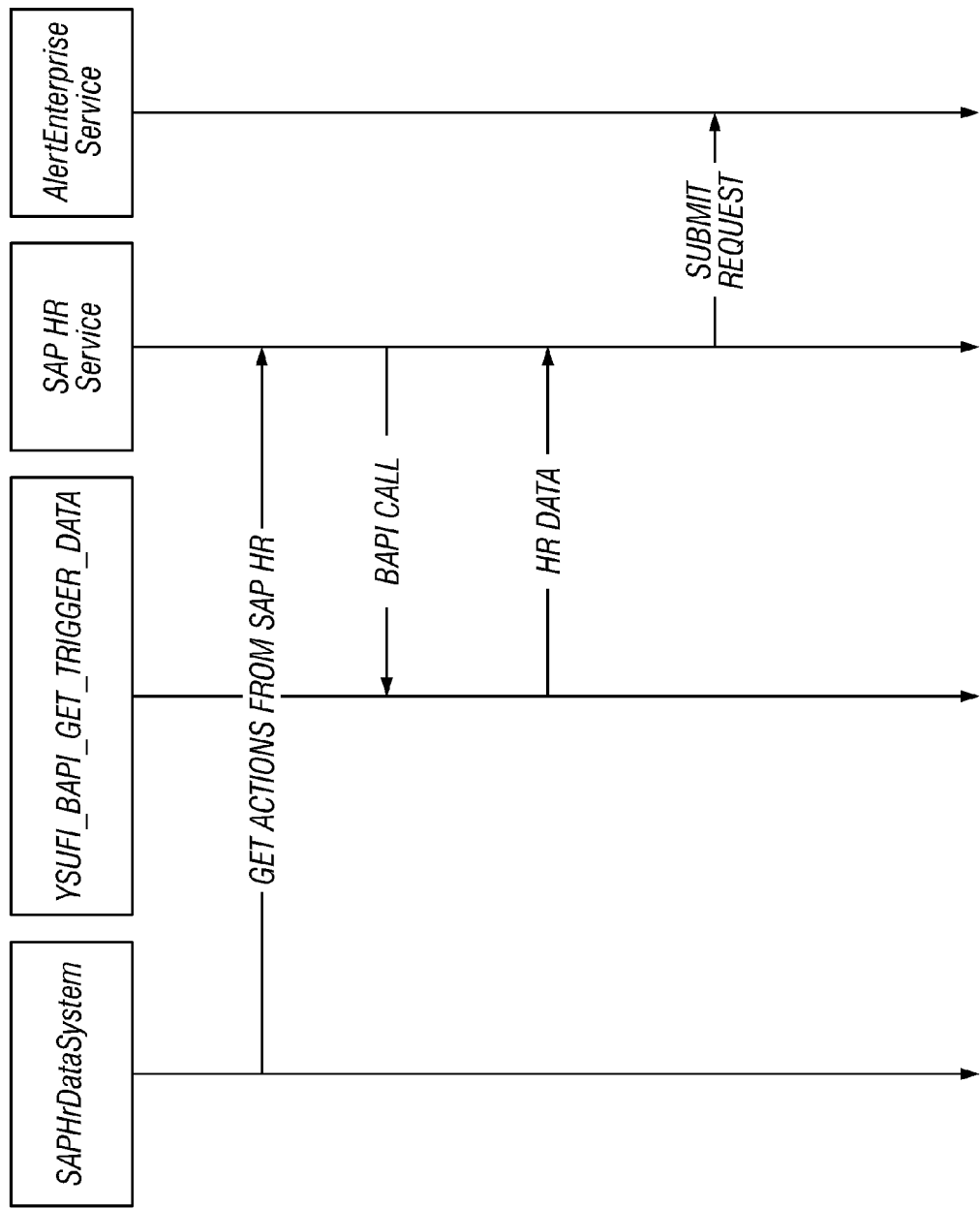
FIG. 28 is a sequence diagram, according to an embodiment.
Figure 29:
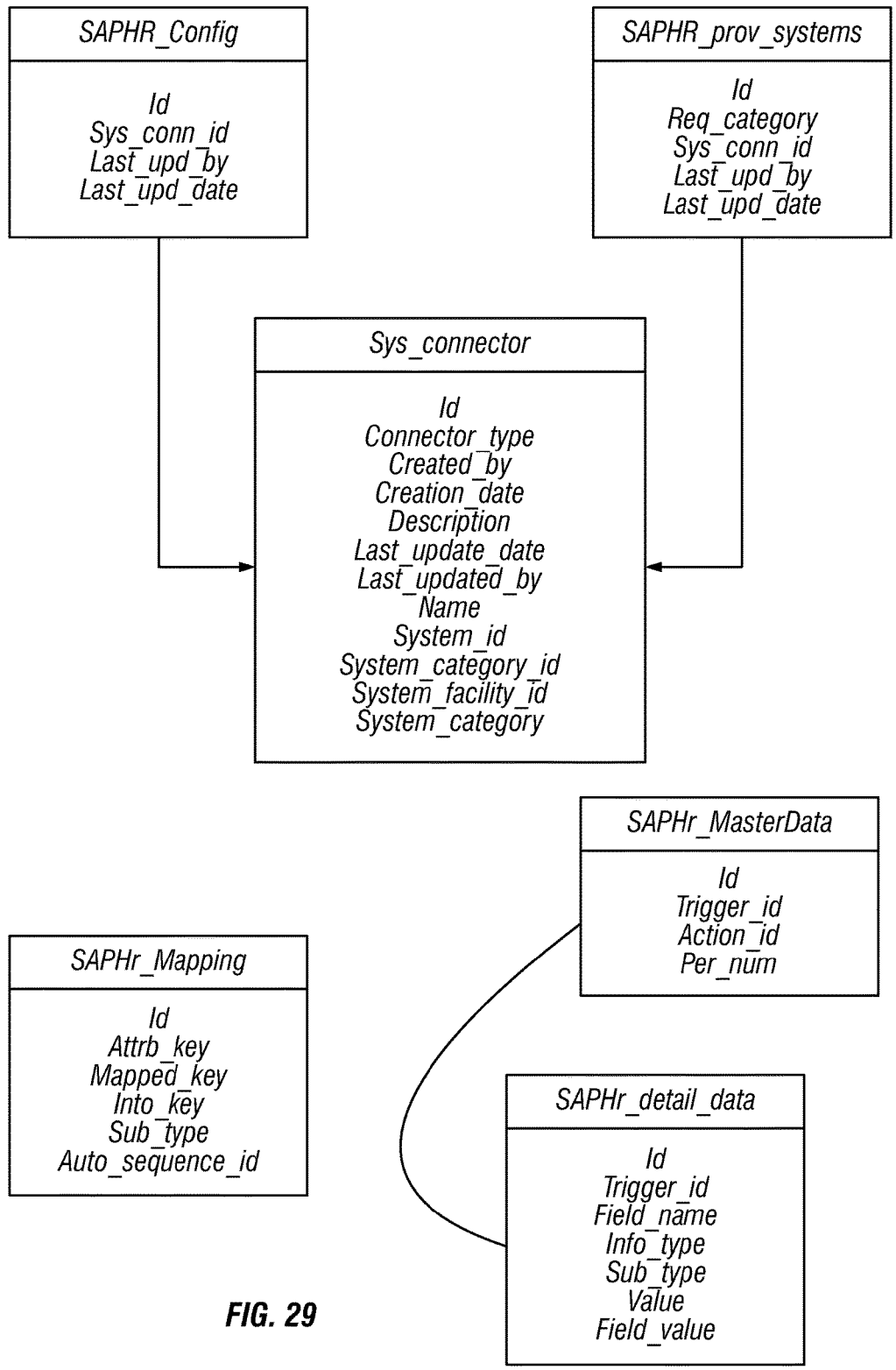
FIG. 29 shows a data model, according to an embodiment.

SAP HR retrieves the HR records from the SAP HR and creates the
request in the Alert Enterprise system. When this module is run using the
scheduler, it will find out whether there are records added after the last
run
and creates auto request for these HR records.
For SAP HR, exists BAPI (Business Application Program Interface), a
program that can be accessed from SAP HR SYSTEMS to any external
system, for example, ALERT ENTERPRISE.
HIRE → NEW HIRE
TERMINATE → LOCK TABLE B-continued This BAFI finds employee records in the SAP HR, return to the
systems that calls this function. Alert has a program called SAP HR
DataSynch, which periodically calls this function.
The BAPI uses two tables: ysufitrigmast and ysufitrigdet.
Four classes used by the main class that is SAPHRDataSynchization:
    SAPHrDetailDo.java
    APHRMasterDo.java
    SAPHRServiceException.java
    SAPHrServiceImpl.java
FIG. 26 shows a process flow diagram, according to an embodiment.
FIG. 27 shows an object diagram, according to an embodiment.
FIG. 28 shows a sequence diagram, according to an embodiment.
FIG. 29 shows a data model, according to an embodiment.
2.6 - Notes SAP HR - the opposite of the provisioning.
If there are any changes, it should be updated in Alert Enterprise.

An Exemplary End User Form Implementation

An embodiment provides an exemplary end user form implementation as shown below in Table C. It should be appreciated that such particular details are by way of example and are not meant to be limiting.

TABLE C 3.1 - Abstract

Figure 30:
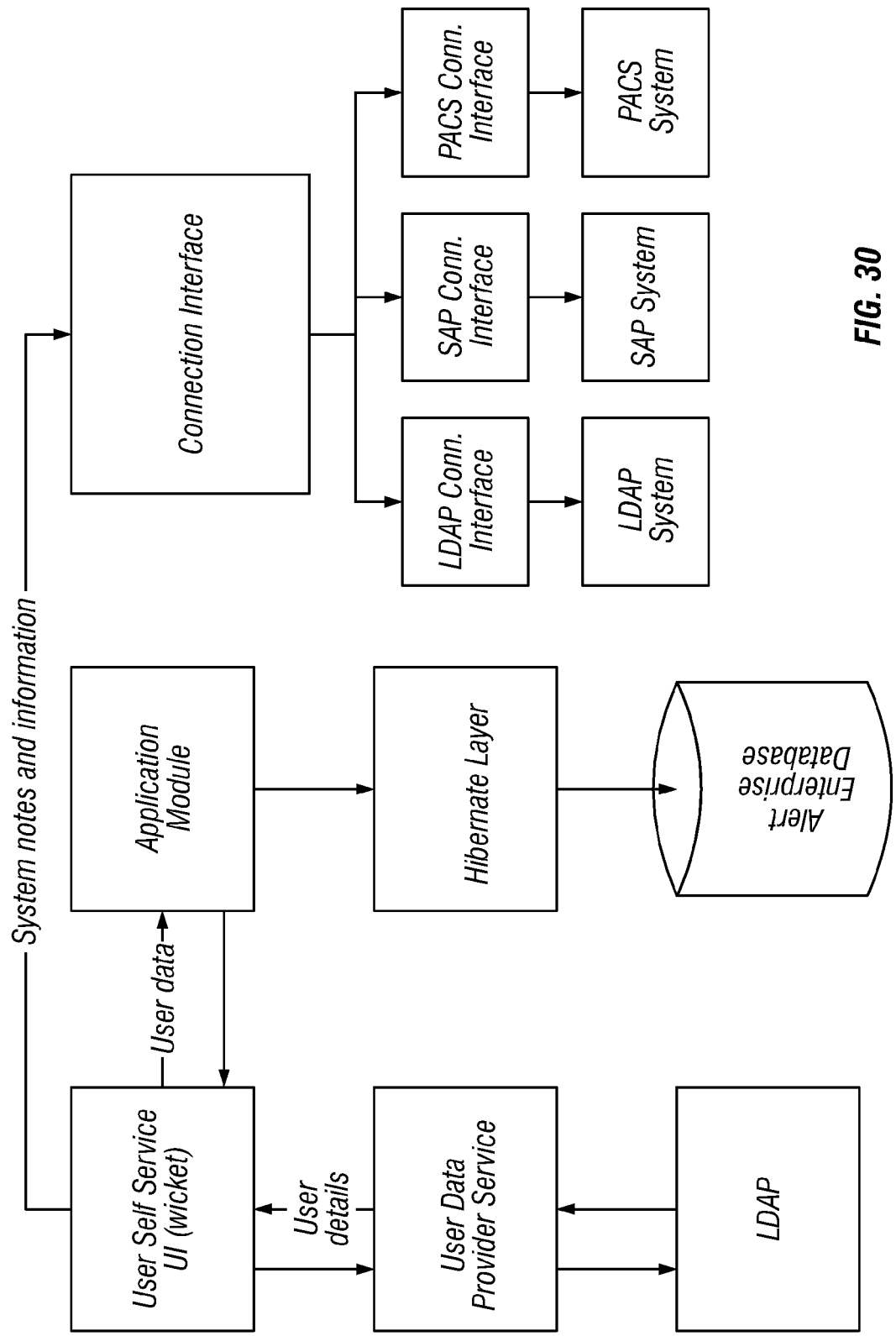
FIG. 30 is a flow diagram, according to an embodiment.
Figure 31:
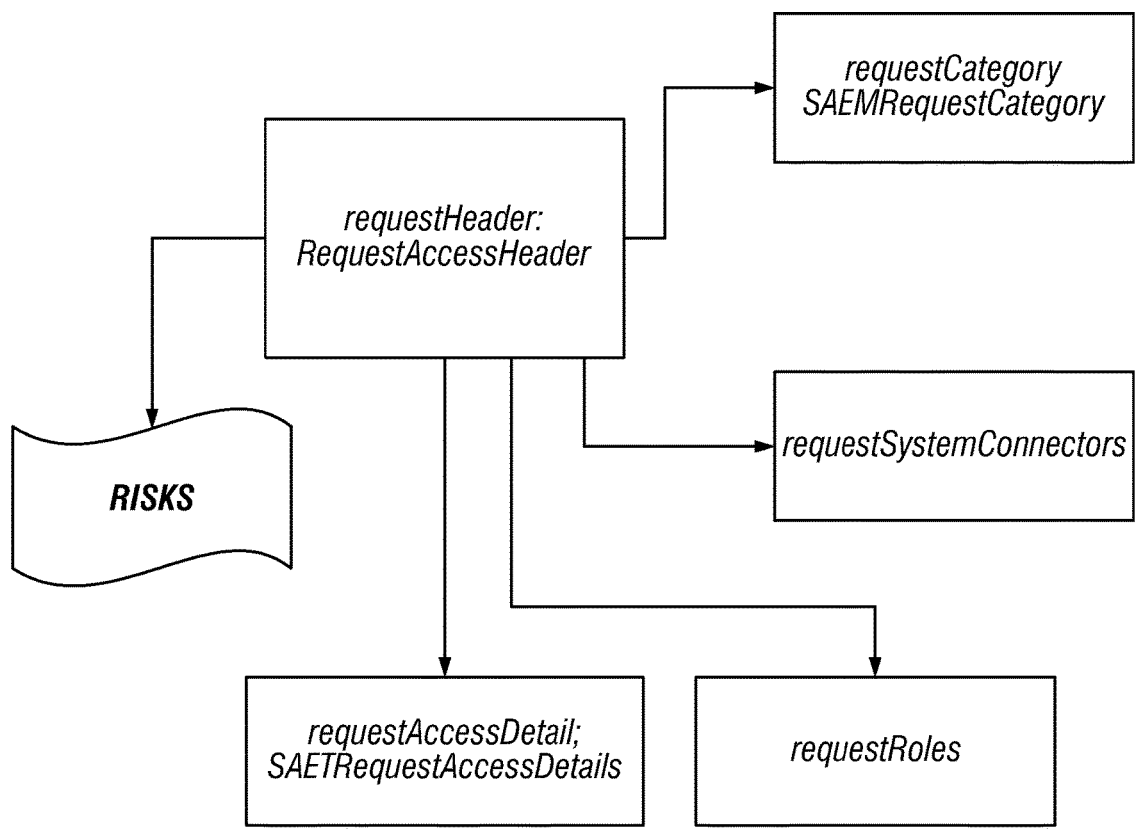
FIG. 31 is an object diagram, according to an embodiment.
Figure 32:
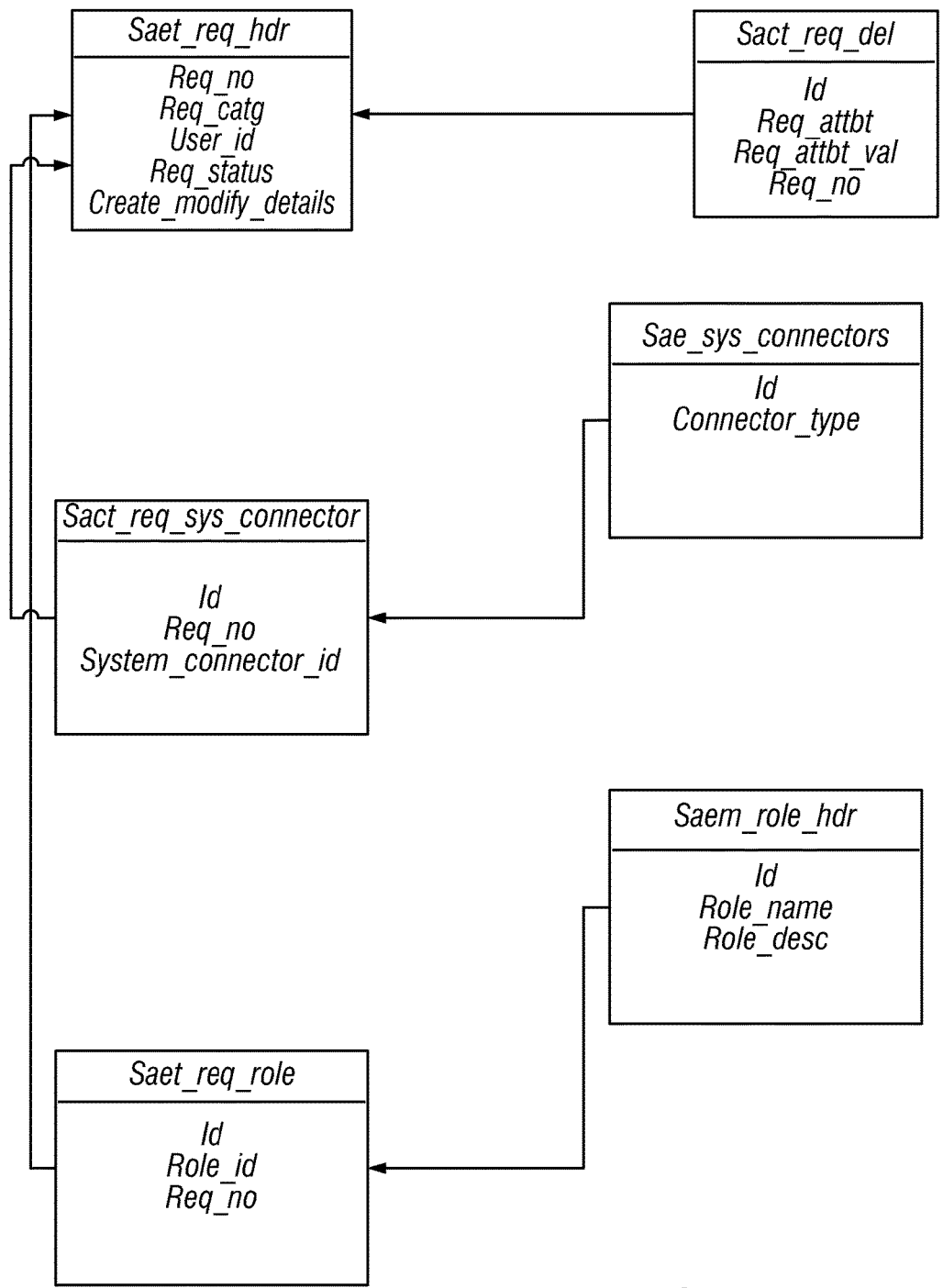
FIG. 32 is a data model, according to an embodiment.

For some to create request in the Alert Enterprise system and the request
is for creating a new user and assignment roles and permissions for the
user throughout various systems.
SET-UP → PROCESS ENGINE
OneNodeWorkFlow, TwoNodeWorkFlow, ThreeNodeWorkFlow
Based on the workflow, the process takes place.
The information then follows a workflow in which all the data entered
will go through one or many approvers depending on the process:
    One-node (in which only one check is done and the user will be
    provisioned into the system)
    Two-node (in which two checks are required prior to provisioning)
    Three-node (in which three checks are required prior to provisioning)
Prior to each check, a mail will be sent to the appropriate approver
informing them of the request creation. The mail notifications will not be
sent to the second-node or third-node approvers until the approver needed
to approve the request prior to them approves the request creation.
FIG. 30 is a flow diagram, according to an embodiment.
FIG. 31 is an object diagram, according to an embodiment.
FIG. 32 is a data model, according to an embodiment.

An Exemplary Risk Analysis Implementation

An embodiment provides an exemplary risk analysis implementation as shown below in Table D. It should be appreciated that such particular details are by way of example and are not meant to be limiting.

TABLE D 4.1 - Abstract

Risk analysis is a procedure to identify and assess factors that may
jeopardize the success of a project or achieving a goal. The procedure
will be called upon in two places - during user self-service and the
approver screen. For access, the risk analysis is to ensure security,
posing the question: does giving to a certain person, a new access in
combination with existing accesses, pose any threat to the company?
Risk analysis procedure has two processes of actual analysis:
    Rule Engine and Access Risk Engine.

TABLE D-continued

Figure 33:
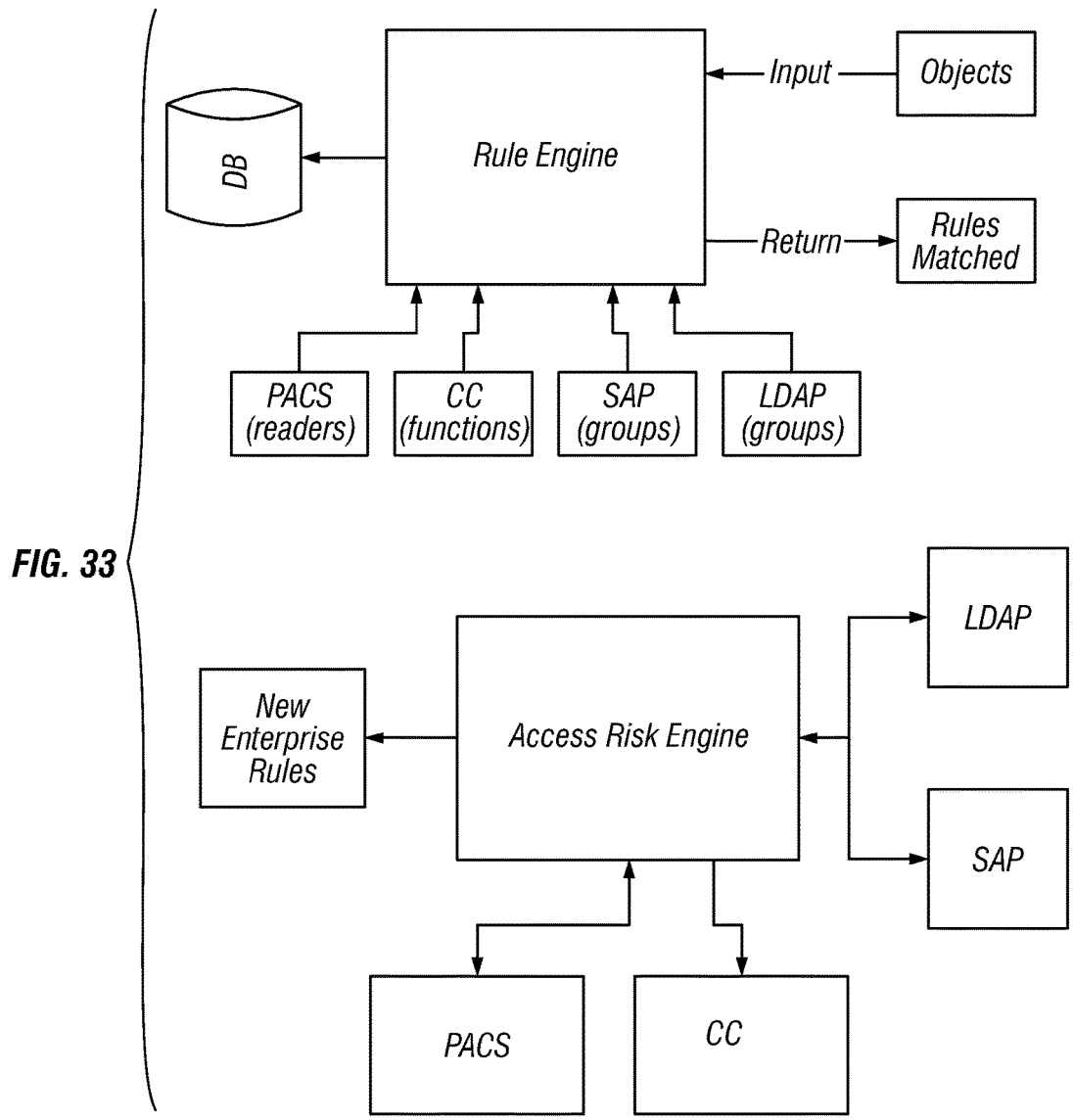
FIG. 33 is an object diagram, according to an embodiment.

For the Rule Engine, the database provides rules and as objects are
inputted into the Rule Engine, it returns rules matched. For the Access
Risk Engine the engine provides returns to the helpers as new enterprise
rules are provided for the ARE. The ARE returns PAL to the PACS
helper, SAP roles to the SAP helper, and LDAP groups to the LDAP
helper. The PACS helper provides the ARE with readers, the CC helper
provides the ARE with CC functions, the SAP helper provides the ARE
with SAP roles, and the LDAP helper provides the ARE with groups in
return.
FIG. 33 is an object diagram, according to an embodiment.
4.5 - Notes JBoss drools → $3^{rd}$ party rule engine.
The procedure of risk analysis is to define preventing actions to reduce the
probability of these issues from occurring as well as to identify
counteractions to deal with any possible restrictions and limitations
when they pose negative effects or threats to the success of the company.

An Exemplary Provisioning Implementation

An embodiment provides an exemplary provisioning implementation as shown below in Table E. It should be appreciated that such particular details are by way of example and are not meant to be limiting.

TABLE E 5.1 - Abstract

Figure 34:
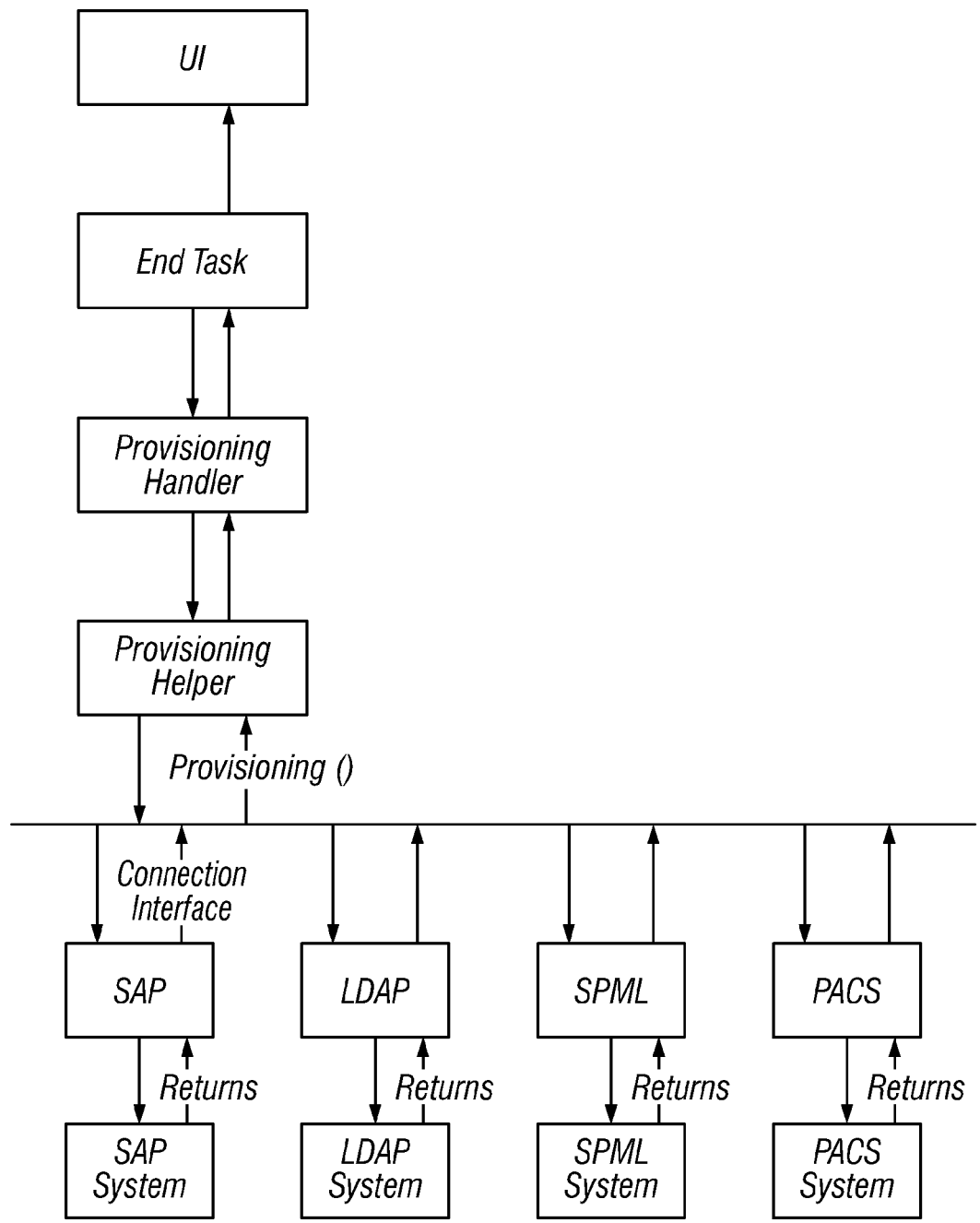
FIG. 34 is a flow diagram, according to an embodiment.
Figure 35:
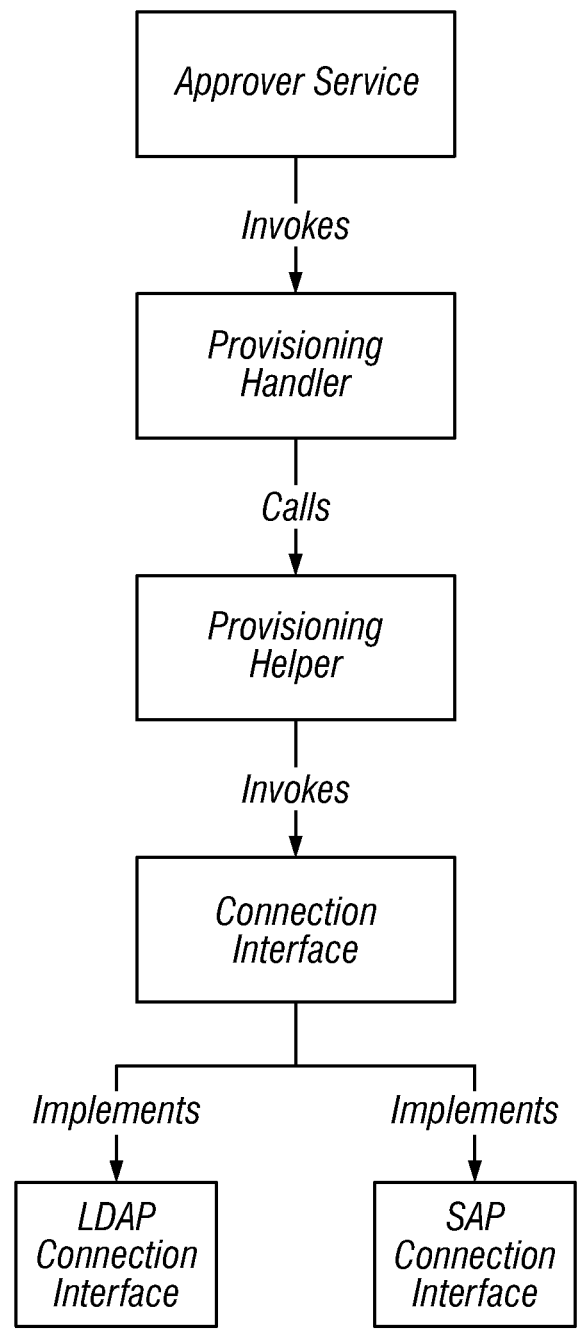
FIG. 35 is an object diagram, according to an embodiment.
Figure 36:
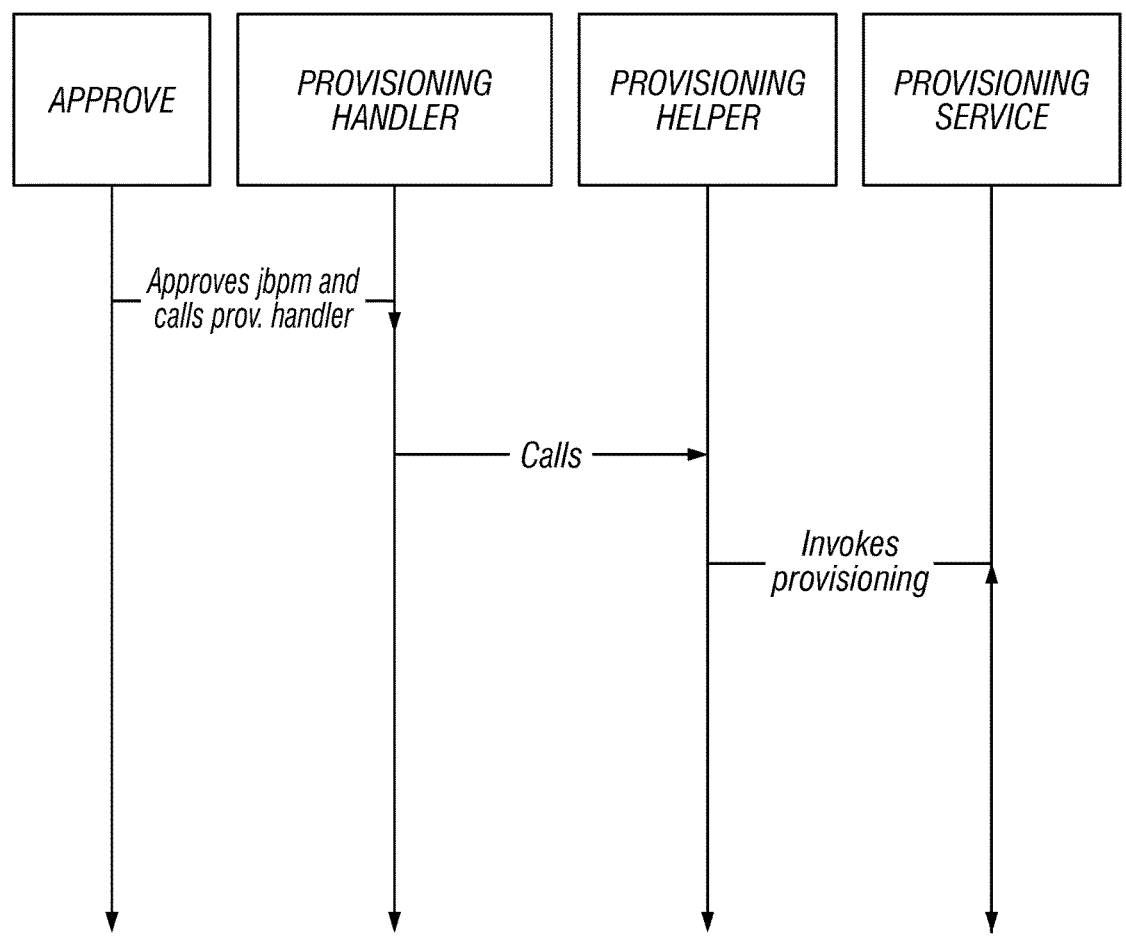
FIG. 36 is a sequence diagram, according to an embodiment.

Provisioning is essentially maintaining the life cycle of a user, from
creating the user in the given system and ultimately giving physical
(PACS) and logical access to the aforesaid user within the aforesaid
system.
As provisioning is maintaining the user life cycle, the process begins with
the creation of the user with request creation. Request creation has three
steps: user info, system info, and role info.
After the request has been created with the appropriate user information,
along with the desired system and role options, the submission initiates.
The information then follows a workflow in which all the data entered
will go through one or many approvers depending on the process:
    One-node (in which only one check is done and the user will be
    provisioned into the system)
    Two-node (in which two checks are required prior to provisioning)
    Three-node (in which three checks are required prior to provisioning)
Prior to each check, a mail will be sent to the appropriate approver
informing them of the request creation. The mail notifications will not be
sent to the second-node or third-node approvers until the approver needed
to approve the request prior to them approves the request creation.
After the final approver approves, the user is provisioned into the system.
FIG. 34 is a flow diagram, according to an embodiment.
FIG. 35 is an object diagram, according to an embodiment.
FIG. 36 is a sequence diagram, according to an embodiment.

An Exemplary Reports/Audit Trials Implementation

An embodiment provides an exemplary reports/audit trials implementation as shown below in Table F. It should be appreciated that such particular details are by way of example and are not meant to be limiting.

TABLE F 6.1 - Abstract

Reports are the result of inquiring data sources with different logical
models to produce a readable report through the corporate intranet.
Reports are classified into three categories:
    Provisioning
    Risks
    User Activity TABLE F-continued Each of which has available reports.
For provisioning, the reports are Audit Trials, which is the audit trial of request approvals, modifications of access details, and request details, List of Requests, a compiled list of requests made, User Provisioning Details, which is the audit trial of user access provisioning into PACS and logical systems, Guest/Visitor Access Reports, which is the guest/visitor access provisioning made into PACS systems, and Contractor Access Reports, which is the contractors/temporary employees access provisioning made into PACS systems.
For risks, the available reports are Users Inactive in LDAP and Active in PACS, which are the list of locked/deactivated/terminated employees still having access to PACS systems, Users Inactive in PACS and Active in LDAP, which are the list of employees with access de-provisioned in PACS but are not deactivated in User Identity stores, Users With Multiple Cards In Multiple PACS, which is the list of employees/guest with more than one badge in different PACS systems, Users Having Access to Critical Zones, which are the list of employees/guests with access to critical areas which needs restricted access, Users With Risks, which are the list of users with access which constitutes risk and the risk details, and Users Having Multiple Cards In Same PACS, which are the list of users who have more than one badge assigned in the same PACS system.
For user activity, the available reports are User Activity For Critical Areas, which is the list of users who have accessed critical areas in a certain period of time, User Activity Comparison To Job Location, which is the list of users who are accessing facilities other than their job location, User Activity Facility Trace, which is the list of users who have accessed a particular facility during a certain period of time, User Inactivity Report, which is the list of active users in PACS system who are not accessing their job location/facility, User Access Denials, which is the list of all denials/rejections for access to certain areas by the PACS system, User Physical and Logical Activity Co-Relation Report, which is the list of users performing activities in a logical system in a particular area.

A Data Model table can be found below, in Table F.1

TABLE F.1

Provisioning Reports

| Report Name | Program | Entity Used |
| --- | --- | --- |
| Audit Trials | RequestAuditTrialSearch | saeh_req_hst hst saet_req_hdr hdr SAE_Lookups |
| List of Requests | CustomReport reportName=requestDetails | saet_req_hdr hdr, SAE_Lookups |
| User Provisioning Details | — | |
| Guest/Visitor Access Reports | ReportRequestByPersType | saet_req_hdr h, sae_pacs_accsslvl a, saet_req_dtl det, saem_req_attbt |
| Contractor Access Reports | ReportRequestByPersType | |

A Risk Reports table can be found below, in Table F.2

TABLE F.2

Risks Reports

| Report Name | Program | Entity Used |
| --- | --- | --- |
| Users Inactive in LDAP and Active in PACS | CustomReport reportName=Inactive_User_Active_in_PACS | saem_hr_userdata, saet_rpt_user_inactive |
| Users Inactive in PACS and Active in LDAP | CustomReport reportName=Active_User_Inactive_in_PACS | saem_hr_userdata, saet_rpt_user_inactive_pacs |
| Users having multiple cards in multiple PACS | CustomReport reportName=User_Badges_MPACS | saem_hr_userdata, saet_rpt_user_mcard_mpacs |
| Users having access to critical zones | CustomReport reportName=User_Critical_Access | saem_hr_userdata, saet_rpt_user_accesszone, saem_re_acszn_defn |
| Users with risks | CustomReport reportName=User_Access_Risk | saem_hr_userdata, saet_rpt_user_riskaccess, saem_re_acszn_defn |
| Users having multiple cards in the same PACS | CustomReport reportName=User_Multiple_Badge | saem_hr_userdata, saet_rpt_user_mcard_spacs |

A User Activity Reports table can be found below, in Table F.3

TABLE F.3

User Activity Reports

| Report Name | Program | Tables/Entity Used |
| --- | --- | --- |
| User activity for critical areas | CustomReport reportName=User_Actvt_Critical_Area | saet_rpt_inactivity, saem_hr_userdata |
| User activity compared to job location | CustomReport reportName=User_Actvt_Oth_Job_Loc | saet_rpt_loc_comparision_activity, saem_hr_userdata |
| User activity facility trace | CustomReport reportName=User_Actvt_Trace | saet_rpt_user_activity_trace, saem_hr_userdata |
| User inactivity report | CustomReport reportName=User_Inactivity | saet_rpt_denied_activity, saem_hr_userdata |

TABLE F.3-continued

User Activity Reports

| Report Name | Program | Tables/Entity Used |
|---|---|---|
| User access denials | CustomReport reportName=User_Access_Denial | saet_rpt_denied_activity, saem_hr_userdata |

Risk Visualization and Remediation

In an embodiment, a risk visualization and remediation subsystem is provided that includes AlertInsight subsystem 402, integration framework 424, risk engine 602, and controls and risk repository 626. In an embodiment, risk engine 602 may include policy engine 624. Further details of the above-cited components are described hereinabove.

Situational Awareness and Video Surveillance

In an embodiment, a situational awareness and video surveillance subsystem is provided that includes AlertAction subsystem 412, workflow processor 630, alert and event management processor 628, integration framework 424, and risk engine 602. In an embodiment, risk engine 602 may include policy engine 624. Further details of the above-cited components are described hereinabove.

Active Policy Enforcement

In an embodiment, an active policy enforcement subsystem is provided that includes policy engine 624, controls and risk repository 626, risk engine 602, and workflow processor 630. Further details of the above-cited components are described hereinabove.

Policy/Rule Engine

In an embodiment, a policy/rule engine subsystem is provided that includes policy engine 624, controls and risk repository 626, risk engine 602, and alert and event management processor 628. In an embodiment, risk engine 602 may include policy engine 624. Further details of the above-cited components are described hereinabove.

Multi-Compliance Framework and Risk Remediation

In an embodiment, a multi-compliance framework and risk remediation subsystem is provided that includes controls and risk repository 626 and compliance management processor 422. Further details of the above-cited components are described hereinabove.

An Example Machine Overview

Figure 39:
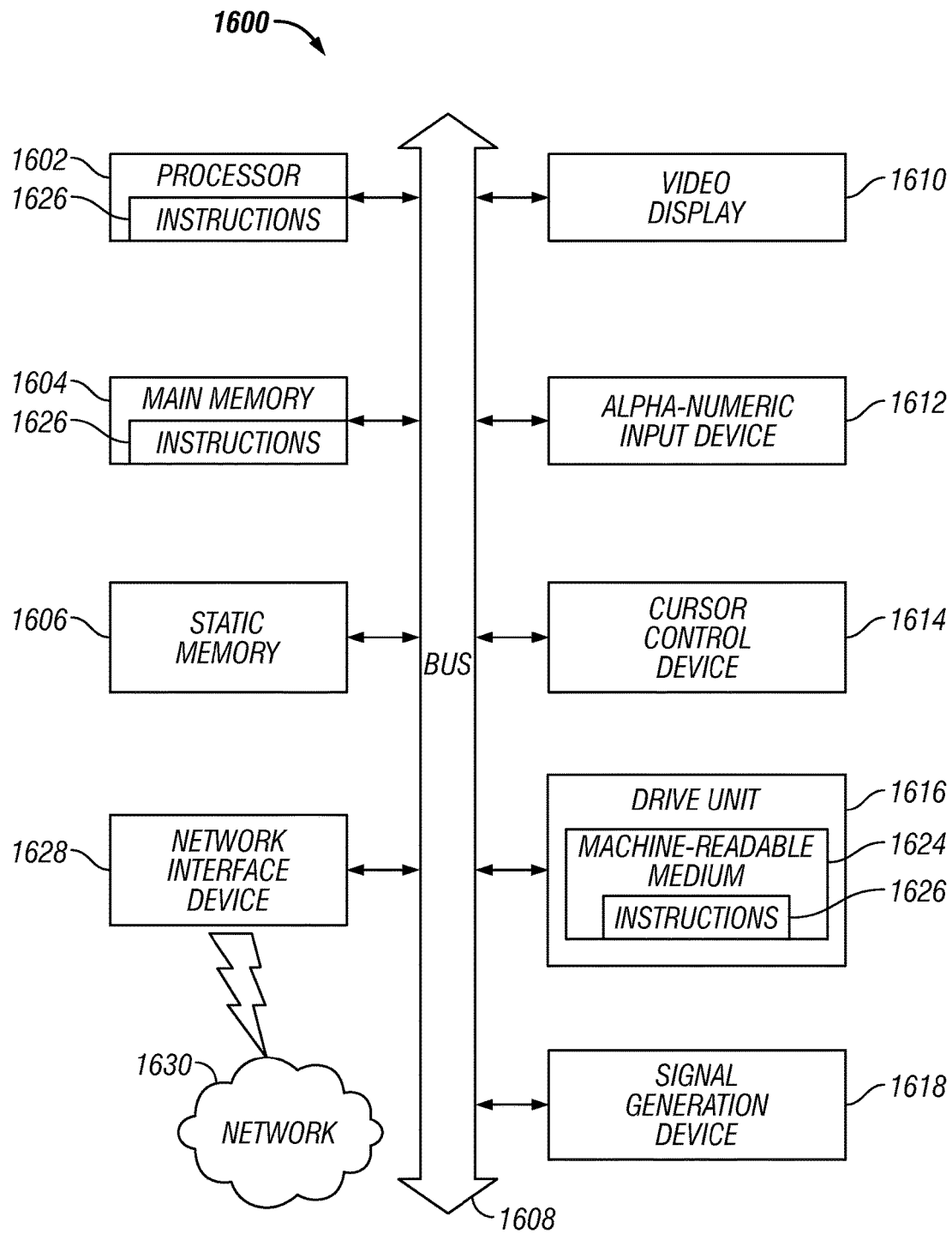
FIG. 39 is a block schematic diagram of a system in the exemplary form of a computer system according to an embodiment.

FIG. 39 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for active policy enforcement for an enterprise in communication with a network, comprising:
   a policy and rules engine configured for following a pre-defined workflow for manual and automated completion of tasks of the enterprise;
   a controls and risk repository for storing content related to regulations, standards and best-practice frameworks, wherein said content are accessible by users for updating and customizing to the enterprise's needs;

a risk engine configured for managing risk of said controls and risk repository and with said policy and rules engine; and an alert access subsystem configured for:
providing continuous rules-driven and policy-compliant user access management and provisioning across the enterprise, using said policy and rules engine, in response to a real-time user access request for a particular resource, wherein the access request is an on-boarding or off-boarding access request or is a change access request and wherein the resource is any of an information technology (IT) applications, physical systems, network, and operational systems, and wherein user roles and user profiles are extracted from said information technology (IT) applications, physical systems, network, and operational systems;

analyzing, in real-time and in response to said user access request, risk across said information technology (IT) applications, physical systems, the network, and operational systems using said risk engine by receiving events generated from a user access session responsive to said user and determining in real-time a level of risk for each event using said user roles and user profiles extracted from said information technology (IT) applications, physical systems, network, and operational systems;

based on said determined level of risk for each event, automatically enforcing a policy by using, via connectors to physical access control, building controls and sensor networks:

imaging sensors and a building control and card access system configured to actively control access to the building based on said level of risk;

an access card provisioning and de provisioning system configured to provision or de provision according to said level of risk;

video surveillance using biometrics configured to provide visual scene representation based on said level of risk coupled with a subsystem configured to provide capability to initiate a lockdown of a zone to isolate an incident; and radio frequency identification (RFID) technology using proximity sensors and control systems;

wherein said providing continuous rules-driven and policy-compliant user access management and provisioning comprises using existing Segregation of Duties (SoD) engines for Enterprise Resource Planning (ERP) applications;

providing an enterprise view for access control exposure across the enterprise, wherein said view displays a list of said events and a visual indicator for each event indicating the determined level of risk; and deploying remedial action strategies that include providing policy-compliant actions to incident responders;

wherein at least one of the policy and rules engine, the risk engine, and the alert access subsystem comprises:
at least one processor;
a memory device coupled to said at least one processor.

2. The apparatus of claim 1, wherein said alert access subsystem is configured for managing logical and physical access.

3. The apparatus of claim 1, further configured for providing context based visual remediation by displaying risks and receiving remediation input in real-time for delivering active policy enforcement.

4. The apparatus of claim 1, further configured for providing risk management by:
aggregating blended threats from IT systems, physical access control systems, and critical control systems, and uncovering associated risks; and
analyzing and correlating networked access events and integrating data from human resources (HR) applications;
identifying individuals from said HR data who were determined to pose a threat; and
denying access by said individuals to said systems, thereby ensuring risk management.

5. The apparatus of claim 1, wherein said alert access subsystem is further configured for:
analyzing blended risks across the enterprise, including IT applications, databases, networks and physical systems;
monitoring access to IT systems, facilities, critical assets and high impact applications;
leveraging roles and policies in existing identity and access management and governance, risk management and compliance (GRC) applications;
performing risk analysis at the object and organization level;
assigning mitigating controls and ensuring compliance;
identify risks related to physical locations and corporate assets;
enforcing user access policies based on certification and training;
managing employee or contractor on-boarding and off-boarding processes; and
automating testing and controls using regulations, standards, and frameworks from authoritative sources on bulk electrical power systems, high-risk chemical facilities, national standards for security of health information, and federal government information security.

6. The apparatus of claim 1, further comprising:
a processor for configuring and actively enforcing access policies using a notification workflow.

7. The apparatus of claim 1, further comprising:
a processor configured for deploying remedial action strategies (RAS) that provide policy-compliant actions to incident responders.

8. The apparatus of claim 1, further comprising:
a processor configured for displaying a user self-service screen that presents representations of available options for request and use categories;
a processor configured for displaying a user self-service access request form that provides a detailed user access request form with customizable fields;
a processor configured for displaying a resources selection page-requestor view that provides a representation of available resources to obtain access from and the ability to select a profile based on any other user or available categorization;
a processor configured for displaying a view for resource selection and modeling from a desired profile that enables a requestor to choose a desired user to mimic access with other advanced options and available categories;
a processor configured for displaying a user request summary screen that allows the user to validate with said summary and view contents of said request prior to final submission;

a processor configured to displaying a view of a request queue that displays the requests in various stages of a workflow with unique identifiers and associated statuses of each request of said requests;

a processor configured for displaying an approver view of a submitted request that includes presented an itemized view of contents of the request to ease an associated approval process;

a processor configured for displaying a view for listing risks associated with granting access per request, wherein said view lists the risks linked to the granting of access per request;

a processor configured for displaying a view for listing mitigating controls for identified risks, wherein said view presents an approver with an associated mitigation control to the identified risk;

a processor configured for displaying a view for presenting evaluation of risks associated with a request, wherein the view comprises an evaluate risk tab that analyzes possible risks associated with the request and presents said analyzed risks to an approver for further analysis;

a processor configured for displaying an approver or manager view of requests, wherein the approver or manager is presented with a summary view of requested resources that belong to a particular request;

a processor configured for displaying a policy maintenance screen, wherein policies enforce rules onto one or more provisioning processes in an automated manner and wherein attributes of said policies are customizable;

a processor configured for displaying a view for policy detailed definitions and for creating policies that are enforced and prioritized based on execution of rules inherent within the policy;

a processor configured for displaying a workflow process designer view that comprises a drag and drop workflow enablement tool used to set one or more processes;

a processor configured for displaying a view of a listing of process configurations that are available out of the box;

a processor configured for displaying a workflow rules view in which applicability parameters for policy enforcement are any of: added, modified, or deleted;

a processor configured for displaying a rule definition view that provides ability to identify applicability of a particular rule and additional attributes associated with said particular rule; and a processor configured for displaying a reports capability view that provides out-of the box reports and custom reports development as part of configuration.

9. A computer-implemented method for active policy enforcement for an enterprise in communication with a network, comprising:

following, by a policy and rules engine, a pre-defined workflow for manual and automated completion of tasks of the enterprise;

storing, by a controls and risk repository, content related to regulations, standards and best-practice frameworks, wherein said content are accessible by users for updating and customizing to the enterprise's needs;

managing, by a risk engine, correlation of user access and activity events with said controls and risk repository and with said policy and rules engine and for automatically initiating a workflow action, by a workflow processor, when potential security and compliance risk are detected; and providing an alert access subsystem configured for:

providing continuous rules-driven and policy-compliant user access management and provisioning across the enterprise, using said policy and rules engine, in response to a real-time user access request for a particular resource, wherein the access request is an on-boarding or off-boarding access request or is a change access request and wherein the resource is any of an information technology (IT) applications, physical systems, network, and operational systems, and wherein user roles and user profiles are extracted from said information technology (IT) applications, physical systems, network, and operational systems;

analyzing, in real-time and in response to said user access request, risk across said information technology (IT) applications, physical systems, the network, and operational systems using said risk engine by receiving events generated from a user access session responsive to said user and determining in real-time a level of risk for each event using said user roles and user profiles extracted from said information technology (IT) applications, physical systems, network, and operational systems;

based on said determined level of risk for each event, automatically enforcing a policy by using, via connectors to physical access control, building controls and sensor networks:

imaging sensors and a building control and card access system configured to actively control access to the building based on said level of risk;

an access card provisioning and de provisioning system configured to provision or de provision according to said level of risk;

video surveillance using biometrics configured to provide visual scene representation based on said level of risk coupled with a subsystem configured to provide capability to initiate a lockdown of a zone to isolate an incident; and radio frequency identification (RFID) technology using proximity sensors and control systems;

wherein said providing continuous rules-driven and policy-compliant user access management and provisioning comprises using existing Segregation of Duties (SoD) engines for Enterprise Resource Planning (ERP) applications;

providing an enterprise view for access control exposure across the enterprise, wherein said view displays a list of said events and a visual indicator for each event indicating the determined level of risk; and deploying remedial action strategies that include providing policy-compliant actions to incident responders.

10. The computer-implemented method of claim 9, wherein said alert access subsystem is configured for managing logical and physical access.

11. The computer-implemented method of claim 9, further comprising providing context based visual remediation by displaying risks and receiving remediation input in real-time for delivering active policy enforcement.

12. The computer-implemented method of claim 9, further comprising providing risk management by:

aggregating blended threats from IT systems, physical access control systems, and critical control systems, and uncovering associated risks; and analyzing and correlating networked access events and integrating data from human resources (HR) applications;
identifying individuals from said HR data who were determined to pose a threat; and
denying access by said individuals to said systems, thereby ensuring risk management.

13. The computer-implemented method of claim 9, wherein said alert access subsystem is further configured for:
analyzing blended risks across the enterprise, including IT applications, databases, networks and physical systems;
monitoring access to IT systems, facilities, critical assets and high impact applications;
leveraging roles and policies in existing identity and access management and governance, risk management and compliance (GRC) applications;
performing risk analysis at the object and organization level;
assigning mitigating controls and ensuring compliance;
identify risks related to physical locations and corporate assets;
enforcing user access policies based on certification and training;
managing employee or contractor on-boarding and off-boarding processes; and
automating testing and controls using regulations, standards, and frameworks from authoritative sources on bulk electrical power systems, high-risk chemical facilities, national standards for security of health information, and federal government information security.

14. The computer-implemented method of claim 9, further comprising:
configuring and actively enforcing, by a processor, access policies using a notification workflow.

15. The computer-implemented method of claim 9, further comprising:
deploying, by a processor, remedial action strategies (RAS) that provide policy-compliant actions to incident responders.

16. The computer-implemented method of claim 9, further comprising:
displaying, by a processor, a user self-service screen that presents representations of available options for request and use categories;
displaying, by a processor, a user self-service access request form that provides a detailed user access request form with customizable fields;
displaying, by a processor, a resources selection page-requestor view that provides a representation of available resources to obtain access from and the ability to select a profile based on any other user or available categorization;
displaying, by a processor, a view for resource selection and modeling from a desired profile that enables a requestor to choose a desired user to mimic access with other advanced options and available categories;
displaying, by a processor, a user request summary screen that allows the user to validate with said summary and view contents of said request prior to final submission;
displaying, by a processor, a view of a request queue that displays the requests in various stages of a workflow with unique identifiers and associated statuses of each request of said requests;
displaying, by a processor, an approver view of a submitted request that includes presented an itemized view of contents of the request to ease an associated approval process;
displaying, by a processor, a view for listing risks associated with granting access per request, wherein said view lists the risks linked to the granting of access per request;
displaying, by a processor, a view for listing mitigating controls for identified risks, wherein said view presents an approver with an associated mitigation control to the identified risk;
displaying, by a processor, a view for presenting evaluation of risks associated with a request, wherein the view comprises an evaluate risk tab that analyzes possible risks associated with the request and presents said analyzed risks to an approver for further analysis;
displaying, by a processor, an approver or manager view of requests, wherein the approver or manager is presented with a summary view of requested resources that belong to a particular request;
displaying, by a processor, a policy maintenance screen, wherein policies enforce rules onto one or more provisioning processes in an automated manner and wherein attributes of said policies are customizable;
displaying, by a processor, a view for policy detailed definitions and for creating policies that are enforced and prioritized based on execution of rules inherent within the policy;
displaying, by a processor, a workflow process designer view that comprises a drag and drop workflow enablement tool used to set one or more processes;
displaying, by a processor, a view of a listing of process configurations that are available out of the box;
displaying, by a processor, a workflow rules view in which applicability parameters for policy enforcement are any of: added, modified, or deleted;
displaying, by a processor, a rule definition view that provides ability to identify applicability of a particular rule and additional attributes associated with said particular rule; and
displaying, by a processor, a reports capability view that provides out-of the box reports and custom reports development as part of configuration.

* * * * *